United States Patent
Chai

(10) Patent No.: US 9,769,326 B2
(45) Date of Patent: *Sep. 19, 2017

(54) CHARGING METHOD AND DEVICE

(71) Applicant: HUAWEI TECHNOLOGIES CO.,LTD., Shenzhen, Guangdong (CN)

(72) Inventor: Xiaoqian Chai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/395,151

(22) Filed: Dec. 30, 2016

(65) Prior Publication Data

US 2017/0111518 A1    Apr. 20, 2017

Related U.S. Application Data

(63) Continuation of application No. 14/799,751, filed on Jul. 15, 2015, now Pat. No. 9,538,017, which is a
(Continued)

(51) Int. Cl.
*H04M 11/00* (2006.01)
*H04M 15/00* (2006.01)
*H04L 12/14* (2006.01)

(52) U.S. Cl.
CPC ........ *H04M 15/66* (2013.01); *H04L 12/1407* (2013.01); *H04M 15/61* (2013.01); *H04M 15/8214* (2013.01)

(58) Field of Classification Search
CPC .............................. H04M 15/00–15/93; H04M 15/8214–15/8228; H04W 4/24–4/26
(Continued)

(56) References Cited

U.S. PATENT DOCUMENTS

2003/0096592 A1   5/2003   Moreau et al.
2012/0202457 A1   8/2012   Yang et al.
2012/0220330 A1   8/2012   Goldner et al.

FOREIGN PATENT DOCUMENTS

CN   102131172 A   7/2011
CN   102137367 A   7/2011
(Continued)

OTHER PUBLICATIONS

3GPP TR 23.800 V1.0.0, 3rd Generation Partnership Project;Technical Specification Group Services and System Aspects;Study on Application Based Charging;Stage 2 (Release 12). Nov. 2012. total 38 pages.
(Continued)

*Primary Examiner* — Charles Shedrick
(74) *Attorney, Agent, or Firm* — Huawei Technologies Co., Ltd.

(57) ABSTRACT

The present disclosure include acquiring, by a TDF entity, a correlation identifier of a data flow of an application borne by the TDF entity; and sending, by the TDF entity, first charging information to a charging system, where the first charging information carries the correlation identifier of the data flow of the application borne by the TDF entity, so that the charging system performs, according to the correlation identifier of the data flow of the application borne by the TDF entity and a correlation identifier of a data flow borne by a PCEF entity, correlation processing for the first charging information and second charging information that is sent by the PCEF entity to the charging system, where the second charging information carries the correlation identifier of the data flow borne by the PCEF entity. Thereby, accurate charging can be performed for the data flow and the application.

18 Claims, 17 Drawing Sheets

Related U.S. Application Data continuation of application No. PCT/CN2013/070492, filed on Jan. 15, 2013.

(58) Field of Classification Search
USPC .......................................................... 455/406
See application file for complete search history.

(56) References Cited

FOREIGN PATENT DOCUMENTS

| | | | |
|---|---|---|---|
| CN | 102625272 | A | 8/2012 |
| JP | 2011517154 | A | 5/2011 |
| JP | 2011521522 | A | 7/2011 |
| JP | 2012523749 | A | 10/2012 |
| WO | 2011147466 | A1 | 12/2011 |
| WO | 2012077073 | A1 | 6/2012 |
| WO | 2013108138 | A1 | 7/2013 |

OTHER PUBLICATIONS

3GPP TS 29.212 V11.7.0, 3rd Generation Partnership Project;Technical Specification Group Core Network and Terminals;Policy and Charging Control (PCC); Reference points (Release 11).Dec. 2012. total 196 pages.

3GPP TS 32.251 V11.5.0, 3rd Generation Partnership Project;Technical Specification Group Services and System Aspects;Telecommunication management;Charging management;Packet Switched (PS) domain charging (Release 11). Dec. 2012. total 93 pages.

400

| A PCRF entity sends a data flow charging rule to a PCEF entity, where the data flow charging rule includes second charging correlation information, so that the PCEF entity generates, according to the data flow charging rule, second charging information that carries a correlation identifier of a data flow borne by the PCEF entity | ∼ S410 |

| The PCRF entity sends an application charging rule to a TDF entity, where the application charging rule includes first charging correlation information, so that the TDF entity generates, according to the application charging rule, first charging information that carries a correlation identifier of a data flow of an application borne by the TDF entity | ∼ S420 |

FIG. 7

CHARGING METHOD AND DEVICE

CROSS-REFERENCE TEMPLATES

This application is a continuation of U.S. patent application Ser. No. 14/799,751, filed on Jul. 15, 2015, which is a continuation of International Application No. PCT/CN2013/070492, filed on Jan. 15, 2013, the disclosure of which is hereby incorporated by reference in its entirety.

TECHNICAL FIELD

The present disclosure relates to the field of communications, and in more particular, to a charging method, a Traffic Detection Function (TDF) entity, a policy and charging enforcement function (PCEF) entity, a charging system, a policy and charging rules function (PCRF) entity, and a system.

BACKGROUND

Large-scale deployment of 3G networks has greatly promoted use of data services. Charging and control for over-the-top (Over The Top, OTT) applications is seen as an important technical approach to improving accuracy of charging and control for operator network traffic, enhancing user experience, and deriving more revenue from every bit of traffic.

Current charging modes include online charging and offline charging. Online charging is mainly as follows: Before a user uses a service, a credit (that is, the number of resources that may be used by the service) is granted; a network element controls use of the service according to the credit granted by an online charging system (Online Charging System, OCS); and when the user runs out of the granted credit, the network element requests the OCS to grant a new credit, and further, the user is charged in real time according to usage of the service.

Policy and charging control (Policy and Charging Control, PCC) is a policy and charging control mechanism defined by the 3rd Generation Partnership Project (3rd Generation Partnership Project, 3GPP). In the mechanism, a PCRF entity makes a policy decision (Policy Decision) to generate a data flow charging policy and control policy for a PCEF entity and generate application detection and application control policies for a TDF entity; then the PCRF entity delivers an application activation control policy to the TDF entity for installation, and delivers the flow control and charging policies to the PCEF entity for installation; according to the charging policy delivered by the PCRF entity, the PCEF entity initiates an application credit quota request, namely, a credit control request (Credit Control Request, CCR) message, to the OCS, and the OCS grants a quota, and returns the granted credit to the PCEF entity. In this technology, application charging information is collected based on 5-tuple information of an Internet Protocol (Internet Protocol, IP) packet, where the 5-tuple information includes a source IP address, a source port number, a destination IP address, a destination port number, and protocol information of the IP packet. There are many OTT application providers on the Internet, and the quantity of these providers is constantly changing, and consequently, an operator cannot provide an IP layer identification rule for every OTT application. Further, some different OTT applications use a same IP address. For example, different applications of a same provider use a same external IP address and they are distinguished by internal paths of a server. In this case, an application cannot be identified merely by an IP layer, and an operator cannot perform application-based charging for an OTT application by means of IP layer identification.

SUMMARY

Embodiments of the present disclosure provide a charging method, a TDF entity, a PCEF entity, a charging system, a PCRF entity, and a system, which can implement charging for an application and charging for a data flow simultaneously.

According to a first aspect, a charging method is provided and includes: acquiring, by a TDF entity, a correlation identifier of a data flow of an application borne by the TDF entity; and sending, by the TDF entity, first charging information to a charging system, where the first charging information carries the correlation identifier of the data flow of the application borne by the TDF entity, so that the charging system performs, according to the correlation identifier of the data flow of the application borne by the TDF entity and a correlation identifier of a data flow borne by a PCEF entity, correlation processing for the first charging information and second charging information that is sent by the PCEF entity to the charging system, where the second charging information carries the correlation identifier of the data flow borne by the PCEF entity.

In a first possible implementation, the sending, by the TDF entity, first charging information to a charging system, includes: when a reporting trigger condition of the TDF entity is satisfied, sending, by the TDF entity, the first charging information to the charging system, so that the charging system sends, according to the correlation identifier of the data flow of the application borne by the TDF entity, to the PCEF entity an indication message for instructing the PCEF entity to send the second charging information to the charging system.

In a second possible implementation, before the sending, by the TDF entity, first charging information to a charging system, the method further includes: receiving, by the TDF entity, an indication message that is sent by the charging system according to the correlation identifier of the data flow borne by the PCEF entity and instructs the TDF entity to send the first charging information; and the sending, by the TDF entity, first charging information to a charging system, includes: responding, by the TDF entity, to the indication message by sending the first charging information to the charging system.

With reference to the second possible implementation of the first aspect, in a third possible implementation, the indication message carries the correlation identifier of the data flow borne by the PCEF entity; and the responding, by the TDF entity, to the indication message by sending the first charging information to the charging system, includes: sending, by the TDF entity, charging information that is of the data flow of the application borne by the TDF entity and is corresponding to the correlation identifier of the data flow borne by the PCEF entity, to the charging system.

With reference to the first aspect or any one possible implementation of the first to third possible implementations of the first aspect, in a fourth possible implementation, the acquiring, by a TDF entity, a correlation identifier of a data flow of an application borne by the TDF entity, includes: receiving, by the TDF entity, an application charging policy sent by a PCRF entity, where the application charging policy includes the correlation identifier of the data flow of the application borne by the TDF entity, and acquiring, according to the application charging policy, the correlation identifier of the data flow of the application borne by the TDF entity; where the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; or the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group.

With reference to the fourth possible implementation of the first aspect, in a fifth possible implementation, the application charging policy includes correlation identifiers of data flows of all applications on the TDF entity and flow templates corresponding to the correlation identifiers of the data flows of all the applications on the TDF entity; and the acquiring, by the TDF entity according to the application charging policy, the correlation identifier of the data flow of the application borne by the TDF entity, includes: acquiring, by the TDF entity according to the correlation identifiers of the data flows of all the applications on the TDF entity and the flow templates corresponding to the correlation identifiers of the data flows of all the applications on the TDF entity, the correlation identifier of the data flow of the application borne by the TDF entity.

With reference to the first aspect or any one possible implementation of the first to third possible implementations of the first aspect, in a sixth possible implementation, the correlation identifier of the data flow of the application borne by the TDF entity includes a fourth identifier and a fifth identifier, and the correlation identifier of the data flow borne by the PCEF entity includes the fourth identifier and the fifth identifier, where the fourth identifier indicates a bearer to which the data flow belongs on the PCEF entity and a corresponding rating group, and the fifth identifier is used to identify the data flow of the application; the acquiring, by a TDF entity, a correlation identifier of a data flow of an application borne by the TDF entity, includes: receiving, by the TDF entity, a data packet that is sent by the PCEF entity and carries the fourth identifier, and acquiring, according to the data packet that is sent by the PCEF entity and carries the fourth identifier, the fourth identifier of the data flow of the application borne by the TDF entity; and determining, by the TDF entity, the fifth identifier of the data flow of the application borne by the TDF entity; and the method further includes: sending, by the TDF entity, a data packet that carries the fifth identifier to the PCEF entity, so that the PCEF entity acquires, according to the data packet that carries the fifth identifier, the fifth identifier of the data flow borne by the PCEF entity.

With reference to the first aspect or any one possible implementation of the first to sixth possible implementations of the first aspect, in a seventh possible implementation, before the sending, by the TDF entity, first charging information to a charging system, the method further includes: sending, by the TDF entity, a first quota request to the charging system, where the first quota request carries the correlation identifier of the data flow of the application borne by the TDF entity and the rating group of the application, so that the charging system allocates a first quota according to the rating group of the application; and receiving, by the TDF entity, the first quota sent by the charging system.

According to a second aspect, a charging method is provided and includes: acquiring, by a PCEF entity, a correlation identifier of a data flow borne by the PCEF entity; and sending, by the PCEF entity, second charging information to a charging system, where the second charging information carries the correlation identifier of the data flow borne by the PCEF entity, so that the charging system performs, according to the correlation identifier of the data flow borne by the PCEF entity and a correlation identifier of a data flow of an application borne by a traffic detection function TDF entity, correlation processing for the second charging information and first charging information that is sent by the TDF entity to the charging system, where the first charging information carries the correlation identifier of the data flow of the application borne by the TDF entity.

In a first possible implementation, the sending, by the PCEF entity, second charging information to a charging system, includes: when a reporting trigger condition of the PCEF entity is satisfied, sending, by the PCEF entity, the second charging information to the charging system, so that the charging system sends, according to the correlation identifier of the data flow borne by the PCEF entity, to the TDF entity an indication message for instructing the TDF entity to send the first charging information to the charging system.

In a second possible implementation, before the sending, by the PCEF entity, second charging information to a charging system, the method further includes: receiving, by the PCEF entity, an indication message that is sent by the charging system according to the correlation identifier of the data flow of the application borne by the TDF entity and instructs the PCEF entity to send the second charging information; and the sending, by the PCEF entity, second charging information to a charging system, includes: responding, by the PCEF entity, to the indication message by sending the second charging information to the charging system.

With reference to the second possible implementation of the second aspect, in a third possible implementation, the indication message carries the correlation identifier of the data flow of the application borne by the TDF entity; and the responding, by the PCEF entity, to the indication message by sending the second charging information to the charging system, includes: sending, by the PCEF entity, charging information that is of the data flow borne by the PCEF entity and is corresponding to the correlation identifier of the data flow of the application borne by the TDF entity, to the charging system.

With reference to the second aspect or any one possible implementation of the first to third possible implementations of the second aspect, in a fourth possible implementation, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; and the acquiring, by a PCEF entity, a correlation identifier of a data flow borne by the PCEF entity, includes: receiving, by the PCEF entity, a data flow charging policy sent by a PCRF entity, where the data flow charging policy includes the first identifier and the second identifier of the data flow borne by the PCEF entity, and acquiring, according to the data flow charging policy, the first identifier and the second identifier of the data flow borne by the PCEF entity.

With reference to the second aspect or any one possible implementation of the first to third possible implementations of the second aspect, in a fifth possible implementation, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; the acquiring, by a PCEF entity, a correlation identifier of a data flow borne by the PCEF entity, includes: determining, by the PCEF entity, the first identifier of the data flow borne by the PCEF entity; and receiving, by the PCEF entity, a data flow charging policy sent by a PCRF entity, where the data flow charging policy includes the second identifier of the data flow borne by the PCEF entity, and acquiring, according to the data flow charging policy, the second identifier of the data flow borne by the PCEF entity; and the method further includes: sending, by the PCEF entity, the first identifier of the data flow borne by the PCEF entity to the PCRF entity.

With reference to the second aspect or any one possible implementation of the first to third possible implementations of the second aspect, in a sixth possible implementation, the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group; and the acquiring, by a PCEF entity, a correlation identifier of a data flow borne by the PCEF entity, includes: receiving, by the PCEF entity, a data flow charging policy sent by a PCRF entity, where the data flow charging policy includes the third identifier of the data flow borne by the PCEF entity, and acquiring, according to the data flow charging policy, the third identifier of the data flow borne by the PCEF entity.

With reference to the second aspect or any one possible implementation of the first to third possible implementations of the second aspect, in a seventh possible implementation, the correlation identifier of the data flow of the application borne by the TDF entity includes a fourth identifier and a fifth identifier, and the correlation identifier of the data flow borne by the PCEF entity includes the fourth identifier and the fifth identifier, where the fourth identifier indicates a bearer to which the data flow belongs on the PCEF entity and a corresponding rating group, and the fifth identifier is used to identify the data flow of the application; the acquiring, by a PCEF entity, a correlation identifier of a data flow borne by the PCEF entity, includes: determining, by the PCEF entity, the fourth identifier of the data flow borne by the PCEF entity; and receiving, by the PCEF entity, a data packet that is sent by the TDF entity and carries the fifth identifier, and acquiring, according to the data packet that is sent by the TDF entity and carries the fifth identifier, the fifth identifier of the data flow borne by the PCEF entity; and the method further includes: sending, by the PCEF entity, a data packet that carries the fourth identifier to the TDF entity, so that the TDF entity acquires, according to the data packet that carries the fourth identifier, the fourth identifier of the data flow of the application borne by the TDF entity.

With reference to the second aspect or any one possible implementation of the first to seventh possible implementations of the second aspect, in an eighth possible implementation, before the sending, by the PCEF entity, second charging information to a charging system, the method further includes: sending, by the PCEF entity, a second quota request to the charging system, where the second quota request carries the correlation identifier of the data flow borne by the PCEF entity and the rating group of the data flow, so that the charging system allocates a second quota according to the rating group of the data flow; and receiving, by the PCEF entity, the second quota sent by the charging system.

According to a third aspect, a charging method is provided and includes: receiving, by a charging system, first charging information sent by a TDF entity, where the first charging information carries a correlation identifier of a data flow of an application borne by the TDF entity; receiving, by the charging system, second charging information sent by a PCEF entity, where the second charging information carries a correlation identifier of a data flow borne by the PCEF entity; and performing, by the charging system, correlation processing for the first charging information and the second charging information according to the correlation identifier of the data flow of the application borne by the TDF entity and the correlation identifier of the data flow borne by the PCEF entity.

In a first possible implementation, the receiving, by a charging system, first charging information sent by a TDF entity, includes: receiving, by the charging system, the first charging information sent by the TDF entity to the charging system when a reporting trigger condition of the TDF entity is satisfied; before the receiving, by the charging system, second charging information sent by a PCEF entity, the method further includes: sending, by the charging system according to the correlation identifier of the data flow of the application borne by the TDF entity, to the PCEF entity an indication message for instructing the PCEF entity to send the second charging information; and the receiving, by the charging system, second charging information sent by a PCEF entity, includes: receiving, by the charging system, the second charging information sent by the PCEF entity in response to the indication message.

With reference to the first possible implementation of the third aspect, in a second possible implementation, the indication message carries the correlation identifier of the data flow of the application borne by the TDF entity; and the receiving, by the charging system, the second charging information sent by the PCEF entity in response to the indication message, includes: receiving, by the charging system, charging information sent by the PCEF entity, where the charging information is charging information that is of the data flow borne by the PCEF entity and is corresponding to the correlation identifier of the data flow of the application borne by the TDF entity.

In a third possible implementation, the receiving, by the charging system, second charging information sent by a PCEF entity, includes: receiving, by the charging system, the second charging information sent by the PCEF entity to the charging system when a reporting trigger condition of the PCEF entity is satisfied; before the receiving, by a charging system, first charging information sent by a TDF entity, the method further includes: sending, by the charging system according to the correlation identifier of the data flow borne by the PCEF entity, to the TDF entity an indication message for instructing the TDF entity to send the first charging information; and the receiving, by a charging system, first charging information sent by a TDF entity, includes: receiving, by the charging system, the first charging information sent by the TDF entity in response to the indication message.

With reference to the third possible implementation of the third aspect, in a fourth possible implementation, the indication message carries the correlation identifier of the data flow borne by the PCEF entity; and the receiving, by the charging system, the first charging information sent by the TDF entity in response to the indication message, includes: receiving, by the charging system, charging information sent by the TDF entity, where the charging information is charging information that is of the data flow of the application borne by the TDF entity and is corresponding to the correlation identifier of the data flow borne by the PCEF entity.

With reference to the third aspect or any one possible implementation of the first to fourth possible implementations of the third aspect, in a fifth possible implementation, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; or the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group; or the correlation identifier of the data flow of the application borne by the PCEF entity includes a fourth identifier and a fifth identifier, and the correlation identifier of the data flow borne by the PCEF entity includes the fourth identifier and the fifth identifier, where the fourth identifier indicates a bearer to which the data flow belongs on the PCEF entity, and a corresponding rating group, and the fifth identifier is used to identify the data flow of the application.

With reference to the third aspect or any one possible implementation of the first to fifth possible implementations of the third aspect, in a sixth possible implementation, before the receiving, by a charging system, first charging information sent by a TDF entity, the method further includes: receiving, by the charging system, a first quota request sent by the TDF entity, where the first quota request carries the correlation identifier of the data flow of the application borne by the TDF entity and the rating group of the application, so that the charging system allocates a first quota according to the rating group of the application; and sending, by the charging system, the first quota to the TDF entity; and before the receiving, by the charging system, second charging information sent by a PCEF entity, the method further includes: receiving, by the charging system, a second quota request sent by the PCEF entity, where the second quota request carries the correlation identifier of the data flow borne by the PCEF entity and the rating group of the data flow, so that the charging system allocates a second quota according to the rating group of the data flow; and sending, by the charging system, the second quota to the PCEF entity.

With reference to the third aspect or any one possible implementation of the first to sixth possible implementations of the third aspect, in a seventh possible implementation, the performing, by the charging system, correlation processing for the first charging information and the second charging information according to the correlation identifier of the data flow of the application borne by the TDF entity and the correlation identifier of the data flow borne by the PCEF entity, includes: determining, by the charging system, charging information of a same correlation identifier in the first charging information and the second charging information, and performing charging for the charging information of the same correlation identifier by using different charging policies.

According to a fourth aspect, a charging method is provided and includes: sending, by a policy and charging rules function entity PCRF entity, a data flow charging policy to a policy and charging enforcement function entity PCEF entity, where the data flow charging policy includes second charging correlation information, so that the PCEF entity generates, according to the data flow charging policy, second charging information that carries a correlation identifier of a data flow borne by the PCEF entity; and sending, by the PCRF entity, an application charging policy to a traffic detection function TDF entity, where the application charging policy includes first charging correlation information, so that the TDF entity generates, according to the application charging policy, first charging information that carries a correlation identifier of a data flow of an application borne by the TDF entity, where the correlation identifier of the data flow borne by the PCEF entity and the correlation identifier of the data flow of the application borne by the TDF entity are used by a charging system to perform correlation processing for the first charging information and the second charging information.

In a first possible implementation, the second charging correlation information includes the correlation identifier of the data flow borne by the PCEF entity, and the first charging correlation information includes the correlation identifier of the data flow of the application borne by the TDF entity; and the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; or the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group.

In a second possible implementation, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; the second charging correlation information includes the second identifier of the data flow borne by the PCEF entity, and the first charging correlation information includes the first identifier and the second identifier of the data flow of the application borne by the TDF entity; and before the sending, by the PCRF entity, an application charging policy to a traffic detection function TDF entity, the method further includes: receiving, by the PCRF entity, the first identifier, which is sent by the PCEF entity, of the data flow borne by the PCEF entity, and determining, according to the first identifier of the data flow borne by the PCEF entity, the first identifier of the data flow of the application borne by the TDF entity.

With reference to the first or second possible implementation of the fourth aspect, in a third possible implementation, the first charging correlation information includes correlation identifiers of data flows of all applications on the TDF entity and flow templates corresponding to the correlation identifiers of the data flows of all the applications on the TDF entity.

According to a fifth aspect, a traffic detection function TDF entity is provided and includes: an acquiring module, configured to acquire a correlation identifier of a data flow of an application borne by the TDF entity; and a sending module, configured to send first charging information to a charging system, where the first charging information carries the correlation identifier of the data flow of the application borne by the TDF entity, so that the charging system performs, according to the correlation identifier of the data flow of the application borne by the TDF entity and a correlation identifier of a data flow borne by a policy and charging enforcement function PCEF entity, correlation processing for the first charging information and second charging information that is sent by the PCEF entity to the charging system, where the second charging information carries the correlation identifier of the data flow borne by the PCEF entity.

In a first possible implementation, the sending module is specifically configured to send, when a reporting trigger condition of the TDF entity is satisfied, the first charging information to the charging system, so that the charging system sends, according to the correlation identifier of the data flow of the application borne by the TDF entity, to the PCEF entity an indication message for instructing the PCEF entity to send the second charging information to the charging system.

In a second possible implementation, the TDF entity further includes: a first receiving module, configured to receive, before the sending module sends the first charging information to the charging system, an indication message that is sent by the charging system according to the correlation identifier of the data flow borne by the PCEF entity and instructs the TDF entity to send the first charging information; where the sending module is specifically configured to respond to the indication message by sending the first charging information to the charging system.

With reference to the second possible implementation of the fifth aspect, in a third possible implementation, the indication message carries the correlation identifier of the data flow borne by the PCEF entity; and the sending module is specifically configured to send charging information that is of the data flow of the application borne by the TDF entity and is corresponding to the correlation identifier of the data flow borne by the PCEF entity, to the charging system.

With reference to the fifth aspect or any one possible implementation of the first to third possible implementations of the fifth aspect, in a fourth possible implementation, the TDF entity further includes: a second receiving module, configured to receive an application charging policy sent by a policy and charging rules function PCRF entity, where the application charging policy includes the correlation identifier of the data flow of the application borne by the TDF entity; where the acquiring module is specifically configured to acquire, according to the application charging policy, the correlation identifier of the data flow of the application borne by the TDF entity; and the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; or the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group.

With reference to the fourth possible implementation of the fifth aspect, in a fifth possible implementation, the application charging policy includes correlation identifiers of data flows of all applications on the TDF entity and flow templates corresponding to the correlation identifiers of the data flows of all the applications on the TDF entity; and the acquiring module is specifically configured to acquire, according to the correlation identifiers of the data flows of all the applications on the TDF entity and the flow templates corresponding to the correlation identifiers of the data flows of all the applications on the TDF entity, the correlation identifier of the data flow of the application borne by the TDF entity.

With reference to the fifth aspect or any one possible implementation of the first to third possible implementations of the fifth aspect, in a sixth possible implementation, the correlation identifier of the data flow of the application borne by the TDF entity includes a fourth identifier and a fifth identifier, and the correlation identifier of the data flow borne by the PCEF entity includes the fourth identifier and the fifth identifier, where the fourth identifier indicates a bearer to which the data flow belongs on the PCEF entity and a corresponding rating group, and the fifth identifier is used to identify the data flow of the application; and the TDF entity further includes: a third receiving module, configured to receive a data packet that is sent by the PCEF entity and carries the fourth identifier; and a determining module, configured to determine the fifth identifier of the data flow of the application borne by the TDF entity; where the acquiring module is specifically configured to acquire, according to the data packet that is sent by the PCEF entity and carries the fourth identifier, the fourth identifier of the data flow of the application borne by the TDF entity, and acquire the fifth identifier, which is determined by the determining module, of the data flow of the application borne by the TDF entity; and the sending module is further configured to send a data packet that carries the fifth identifier to the PCEF entity, so that the PCEF entity acquires, according to the data packet that carries the fifth identifier, the fifth identifier of the data flow borne by the PCEF entity.

With reference to the fifth aspect or any one possible implementation of the first to sixth possible implementations of the fifth aspect, in a seventh possible implementation, the sending module is further configured to send, before sending the first charging information to the charging system, a first quota request to the charging system, where the first quota request carries the correlation identifier of the data flow of the application borne by the TDF entity and the rating group of the application, so that the charging system allocates a first quota according to the rating group of the application; and the TDF entity further includes: a fourth receiving module, configured to receive the first quota sent by the charging system.

According to a sixth aspect, a charging policy and charging enforcement function entity PCEF entity is provided and includes: an acquiring module, configured to acquire a correlation identifier of a data flow borne by the PCEF entity; and a sending module, configured to send second charging information to a charging system, where the second charging information carries the correlation identifier of the data flow borne by the PCEF entity, so that the charging system performs, according to the correlation identifier of the data flow borne by the PCEF entity and a correlation identifier of a data flow of an application borne by a traffic detection function TDF entity, correlation processing for the second charging information and first charging information that is sent by the TDF entity to the charging system, where the first charging information carries the correlation identifier of the data flow of the application borne by the TDF entity.

In a first possible implementation, the sending module is specifically configured to send, when a reporting trigger condition of the PCEF entity is satisfied, the second charging information to the charging system, so that the charging system sends, according to the correlation identifier of the data flow borne by the PCEF entity, to the TDF entity an indication message for instructing the TDF entity to send the first charging information to the charging system.

In a second possible implementation, the PCEF entity further includes: a first receiving module, configured to receive, before the sending module sends the second charging information to the charging system, an indication message that is sent by the charging system according to the correlation identifier of the data flow of the application borne by the TDF entity and instructs the PCEF entity to send the second charging information; where the sending module is specifically configured to respond to the indication message by sending the second charging information to the charging system.

With reference to the sixth possible implementation of the sixth aspect, in a third possible implementation, the indication message carries the correlation identifier of the data flow of the application borne by the TDF entity; and the sending module is specifically configured to send charging information that is of the data flow borne by the PCEF entity and is corresponding to the correlation identifier of the data flow of the application borne by the TDF entity, to the charging system.

With reference to the sixth aspect or any one possible implementation of the first to third possible implementations of the sixth aspect, in a fourth possible implementation, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; and the PCEF entity further includes: a second receiving module, configured to receive a data flow charging policy sent by a PCRF entity, where the data flow charging policy includes the first identifier and the second identifier of the data flow borne by the PCEF entity; where the acquiring module is specifically configured to acquire, according to the data flow charging policy, the first identifier and the second identifier of the data flow borne by the PCEF entity.

With reference to the sixth aspect or any one possible implementation of the first to third possible implementations of the sixth aspect, in a fifth possible implementation, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; and the PCEF entity further includes: a first determining module, configured to determine the first identifier of the data flow borne by the PCEF entity; and a third receiving module, configured to receive a data flow charging policy sent by a PCRF entity, where the data flow charging policy includes the second identifier of the data flow borne by the PCEF entity; where the acquiring module is specifically configured to acquire the first identifier, which is determined by the first determining module, of the data flow borne by the PCEF entity, and acquire, according to the data flow charging policy, the second identifier of the data flow borne by the PCEF entity; and the sending module is further configured to send the first identifier of the data flow borne by the PCEF entity to the PCRF entity.

With reference to the sixth aspect or any one possible implementation of the first to third possible implementations of the sixth aspect, in a sixth possible implementation, the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group; and the PCEF entity further includes: a fourth receiving module, configured to receive a data flow charging policy sent by a PCRF entity, where the data flow charging policy includes the third identifier of the data flow borne by the PCEF entity; where the acquiring module is specifically configured to acquire, according to the data flow charging policy, the third identifier of the data flow borne by the PCEF entity.

With reference to the sixth aspect or any one possible implementation of the first to third possible implementations of the sixth aspect, in a seventh possible implementation, the correlation identifier of the data flow of the application borne by the TDF entity includes a fourth identifier and a fifth identifier, and the correlation identifier of the data flow borne by the PCEF entity includes the fourth identifier and the fifth identifier, where the fourth identifier indicates a bearer to which the data flow belongs on the PCEF entity and a corresponding rating group, and the fifth identifier is used to identify the data flow of the application; and the PCEF entity further includes: a second determining module, configured to determine the fourth identifier of the data flow borne by the PCEF entity; and a fifth receiving module, configured to receive a data packet that is sent by the TDF entity and carries the fifth identifier; where the acquiring module is specifically configured to acquire the fourth identifier, which is determined by the second determining module, of the data flow borne by the PCEF entity, and acquire, according to the data packet that is sent by the TDF entity and carries the fifth identifier, the fifth identifier of the data flow borne by the PCEF entity; and the sending module is further configured to send a data packet that carries the fourth identifier to the TDF entity, so that the TDF entity acquires, according to the data packet that carries the fourth identifier, the fourth identifier of the data flow of the application borne by the TDF entity.

With reference to the sixth aspect or any one possible implementation of the first to seventh possible implementations of the sixth aspect, in an eighth possible implementation, the sending module is further configured to send, before sending the second charging information to the charging system, a second quota request to the charging system, where the second quota request carries the correlation identifier of the data flow borne by the PCEF entity and the rating group of the data flow, so that the charging system allocates a second quota according to the rating group of the data flow; and the PCEF entity further includes: a sixth receiving module, configured to receive the second quota sent by the charging system.

According to a seventh aspect, a charging system is provided and includes: a first receiving module, configured to receive first charging information sent by a traffic detection function TDF entity, where the first charging information carries a correlation identifier of a data flow of an application borne by the TDF entity; a second receiving module, configured to receive second charging information sent by a policy and charging enforcement function entity PCEF entity, where the second charging information carries a correlation identifier of a data flow borne by the PCEF entity; and a processing module, configured to perform correlation processing for the first charging information and the second charging information according to the correlation identifier of the data flow of the application borne by the TDF entity and the correlation identifier of the data flow borne by the PCEF entity.

In a first possible implementation, the first receiving module is specifically configured to receive the first charging information sent by the TDF entity to the charging system when a reporting trigger condition of the TDF entity is satisfied; and the charging system further includes a first sending module, configured to: before the second receiving module receives the second charging information sent by the policy and charging enforcement function entity PCEF entity, send, according to the correlation identifier of the data flow of the application borne by the TDF entity, an indication message to the PCEF entity for instructing the PCEF entity to send the second charging information; where the second receiving module is specifically configured to receive the second charging information sent by the PCEF entity in response to the indication message.

With reference to the first possible implementation of the seventh aspect, in a second possible implementation, the indication message carries the correlation identifier of the data flow of the application borne by the TDF entity; and the second receiving module is specifically configured to receive charging information sent by the PCEF entity, where the charging information is charging information that is of the data flow borne by the PCEF entity and is corresponding to the correlation identifier of the data flow of the application borne by the TDF entity.

In a third possible implementation, the second receiving module is specifically configured to receive the second charging information sent by the PCEF entity to the charging system when a reporting trigger condition of the PCEF entity is satisfied; and the charging system further includes a second sending module, configured to: before the first receiving module receives the first charging information sent by the traffic detection function TDF entity, send, according to the correlation identifier of the data flow borne by the PCEF entity, an indication message to the TDF entity for instructing the TDF entity to send the first charging information; where the first receiving module is specifically configured to receive the first charging information sent by the TDF entity in response to the indication message.

With reference to the third possible implementation of the seventh aspect, in a fourth possible implementation, the indication message carries the correlation identifier of the data flow borne by the PCEF entity; and the first receiving module is specifically configured to receive charging information sent by the TDF entity, where the charging information is charging information that is of the data flow of the application borne by the TDF entity and is corresponding to the correlation identifier of the data flow borne by the PCEF entity.

With reference to the seventh aspect or any one possible implementation of the first to fourth possible implementations of the seventh aspect, in a fifth possible implementation, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; or the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group; or the correlation identifier of the data flow of the application borne by the PCEF entity includes a fourth identifier and a fifth identifier, and the correlation identifier of the data flow borne by the PCEF entity includes the fourth identifier and the fifth identifier, where the fourth identifier indicates a bearer to which the data flow belongs on the PCEF entity, and a corresponding rating group, and the fifth identifier is used to identify the data flow of the application.

With reference to the seventh aspect or any one possible implementation of the first to fifth possible implementations of the seventh aspect, in a sixth possible implementation, the charging system further includes: a third receiving module, configured to receive, before the first receiving module receives the first charging information sent by the traffic detection function TDF entity, a first quota request sent by the TDF entity, where the first quota request carries the correlation identifier of the data flow of the application borne by the TDF entity and the rating group of the application, so that the charging system allocates a first quota according to the rating group of the application; a third sending module, configured to send the first quota to the TDF entity; a fourth receiving module, configured to receive, before the second receiving module receives the second charging information sent by the policy and charging enforcement function entity PCEF entity, a second quota request sent by the PCEF entity, where the second quota request carries the correlation identifier of the data flow borne by the PCEF entity and the rating group of the data flow, so that the charging system allocates a second quota according to the rating group of the data flow; and a fourth sending module, configured to send the second quota to the PCEF entity.

With reference to the seventh aspect or any one possible implementation of the first to sixth possible implementations of the seventh aspect, in a seventh possible implementation, the processing module is specifically configured to determine charging information of a same correlation identifier in the first charging information and the second charging information, and perform charging for the charging information of the same correlation identifier by using different charging policies.

According to an eighth aspect, a policy and charging rules function entity PCRF entity is provided and includes: a determining module, configured to determine a data flow charging policy, where the data flow charging policy includes second charging correlation information, and determine an application charging policy, where the application charging policy includes first charging correlation information; and a sending module, configured to send the data flow charging policy to a policy and charging enforcement function entity PCEF entity, so that the PCEF entity generates, according to the data flow charging policy, second charging information that carries a correlation identifier of a data flow borne by the PCEF entity, and configured to send the application charging policy to a traffic detection function TDF entity, so that the TDF entity generates, according to the application charging policy, first charging information that carries a correlation identifier of a data flow of an application borne by the TDF entity, where the correlation identifier of the data flow borne by the PCEF entity and the correlation identifier of the data flow of the application borne by the TDF entity are used by a charging system to perform correlation processing for the first charging information and the second charging information.

In a first possible implementation, the second charging correlation information includes the correlation identifier of the data flow borne by the PCEF entity, and the first charging correlation information includes the correlation identifier of the data flow of the application borne by the TDF entity; the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; or the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group.

In a second possible implementation, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; the second charging correlation information includes the second identifier of the data flow borne by the PCEF entity, and the first charging correlation information includes the first identifier and the second identifier of the data flow of the application borne by the TDF entity; and the PCRF entity further includes: a receiving module, configured to receive, before the sending module sends the application charging policy to the traffic detection function TDF entity, the first identifier, which is sent by the PCEF entity, of the data flow borne by the PCEF entity; where the determining module is specifically configured to determine, according to the first identifier of the data flow borne by the PCEF entity, the first identifier of the data flow of the application borne by the TDF entity.

With reference to the first or second possible implementation of the eighth aspect, in a third possible implementation, the first charging correlation information includes correlation identifiers of data flows of all applications on the TDF entity and flow templates corresponding to the correlation identifiers of the data flows of all the applications on the TDF entity.

According to a ninth aspect, a system is provided and includes the foregoing TDF entity of the fifth aspect, the PCEF entity of the sixth aspect, the charging system of the seventh aspect, and the PCRF entity of the eighth aspect.

Based on the foregoing technical solutions, in the embodiments of the present disclosure, a correlation identifier of a data flow of an application borne by a TDF is carried in first charging information, and a correlation identifier of a data flow borne by a PCEF is carried in second charging information, so that a charging system may perform correlation processing for the charging information of the data flow and the charging information of the application according to the correlation identifier of the data flow of the application borne by the TDF and the correlation identifier of the data flow borne by the PCEF. Thereby, accurate charging can be performed for the data flow and the application, and charging for the application and charging for the data flow are implemented simultaneously.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 7 is a schematic flowchart of a charging method according to still another embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
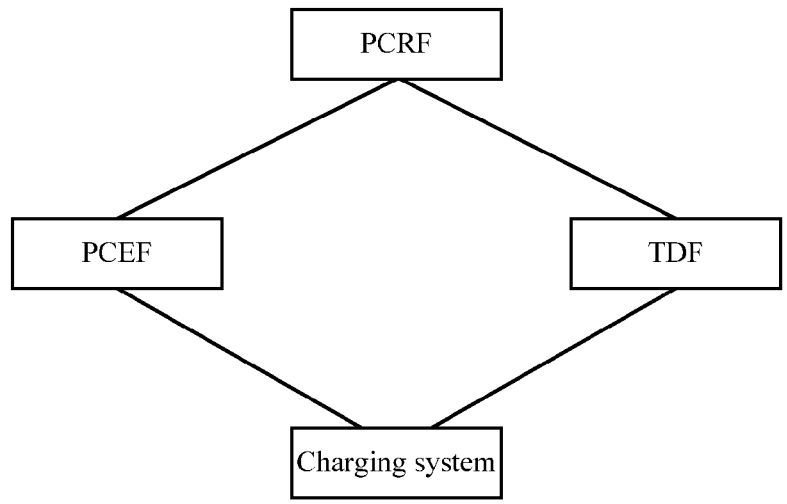
FIG. 1 is a schematic architecture diagram of a system according to an embodiment of the present disclosure.

FIG. 1 is a schematic architecture diagram of a system according to an embodiment of the present disclosure. A PCRF entity is configured to send a control policy and a charging policy to a TDF entity and a PCEF entity.

The PCRF entity interwork with the PCEF entity through a Gx interface to implement delivery of a flow control policy and a flow charging policy, where the Gx interface is an interface on a public data network (Public Data Network, PDN) level. A PDN level interface corresponds to an IP-CAN session (IP-CAN Session) in an evolved packet core (Evolved Packet Core, EPC) network, and corresponds to a PDN connection (PDN Connection) in a general packet radio service (General Packet Radio Service, GPRS) network. The concept is compliance with 3GPP 23.203, and a collective term PDN level is used hereinafter.

The PCRF entity interworks with the TDF entity through an Sd interface to implement delivery of application detection and application control policies and implement delivery of an application charging policy, where the Sd interface is a PDN level interface.

A charging interface exists between the PCEF entity and a charging system, and is used to report collected usage information of a data flow (charging information of the data flow) and implement charging based on the data flow. If the charging system is an OCS, the charging interface is further used to perform credit control (Credit Control), for example, to request a quota. The charging interface is a bearer level interface, and corresponds to a Packet Data Protocol (Packet Data Protocol, PDP) context (PDP Context) in a GPRS network, and corresponds to an IP bearer (IP CAN Bearer) in an EPC network. PDP context and IP-CAN bearer are collectively known as bearer. One Gx session may correspond to multiple charging sessions.

A charging interface exists between the TDF entity and the charging system, and is used to report collected usage information of an application (charging information of the application) and implement application-based charging. If the charging system is an OCS, the charging interface is further used to perform credit control, for example, to request a quota. The interface is a PDN level interface.

The charging system performs correlation processing for charging information of a data flow and charging information of an application, and performs charging for the data flow and the application.

It should be understood that the architecture diagram of the system shown in FIG. 1 is only an example, and should not constitute any limitation on the protection scope of the present disclosure. For example, the TDF entity and PCEF entity may be disposed in different network devices, or may also be disposed in a same network device, or the TDF entity may also be built into the PCEF entity.

It should also be understood that in the embodiments of the present disclosure, each entity may also be expressed as a device, and each entity may be a separate device or may also be a device disposed in another device. Apparently, "flow" and "data flow" are involved in each embodiment of the present disclosure, and the two terms are interchangeable, that is, "flow" is "data flow".

Figure 2:
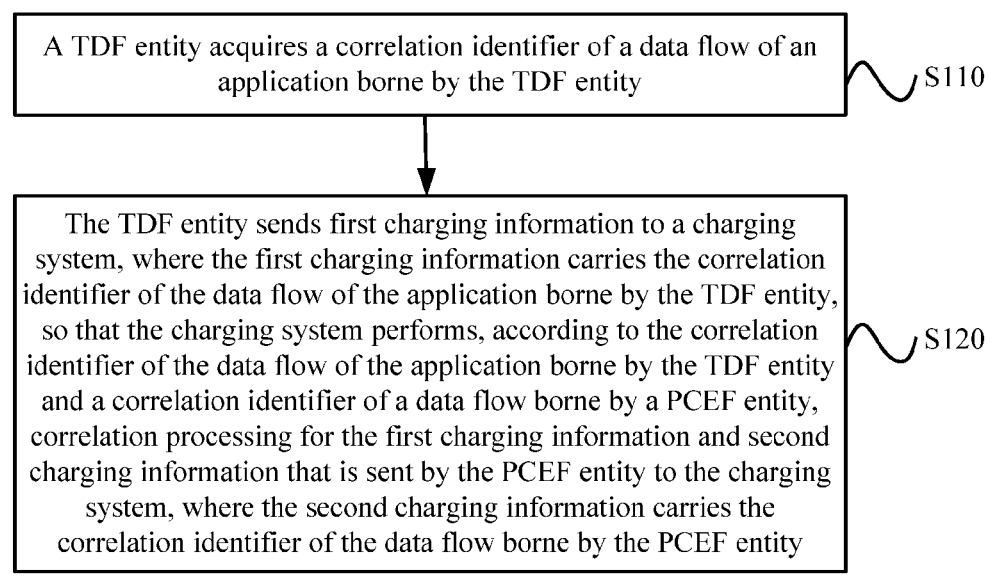
FIG. 2 is a schematic flowchart of a charging method according to an embodiment of the present disclosure.

FIG. 2 shows a schematic flowchart of a charging method 100 according to an embodiment of the present disclosure. As shown in FIG. 2, the method 100 includes:

S110. A TDF entity acquires a correlation identifier of a data flow of an application borne by the TDF entity.

S120. The TDF entity sends first charging information to a charging system, where the first charging information carries the correlation identifier of the data flow of the application borne by the TDF entity, so that the charging system performs, according to the correlation identifier of the data flow of the application borne by the TDF entity and a correlation identifier of a data flow borne by a PCEF entity, correlation processing for the first charging information and second charging information that is sent by the PCEF entity to the charging system, where the second charging information carries the correlation identifier of the data flow borne by the PCEF entity.

In this embodiment of the present disclosure, a TDF entity sends first charging information to a charging system, where the first charging information carries a correlation identifier of a data flow of an application borne by the TDF entity; a PCEF entity sends second charging information to the charging system, where the second charging information carries a correlation identifier of a data flow borne by the PCEF entity; and the charging system performs correlation processing for the first charging information and the second charging information according to the correlation identifiers. Thereby, accurate charging may be performed according to the first charging information and the second charging information, that is, charging for the data flow and charging for the application are implemented simultaneously.

In the charging method according to this embodiment of the present disclosure, a correlation identifier is carried in charging information, so that correlation processing may be performed for charging information of a data flow and charging information of an application. Thereby, accurate charging can be performed for the data flow and the application simultaneously.

It should be understood that in the embodiments of the present disclosure, the terms "first" and "second" are merely intended to distinguish between similar information, but are not intended to indicate a specific order or sequence or limit the embodiments of the present disclosure.

In this embodiment of the present disclosure, the correlation identifier is used to correlate information of a data flow borne by the PCEF entity with information of a data flow of an application borne by the TDF entity. In other words, a data flow passes through the PCEF and TDF sequentially; if the flow belongs to an application, the TDF collects charging information of the flow and uses it for application charging, and the PCEF collects charging information of the flow and uses it for flow charging. To achieve correlation processing in the charging system, it is necessary to add a correlation identifier to the charging information of the flow on the TDF, and add the same correlation identifier to the charging information of the flow on the PCEF, so that the charging information of the data flow of the application on the TDF may be correlated with the charging information of the data flow on the PCEF by using the same correlation identifier. Thereby, the charging system may identify correlated charging information by using the same correlation identifier, so that accurate charging is implemented for the data flow and the application.

In this embodiment of the present disclosure, the PCRF delivers an application charging policy and a data flow charging policy to the TDF and the PCEF respectively. After the TDF receives the charging policy sent by the PCRF, in a case of online charging, the TDF sends a first quota request to the charging system, where the first quota request carries the correlation identifier of the data flow of the application borne by the TDF entity and a rating group of the application, and then the charging system performs quota authorization according to the rating group of the application, and the TDF receives a first quota sent by the charging system. After the PCEF receives the charging policy sent by the PCRF, in a case of online charging, the PCEF sends a second quota request to the charging system, where the second quota request carries the correlation identifier of the data flow borne by the PCEF entity and a rating group of the data flow, and then the charging system performs quota authorization according to the rating group of the data flow, and the PCEF receives a second quota sent by the charging system.

In a service use process, during online charging, if a reporting trigger condition of one entity among the TDF and PCEF is satisfied first, this entity reports charging information to the charging system first; after receiving the reported charging information, the charging system needs to instruct the other entity to also report charging information, so as to perform correlation processing for the charging information of the data flow and the charging information of the application.

Optionally, when a reporting trigger condition of the TDF entity is satisfied first, S120 includes when the reporting trigger condition of the TDF entity is satisfied, the TDF entity sends the first charging information to the charging system, so that the charging system sends, according to the correlation identifier of the data flow of the application borne by the TDF entity, to the PCEF entity an indication message for instructing the PCEF entity to send the second charging information.

In this embodiment, after the reporting trigger condition of the TDF entity is satisfied first, the TDF entity reports charging information to the charging system, that is, the TDF entity sends the first charging information to the charging system, where the first charging information carries the correlation identifier of the data flow of the application borne by the TDF entity. The charging system determines, according to the correlation identifier of the data flow of the application borne by the TDF entity, that a charging session corresponding to the correlation identifier at the PCEF entity is affected, and that correlation processing is required. For example, the charging system determines, according to a fact that the correlation identifier of the data flow of the application borne by the TDF entity is the same as the correlation identifier that is of the data flow borne by the PCEF entity and is obtained during credit authorization, that it is necessary to perform correlation processing for charging information. Therefore, the charging system sends an indication message to the PCEF entity, instructing the PCEF entity to also report charging information. The PCEF entity sends the second charging information to the charging system according to the indication message, where the second charging information carries the correlation identifier of the data flow borne by the PCEF entity. Optionally, if the indication message sent by the charging system carries the correlation identifier of the data flow of the application borne by the TDF entity, the PCEF entity sends only charging information that is of the data flow borne by the PCEF entity and is corresponding to the correlation identifier of the data flow of the application borne by the TDF entity, to the charging system; if the indication message sent by the charging system carries no correlation identifier, the PCEF entity sends charging information in the charging session to the charging system. It is understood that the PCEF entity can send all charging information in the charging session to the charging system.

Optionally, the reporting trigger condition of the TDF entity may be application start, application stop, application instance addition, or application instance removal, and so on.

Optionally, when a reporting trigger condition of the PCEF entity is satisfied first, before S120, the method 100 further includes:

receiving, by the TDF entity, an indication message that is sent by the charging system according to the correlation identifier of the data flow borne by the PCEF entity and instructs the TDF entity to send the first charging information; and S120 includes:

responding, by the TDF entity, to the indication message by sending the first charging information to the charging system.

In this embodiment, after a reporting trigger condition of the PCEF entity is satisfied first, the PCEF entity reports charging information to the charging system, that is, the PCEF entity sends the second charging information to the charging system, where the second charging information carries the correlation identifier of the data flow borne by the PCEF entity. The charging system sends, according to the correlation identifier of the data flow borne by the PCEF entity, to the TDF entity that has a charging session of the same correlation identifier an indication message for instructing the TDF entity to also report charging information. For example, the charging system determines, according to a fact that the correlation identifier of the data flow borne by the PCEF entity is the same as the correlation identifier that is of the data flow of the application borne by the TDF entity and is obtained during credit authorization, that it is necessary to perform correlation processing for charging information. Therefore, the charging system sends an indication message to the TDF entity. The TDF entity sends the first charging information to the charging system according to the indication message, where the first charging information carries the correlation identifier of the data flow of the application borne by the TDF entity.

Optionally, if the indication message sent by the charging system carries the correlation identifier of the data flow borne by the PCEF entity, the TDF entity sends only charging information that is of the data flow of the application borne by the TDF entity and is corresponding to the correlation identifier of the data flow borne by the PCEF entity, to the charging system; if the indication message sent by the charging system carries no correlation identifier, the TDF entity sends all charging information in the charging session to the charging system.

In S110, the TDF entity acquires the correlation identifier of the data flow of the application borne by the TDF entity.

In this embodiment of the present disclosure, there are multiple types of correlation identifiers and also multiple manners of obtaining the correlation identifiers.

Optionally, in an embodiment of the present disclosure, S110 includes:

receiving, by the TDF entity, an application charging policy sent by the PCRF entity, where the application charging policy includes a correlation identifier of a data flow of an application borne by the TDF entity, and acquiring, according to the application charging policy, the correlation identifier of the data flow of the application borne by the TDF entity; where the correlation identifier of the data flow of the application borne by the TDF entity includes a first identifier and a second identifier, and a correlation identifier of a data flow borne by the PCEF entity includes the first identifier and the second identifier, where the first identifier indicates a bearer to which the data flow belongs on the PCEF entity, and the second identifier indicates a rating group corresponding to the data flow on the PCEF entity.

Specifically, the first identifier in this embodiment is allocated by the PCRF to a bearer on the PCEF, where a same first identifier is allocated to flows on the bearer, and may be allocated to all flows on the bearer. The second identifier is allocated by the PCRF to flows that have a same rating group on the PCEF, and a same second identifier is allocated to flows in a PDN that have a same rating group.

That is, in this embodiment, the first identifier and the second identifier are used as correlation identifiers. The first identifier, namely, a bearer identifier, is used to correlate bearer level charging information, or used to correlate charging sessions, where one bearer is corresponding to one bearer identifier. The second identifier is used to correlate flows of a same rating group (Rating Group) on a same bearer. In this embodiment, the PCRF entity determines the first identifier and the second identifier, and sends the first identifier and the second identifier to both the TDF entity and PCRF entity as part of charging policies. Optionally, a rating group of data flow, which is generated by the PCRF entity, may be used as the second identifier. Optionally, when the PCRF entity generates a charging key (Charging Key, where the charging key has a one-to-one correspondence with a rating group), if the PCRF entity also generates a service identifier (Service ID) and specifies, in the charging policy delivered to the PCEF entity, that charging is performed based on Service ID (that is, charging information is distinguished by Rating Group and Service ID), the second identifier may also be defined as an identifier for uniquely identifying a flow corresponding to a combination of Charging Key and Service ID in a PDN, that is, the PCRF entity allocates a same second identifier to flows of a same Rating Group and Service ID on a same bearer.

Specifically, when making a policy decision, the PCRF entity takes into consideration information carried in a request of the PCEF entity, user information and subscription information acquired by the PCRF entity, accumulative data from the charging system, information configured for the PCEF entity, and so on, to generate a control policy and a charging policy. Herein the policies include: a control policy and a charging policy for the PCEF entity, and application detection and control policies, and a charging policy for the TDF entity.

It should be understood that in this embodiment of the present disclosure, there are multiple manners for triggering the PCRF to make a policy decision. For example, policy decision is triggered when the PCEF entity requests a control policy and a charging policy from the PCRF entity, or when the OCS notifies the PCRF entity that an accumulative state changes, or when a trigger condition in the PCRF entity is satisfied, or when the TDF entity detects and reports an "application start/stop" event to the PCRF entity. The embodiments of the present disclosure do not limit the time and condition for triggering policy decision.

The flow control and charging policies generated by the PCRF entity for the PCEF entity include control policies such as a flow template (which is used for flow matching, that is, the control policy and charging policy are applicable to a flow that matches the template), quality of service (Quality of Service, QoS) corresponding to the flow, and gating (Gating), and also include a flow charging policy, where the charging policy allocated to the flow includes: the first identifier and a Charging Key allocated to the flow (a rating group allocated to the flow), which is used as the second identifier. The first identifier is generated by the PCRF entity. Specifically, the PCRF entity allocates a same first identifier to a same bearer in a same PDN, that is, the same first identifier is used for flows that belong to a same bearer in a same Gx session, for example, flows having same QoS in a GPRS network use a same first identifier, and flows having a same quality of service class identifier (QoS-Class-Identifier, QCI) and a same allocation retention priority (Allocation-Retention-Priority, ARP) in an EPC network use a same first identifier, where one or more PCC rules (PCC Rules) may have a same first identifier.

For example, a message for delivering a charging policy to the PCEF entity may be as follows:

---

Charging-Rule-Definition ::= < AVP Header: 1003 >
   { Charging-Rule-Name }
   [ Service-Identifier ]
   [ Rating-Group ] second identifier
   ...
   [ Charging-ID ] first identifier

---

Optionally, if the PCRF entity is able to know correspondence information between all bearers on the PCEF entity and flow templates of the bearers (for example, bearer binding is controlled by the PCRF entity), the PCRF entity allocates the first identifier according to the correspondence information; if the PCRF entity is unable to know correspondence information between bearers on the PCEF entity and the flow templates of the bearers (for example, bearer binding is predefined by the PCEF entity), the PCEF entity reports, in a Gx session request, correspondence information between bears and flow templates of the bearers, and the PCRF entity allocates the first identifier according to the correspondence information between bearers and flow templates which is reported by the PCEF entity. For example, a report message may be as follows:

```
<CC-Request> ::= < Diameter Header: 272, REQ, PXY >
    [ Bearer-Identifier ] bearer identifier
    *[ TFT-Packet-Filter-Information ] flow template
```

After receiving the data flow charging policy sent by the PCRF entity, the PCEF entity acquires, according to the flow control policy and flow charging policy and by matching the flow with flow templates, the first identifier and second identifier of the data flow borne by the PCEF entity.

The PCRF entity generates an application control policy and an application charging policy for the TDF entity when making a policy decision, where the generated application control policy and application charging policy include: an identifier of an application that needs to be detected by the TDF entity, control policies such as QoS limit (Limit), Gating, and redirect (Redirect) corresponding to the application, and an application charging policy, where the charging policy allocated to the application includes: an application Charging Key allocated to the application (namely, an application rating group allocated to the application), and information used for charging correlation, and optionally, may further include additional information for improving charging accuracy.

The information used for charging correlation includes: the first identifier of the data flow of the application, flow information corresponding to the first identifier, and the second identifier corresponding to the flow information corresponding to the first identifier.

Specifically, when the PCRF entity knows flow information of the application detected on the TDF entity (for example, the flow information is reported by the TDF entity to the PCRF entity or is configured by the PCRF entity), the following cases apply: if the PCRF entity determines, according to a relationship between flow information of applications and bearers, that flows of the application are on the same bearer and have a same second identifier, the information used for charging correlation carries the application identifier, the first identifier, and the second identifier which is corresponding to the flow information corresponding to the first identifier; if the PCRF entity determines, according to a relationship between flow information of applications and bearers, that flows of the application are not on the same bearer, or that flows of the application are on the same bearer but have different second identifiers, the information used for charging correlation carries the application identifier, one or more first identifiers, flow information corresponding to the one or more first identifiers, and the second identifier corresponding to the flow information, where the information used for charging correlation may be carried in ADC-Rule-Definition level parameters.

If the PCRF entity does not know the flow information of the application detected on the TDF entity, the information used for charging correlation includes first identifiers of all bearers in a PDN corresponding to a corresponding Gx session, and flow information corresponding to the first identifiers, and second identifiers corresponding to the flow information, where the information used for charging correlation is carried in command level parameters.

The flow information includes a flow template and precedence of the flow template.

In other words, the application charging policy may include correlation identifiers of data flows of all applications on the TDF entity and flow templates corresponding to the correlation identifiers of data flows of all applications on the TDF entity; the TDF entity may determine, by matching the flow templates, the correlation identifier of the data flow of the application borne by the TDF entity.

Optionally, if the charging policy delivered by the PCRF entity to the PCEF entity specifies that charging is performed based on Service ID (that is, charging information is distinguished by Rating Group and Service ID), a combination of Charging Key and Service ID may be used as the second identifier.

The additional information for improving charging accuracy includes: gating (Gating) policy that is configured by the PCRF entity for the PCEF entity and is corresponding to flow information corresponding to the first identifier. After receiving the information, the TDF entity does not collect charging information for data packets whose state is disabled (Disable) (because the packets will be discarded at the PCEF entity).

By using the foregoing method, a correspondence between the first identifier and the flow information of the first identifier is consistent on both the TDF entity and the PCEF entity, and a matching result and processing manner of the PCEF entity are the same as those of the TDF entity, and further, charging information collected on the two sides has comparability.

For example, a message for delivering a charging policy to the TDF entity may be as follows (in this example, the information used for charging correlation is carried in ADC-Rule-Definition level parameters, and only a part of the parameters are listed below):

```
ADC-Rule-Definition ::= < AVP Header: 1094 >
    { ADC-Rule-Name }
    [ TDF-Application-Identifier ]
    ...
    [ Rating-Group ]
    [ Online ]
    [ Offline ]
    [ Metering-Method ]
    * [ Application-Correlation-Info ]
``` where,

Online and Offline are used to tell the TDF entity whether online charging or offline charging is performed for the application;

Rating-Group is an application rating group allocated to the application; Metering-Method indicates a manner of collecting flow information of the application, including: duration, traffic, or traffic and duration, and so on; and Application-Correlation-Info is information used for charging correlation, which may be one piece (for example, if a flow of an application is on a bearer, or if a bearer corresponding to an application is unknown and only one bearer exists in a PDN), or may be multiple pieces (for example, if flows of an application are on multiple bearers, or if a bearer corresponding to an application is unknown and multiple bearers exist in a PDN). Parameters are defined as follows:

```
Application-Correlation-Info::= < AVP Header: XXX >
    { Charging-Id } (first identifier)
    * { Correlation-Flow-Info }
``` where,

Charging-Id is the first identifier;

Correlation-Flow-Info is used to carry flow information corresponding to the first identifier and the second identifier. Correlation-Flow-Info may be defined as follows:

```
Correlation-Flow-Info::= < AVP Header: XXXX >
    * [ Flow-Information ]
      [ Flow-Status ]
      [ Rating-Group ] (second identifier)
      [ Precedence ]
``` where,

Flow-Information is specific data packet filter information of a flow;

Precedence is precedence of the flow;

Flow-Status is a gating policy that is configured by the PCRF entity for the PCEF entity and is corresponding to the flow information corresponding to the first identifier; and Rating-Group is the second identifier corresponding to the flow information corresponding to the first identifier.

The TDF entity acquires, according to the application charging policy sent by the PCRF entity, the first identifier and second identifier of the data flow of the application borne by the TDF entity. Optionally, the TDF entity acquires, according to a correspondence, in the application charging policy, between first identifiers and second identifiers of data flows of all applications on the TDF entity and flow templates of the first identifiers and second identifiers, the first identifier and second identifier of the data flow of the application borne by the TDF entity.

During online charging, when collecting statistics of charging information, the TDF entity puts together charging information of a data packet which belongs to both the application and the flow that is corresponding to the first identifier and second identifier, and the charging information that is put together corresponds to one charging counter (counter).

For example, if the TDF entity detects, by using its deep packet inspection (Deep Packet Inspection, DPI) capability, that a data packet belongs to an application delivered by the PCRF entity, the TDF entity determines, according to flow precedence (namely, a Precedence AVP) delivered by the PCRF entity, an identifier whose corresponding flow (Flow-Information) should match the data packet. After determining the identifier, the TDF entity further determines, according to a value of Flow-Status, whether the data packet will be discarded at the PCEF entity; if yes, information of the data packet is not recorded in the counter; if no, information of the data packet is recorded in the counter which is set specially for the flow corresponding to the application and identifier.

Optionally, if the TDF entity discards uplink data packets, the TDF entity collects statistics of the uplink data packets discarded by the TDF entity, identifies a specific rating group for the discarded uplink data packets and reports the statistics of the discarded uplink data packets and the specific rating group to the charging system, so that the charging system does not perform, according to the specific rating group, charging for correlated data packets reported by the PCEF entity. For example, to ensure that charging accuracy of the PCEF entity is not affected after the TDF entity discards the flow of the application, the TDF entity collects information about the discarded uplink flow of the application, and allocates 0 rating to the collected uplink flow information of the application and reports the collected uplink flow information of the application and the rating 0 to the charging system, so that the charging system adjusts charging at the PCEF entity after correlation.

When the TDF entity sends charging information to the charging system (when a reporting trigger condition of the TDF entity is satisfied first, or when an indication message is received from the charging system), the charging information carries the first identifier and second identifier corresponding to each counter. For example, a CCR message for sending charging information includes one or more of the following: an application identifier corresponding to each counter, a corresponding first identifier and second identifier, a rating group of the application, corresponding usage information (traffic or duration), and so on. Values corresponding to different counters are encapsulated in different AVP groups of MSCC (Multiple-Services-Credit-Control) of the CCR. For example, the message may be as follows:

```
<Multiple-Services-Credit-Control> ::=  < AVP Header: 456 >
    [ Used-Service-Unit ]
    [ CC-Correlation-Id ] first identifier
    [ Application-Id ] (Service-ID may also be used)
        [ Rating-Group ] (Rating Group of the application)
    [ Related-Rating-Group ] (second identifier)
```

If the charging policy delivered by the PCRF entity to the TDF entity does not include additional information for improving charging accuracy and if the PCEF entity discards downlink data packets, the PCEF entity collects statistics of the downlink data packets discarded by the PCEF entity when collecting charging information, identifies a specific rating group for the discarded downlink data packets, and reports the statistics of the discarded downlink data packets and the specific rating group to the charging system, so that the charging system does not perform, according to the specific rating group, charging for correlated data packets reported by the TDF entity. In subsequent embodiments, when the charging policy delivered by the PCRF entity to the TDF entity does not include additional information for improving charging accuracy, the PCEF entity performs same processing.

When the PCEF entity sends charging information to the charging system (when a reporting trigger condition of the PCEF entity is satisfied first, or when an indication message is received from the charging system), the charging information carries the first identifier and second identifier of the data flow. For example, a CCR message for sending charging information includes one or more of the following: the first identifier, a rating group (also used as the second identifier), usage information (traffic or duration), and so on. For example, the message may be as follows:

```
<CCR> ::= < Diameter Header: 272, REQ, PXY >
    *[ Multiple-Services-Credit-Control ]
     [ CC-Correlation-Id ] first identifier
```

Multiple-Services-Credit-Control carries the following information (only related AVPs are listed below):

```
<Multiple-Services-Credit-Control> ::=  < AVP Header: 456 >
    [ Used-Service-Unit ]
    * [ Service-Identifier ]
    [ Rating-Group ] second identifier
```

The charging system correlates charging information according to the first identifier and second identifier, and performs charging processing for the charging information after correlation processing, by using the rating group of the data flow reported by the PCEF entity and the rating group of the application reported by the TDF entity respectively. That is, the charging system determines correlated charging information according to a fact that the first identifier and second identifier in the charging information of the data flow are the same as those in the charging information of the application, and performs charging according to the correlated charging information. For example, the charging system determines duplicate charging information according to a fact that the first identifier and second identifier in the charging information of the data flow are the same as those in the charging information of the application, and performs charging for non-duplicate charging information after the duplicate charging information is removed.

In the charging method according to this embodiment of the present disclosure, a first identifier indicating a bearer to which a data flow belongs on a PCEF entity and a second identifier indicating a rating group corresponding to the data flow on the PCEF entity are carried in charging information, so that correlation processing may be performed for charging information of a flow and charging information of an application. Thereby, accurate charging can be performed for the flow and the application.

In another embodiment of the present disclosure, the first identifier and the second identifier are also used as correlation identifiers. A difference from the foregoing embodiment lies in a manner of generating the first identifier. In the another embodiment, the PCEF entity generates the first identifier and sends the first identifier to the PCRF entity. Specifically, when a new bearer is set up, or a bearer is modified or a bearer is terminated, the PCEF entity reports the first identifier allocated to the bearer, to the PCRF entity. If a new bearer is set up, the PCEF entity needs to generate a first identifier corresponding to the new bearer; and if a bearer is modified or terminated, an original first identifier allocated to the bearer is reported to the PCRF entity. If a new bearer is set up or a bearer is modified, the PCEF entity further needs to report flow filter information of the bearer when reporting a bearer identifier, where the flow filter information is flow template information bound to the bearer and used to match a flow with the bearer. If a bearer is terminated, flow filter information of the bearer may not be reported. For example, a report message may be as follows:

```
<CC-Request> ::= < Diameter Header: 272, REQ, PXY >
    [ Bearer-Identifier ] first identifier
    [ Bearer-Operation ]
    *[ TFT-Packet-Filter-Information ] flow filter information
corresponding to the first identifier
```

Because the PCEF entity determines the first identifier of the data flow on the PCEF entity, the PCRF entity generates the second identifier (a rating group allocated to the flow may be used as the second identifier), and includes the second identifier into the data flow charging policy generated for the PCEF entity. After receiving the data flow charging policy sent by the PCRF entity, the PCEF entity acquires the second identifier of the data flow on the PCEF entity according to the data flow charging policy.

Correspondingly, the PCRF entity generates an application for the TDF entity when making a policy decision. The PCRF entity determines, according to the first identifier of the data flow borne by the PCEF entity, the first identifier of the flow of the application that needs to be charged; like in the foregoing embodiment, the second identifier is still generated by the PCRF entity. After generating the application charging policy, the PCRF entity delivers the application charging policy to the TDF entity.

The manners in which the TDF entity and the PCEF entity collect charging information and send the charging information to the charging system, and the charging system performs correlation processing for the charging information, are the same as those in the foregoing embodiment, and are not further described herein.

Optionally, in still another embodiment of the present disclosure, S110 includes:

receiving, by the TDF entity, an application charging policy sent by the PCRF entity, where the application charging policy includes a correlation identifier of a data flow of an application borne by the TDF entity, and acquiring, according to the application charging policy, the correlation identifier of the data flow of the application borne by the TDF entity; where the correlation identifier of the data flow of the application borne by the TDF entity includes a third identifier, and a correlation identifier of a data flow borne by the PCEF entity includes the third identifier, where the third identifier indicates a bearer to which the data flow belongs on the PCEF entity and a corresponding rating group.

That is, in this embodiment, the third identifier is used as a correlation identifier. The third identifier is used to uniquely identify a flow of a particular rating group on a particular bearer at the PDN level. Specifically, the PCRF entity allocates a same third identifier to flows of a same rating group on a same bearer of a PDN. Therefore, the third identifier may distinguish between bearers, and may also distinguish between flows of different rating groups on a same bearer. Optionally, when the PCRF entity generates a Charging Key and also generates a Service ID, and specifies, in the charging policy delivered to the PCEF entity, that charging is performed based on Service ID (that is, charging information is distinguished by Rating Group and Service ID), the third identifier may also be defined as an identifier for uniquely identifying a flow corresponding to a combination of Charging Key (namely, the Rating Group) and Service ID in a PDN, that is, the PCRF entity allocates a same third identifier to flows of same Rating Group and Service ID on a same bearer. In this embodiment, the PCRF entity determines the third identifier, and sends the third identifier to the TDF entity and PCRF entity separately as part of charging policies.

Specifically, the data flow charging policy delivered by the PCRF entity to the PCEF entity includes: a Charging Key allocated to the flow (namely, a rating group allocated to the flow) and the third identifier.

For example, a message for delivering a charging policy to the PCEF entity may be as follows:

```
Charging-Rule-Definition ::= < AVP Header: 1003 >
    { Charging-Rule-Name }
    [ Service-Identifier ]
    [ Rating-Group ]
    [ Charging-ID ] third identifier
```

Optionally, if the PCEF entity presets a rating group for a data flow on a bearer, and the PCRF entity does not perform reallocation, the PCEF entity reports, in a Gx session request, correspondence information between flow templates and rating groups of the flow templates, and the PCRF allocates the third identifier according to the correspondence information, which is reported by the PCEF entity, between rating groups and flow templates.

After receiving the data flow charging policy sent by the PCRF entity, the PCEF entity acquires, according to the data flow charging policy and by matching the flow with the flow template, the third identifier of the data flow borne by the PCEF entity.

Correspondingly, the application charging policy generated for the TDF entity when the PCRF entity makes a policy decision includes: a Charging Key allocated to the application (namely, an application rating group allocated to the application) and information used for charging correlation, and optionally, may further include additional information for improving charging accuracy.

The information used for charging correlation includes the third identifier, and optionally, may further include flow information corresponding to the third identifier.

Specifically, if the PCRF entity knows the flow information of the application detected on the TDF entity (if this flow information is reported by the TDF entity to the PCRF entity or is configured by the PCRF entity), the following cases apply: if the PCRF entity determines, according to a correspondence relationship between the flow information of the application and the third identifier, that the flow of the application is corresponding to only one third identifier, the information used for charging correlation may carry only the application identifier and the third identifier, and does not carry the flow information corresponding to the third identifier; or if the flow of the application is corresponding to multiple third identifiers, the information used for charging correlation carries the application identifier, the multiple third identifiers, and flow information parameters corresponding to the multiple third identifiers, where the information used for charging correlation is carried in ADC-Rule-Definition level parameters.

If the PCRF entity does not know the flow information of the application detected on the TDF entity, the information used for charging correlation includes all third identifiers in a PDN corresponding to a corresponding Gx session, and flow information parameters corresponding to the third identifiers, where the information used for charging correlation is carried in command level parameters.

The flow information includes a flow template and precedence of the flow template.

In other words, the application charging policy may include correlation identifiers of data flows of all applications on the TDF entity and flow templates (namely, flow information) corresponding to correlation identifiers of data flows of all applications on the TDF entity; the TDF entity may determine, the correlation identifier of the data flow of the application borne by the TDF entity.

The additional information for improving charging accuracy includes: a gating (Gating) policy that is configured by the PCRF entity for the PCEF entity and is corresponding to flow information corresponding to the third identifier. After receiving the information, the TDF entity does not collect charging information for data packets whose state is Disable (because the packets will be discarded at the PCEF entity).

For example, a message for delivering a charging policy to the TDF entity may be as follows (in this example, the information used for charging correlation is carried in ADC-Rule-Definition level parameters, and only a part of parameters are listed below):

```
ADC-Rule-Definition ::= < AVP Header: 1094 >
    { ADC-Rule-Name }
    [ TDF-Application-Identifier ]
    ...
    [ Rating-Group ]
    [ Online ]
    [ Offline ]
    [ Metering-Method ]
    * [ Application-Correlation-Info ]
``` where,

Online and Offline are used to tell the TDF entity whether online charging or offline charging is performed for the application;

Rating-Group is a rating group allocated to the application;

Metering-Method indicates a manner of collecting flow information of the application, including: duration, traffic, or traffic and duration, and so on; and Application-Correlation-Info is information used for charging correlation, which may be one piece (if a flow of an application is corresponding to one third identifier, or if flow information of an application is unknown and only one third identifier exists in a PDN), or may be multiple pieces (if flows of an application are corresponding to multiple third identifiers, or if flow information of an application is unknown and multiple third identifiers exist in a PDN). A specific definition of the AVP is as follows:

```
Application-Correlation-Info::= < AVP Header: XXXX >
    * [ Flow-Information ]
    [ Flow-Status ]
    [ Application-Charging-ID] third identifier
    [ Precedence ]
    *[ AVP ]
``` where,

Flow-Information is specific data packet filter information of a flow;

Precedence is precedence of the flow;

Flow-Status is a gating policy that is configured by the PCRF entity for the PCEF entity and is corresponding to the flow information corresponding to the third identifier; and Application-Charging-ID is the third identifier.

The TDF entity acquires, according to the application charging policy sent by the PCRF entity, the third identifier of the data flow of the application borne by the TDF entity. Optionally, the TDF entity acquires, according to third identifiers of data flows of all applications on the TDF entity and flow templates corresponding to the third identifiers in the application charging policy, the third identifier of the data flow of the application borne by the TDF entity.

During online charging, when collecting statistics of charging information, the TDF entity puts together charging information of a data packet which belongs to both the application and the flow corresponding to the third identifier, where the charging information that is put together is corresponding to one counter.

For example, if the TDF entity detects, by using its DPI capability, that a data packet belongs to an application delivered by the PCRF entity, the TDF entity determines, according to flow precedence (namely, a Precedence AVP) delivered by the PCRF entity, an identifier whose corresponding flow (Flow-Information) should match the data packet. After determining the identifier, the TDF entity further determines, according to a value of Flow-Status, whether the data packet will be discarded at the PCEF entity; if yes, information of the data packet is not recorded in the counter; if no, information of the data packet is recorded in the counter which is set specially for the flow corresponding to the application and identifier.

Optionally, if the TDF entity discards uplink data packets, the TDF entity collects statistics of the uplink data packets discarded by the TDF entity, identifies a specific rating group for the discarded uplink data packets and reports the statistics of the discarded uplink data packets and the specific rating group to the charging system, so that the charging system does not perform, according to the specific rating group, charging for correlated data packets reported by the PCEF entity. For example, to ensure that charging accuracy of the PCEF entity is not affected after the TDF entity discards the flow of the application, the TDF entity collects information about the discarded uplink flow of the application, and allocates rating 0 to the collected uplink flow information of the application and reports the collected uplink flow information of the application and the rating 0 to the charging system, so that the charging system adjusts charging at the PCEF entity after correlation.

When the TDF entity sends charging information to the charging system (when a reporting trigger condition of the TDF entity is satisfied first, or when an indication message is received from the charging system), the charging information carries the third identifier corresponding to each counter. For example, a CCR message for sending charging information includes one or more of the following: an application identifier corresponding to each counter, a corresponding third identifier, a rating group of the application, corresponding usage information (traffic or duration), and so on. Values corresponding to different counters are encapsulated in different AVP of MSCC (Multiple-Services-Credit-Control) of the CCR. For example, the message may be as follows:

```
<Multiple-Services-Credit-Control> ::=   < AVP Header: 456 >
                [ Used-Service-Unit ]
[ CC-Correlation-Id ] third identifier
[ Application-Id ] (Service-ID may also be used)
                [ Rating-Group ] (Rating Group of the application)
```

When the PCEF entity sends charging information to the charging system (when a reporting trigger condition of the PCEF entity is satisfied first, or when an indication message is received from the charging system), the charging information carries the third identifier of the flow. For example, a CCR message for sending charging information includes: one or more of the following: the third identifier, a rating group, usage information (traffic or duration), and so on. For example, the message may be as follows:

```
<Multiple-Services-Credit-Control> ::=   < AVP Header: 456 >
                [ Used-Service-Unit ]
* [ Service-Identifier ]
  [ Rating-Group ]
  [ CC-Correlation-Id ] third identifier
```

The charging system correlates charging information according to the third identifier, and performs charging processing for the charging information after correlation processing, by using the rating group of the data flow reported by the PCEF entity and the rating group of the application reported by the TDF entity respectively.

In the charging method according to this embodiment of the present disclosure, a third identifier which indicates a bearer to which a data flow belongs on a PCEF entity and also indicates a corresponding rating group is carried in charging information, so that correlation processing may be performed for charging information of a flow and charging information of an application. Thereby, accurate charging can be performed for the flow and the application.

Optionally, in still another embodiment of the present disclosure, a correlation identifier of a data flow of the application borne by the TDF entity includes a fourth identifier and a fifth identifier, and a correlation identifier of a data flow borne by the PCEF entity includes the fourth identifier and the fifth identifier, where the fourth identifier indicates a bearer to which the data flow belongs on the PCEF entity, and also indicates a corresponding rating group, and the fifth identifier is used to identify the data flow of the application;

S110 includes:

receiving, by the TDF entity, a data packet that is sent by the PCEF entity and carries the fourth identifier, and acquiring, according to the data packet that is sent by the PCEF entity and carries the fourth identifier, the fourth identifier of the data flow of the application borne by the TDF entity; and determining, by the TDF entity, the fifth identifier of the data flow of the application borne by the TDF entity; and the method 100 further includes:

sending, by the TDF entity, a data packet that carries the fifth identifier to the PCEF entity, so that the PCEF entity acquires, according to the data packet that carries the fifth identifier, the fifth identifier of the data flow borne by the PCEF entity.

In this embodiment, the fourth identifier and fifth identifiers are used as correlation identifiers. The fourth identifier is generated by the PCEF entity, and used to uniquely identify a flow of a particular rating group on a particular bearer at the PDN level. The fourth identifier may distinguish between bearers in a PDN, and may also distinguish between flows of different rating groups on a same bearer. Optionally, if the PCRF entity generates a Charging Key and also generates a Service ID, and specifies, in the charging policy delivered to the PCEF entity, that charging is performed based on Service ID (that is, charging information is distinguished by Rating Group and Service ID), the fourth identifier may also be defined as an identifier for uniquely identifying a flow corresponding to a combination of Charging Key (namely, the Rating Group) and Service ID.

The fifth identifier is generated by the TDF entity, and used to uniquely identify a flow of a particular application in a PDN.

The PCEF entity adds the fourth identifier to each uplink data packet, and sends the uplink data packet carrying the fourth identifier to the TDF entity. The TDF entity adds the fifth identifier to each downlink data packet, and sends the downlink data packet carrying the fifth identifier to the PCEF entity.

In this embodiment, the data flow charging policy generated by the PCRF entity for the PCEF entity during policy decision no longer includes a correlation identifier, that is, the PCRF entity may generate the data flow charging policy for the PCEF entity according to the prior art.

After the PCEF entity determines the fourth identifier of the data flow on the PCEF entity, the charging information sent by the PCEF entity to the OCS carries the fourth identifier of the flow. The specific manner of the sending is the same as in the foregoing embodiment, and is not further described herein.

The application charging policy generated by the PCRF entity for the TDF entity during policy decision includes: a Charging Key allocated to the application (namely, an application rating group allocated to the application), a charging mode, (online charging or offline charging), and a manner of collecting charging information (duration, traffic, or duration and traffic, and so on), and optionally, may further include additional information for improving charging accuracy.

For example, a message for delivering a charging policy to the TDF entity may be as follows (only a part of parameters are listed below):

```
ADC-Rule-Definition ::= < AVP Header: 1094 >
                        { ADC-Rule-Name }
                        [ TDF-Application-Identifier ]
                        ...
                        [ Rating-Group ] rating group of the
                        application
                        [ Online ]
                        [ Offline ]
                        [ Metering-Method ]
                     *  [ Additional-Info ]  additional
information for improving charging accuracy
``` where,

Online and Offline are used to tell the TDF entity whether online charging or offline charging is performed for the application;

Rating-Group is a rating group allocated to the application;

Metering-Method indicates a manner of collecting flow information of the application, including: duration, traffic, or traffic and duration, and so on; and Additional-Info is additional information for improving charging accuracy. A specific definition of this AVP is as follows:

```
Additional-Info::= < AVP Header: XXXX >
                   * [ Flow-Information ]
                     [Flow-Status ]
                     [ Precedence }
                   *[ AVP ]
``` where,

Flow-Information is specific data packet filter information of a flow;

Precedence is precedence of the flow; and

Flow-Status is a gating policy corresponding to flow information.

The PCEF entity determines the fourth identifier of the data flow on the PCEF entity, and acquires the fifth identifier of the data flow on the PCEF entity according to the data packet that is sent by the TDF entity and carries the fifth identifier. The TDF entity determines the fifth identifier of the data flow of the application borne by the TDF entity, and acquires, according to the data packet that is sent by the PCEF entity and carries the fourth identifier, the fourth identifier of the data flow of the application borne by the TDF entity.

In the event of online charging, when the TDF entity collects statistics of charging information, the following cases apply: for an uplink data packet, the TDF entity puts together charging information of a data packet which belongs to both the application and the flow corresponding to the fourth identifier, where the charging information that is put together is corresponding to one counter; for a downlink data packet, the TDF entity puts together charging information of a data packet of a flow corresponding to a data packet of the application, where the charging information that is put together is corresponding to one counter.

Optionally, if the TDF entity discards uplink data packets, the TDF entity collects statistics of the uplink data packets discarded by the TDF entity, identifies a specific rating group for the discarded uplink data packets and reports the statistics of the discarded uplink data packets and the specific rating group to the charging system, so that the charging system does not perform, according to the specific rating group, charging for correlated data packets reported by the PCEF entity. For example, to ensure that charging accuracy of the PCEF entity is not affected after the TDF entity discards the flow of the application, the TDF entity collects information about the discarded uplink flow of the application, and allocates rating 0 to the collected uplink flow information of the application and reports the collected uplink flow information of the application and the rating 0 to the charging system, so that the charging system adjusts charging at the PCEF entity after correlation.

When the TDF entity sends charging information to the charging system (when a reporting trigger condition of the TDF entity is satisfied first, or when an indication message is received from the charging system), the charging information carries the fourth identifier and fifth identifier corresponding to each counter, or carries only the fifth identifier (if no fourth identifier exists). For example, a CCR message for sending charging information includes one or more of the following: an application identifier corresponding to each counter, a corresponding fourth identifier and fifth identifier, a rating group of the application, corresponding usage information (traffic or duration), and so on. Values corresponding to different counters are encapsulated in different AVP groups of MSCC (Multiple-Services-Credit-Control) of the CCR. For example, the message may be as follows:

```
<Multiple-Services-Credit-Control> ::=   < AVP Header: 456 >
                     [ Used-Service-Unit ]
   [ Application-Id ] (Service-ID may also be used)
                     [ Rating-Group ] (Rating Group of the application)
   [ Flow-Correlation-Id ] fourth identifier
   [ App-Correlation-Id ] fifth identifier
```

When the PCEF entity sends charging information to the charging system (when a reporting trigger condition of the PCEF entity is satisfied first, or when an indication message is received from the charging system), the charging information carries the fourth identifier and fifth identifier of the data flow on the PCEF entity, or carries only the fourth identifier (if no fifth identifier exists). For example, a CCR message for sending charging information includes one or more of the following: the fourth identifier, the fifth identifier, a rating group, usage information (traffic or duration), and so on. For example, the message may be as follows:

```
<Multiple-Services-Credit-Control> ::=  < AVP Header: 456 >
                                        [ Used-Service-Unit ]
  * [ Service-Identifier ]
                                        [ Rating-Group ]
    [ Flow-Correlation-Id ] fourth identifier
    [ App-Correlation-Id ] fifth identifier
```

The charging system correlates charging information according to the fourth identifier and the fifth identifier, and performs charging processing for the charging information after correlation processing, by using the rating group of the data flow reported by the PCEF entity and the rating group of the application reported by the TDF entity.

In the charging method according to this embodiment of the present disclosure, a fourth identifier which indicates a bearer to which a data flow belongs on a PCEF entity and also indicates a corresponding rating group, and a fifth identifier used to identify a flow of an application are carried in charging information, so that correlation processing may be performed for charging information of a flow and charging information of an application. Thereby, accurate charging can be performed for the flow and the application.

The foregoing has described in detail the charging method from the perspective of a TDF entity. The following will describe the charging method from the perspective of a PCEF entity.

Figure 3:
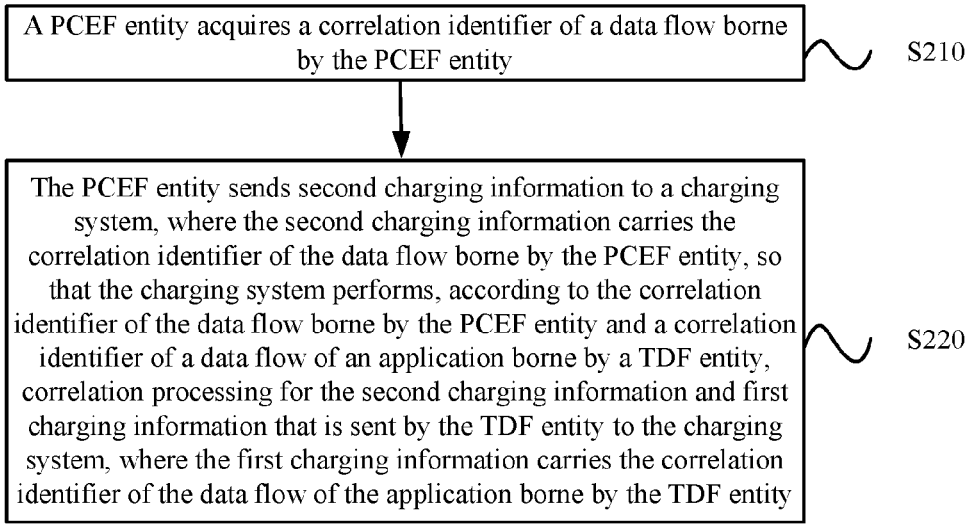
FIG. 3 is a schematic flowchart of a charging method according to another embodiment of the present disclosure.

FIG. 3 shows a schematic flowchart of a charging method 200 according to an embodiment of the present disclosure. As shown in FIG. 3, the method 200 includes:

S210. A PCEF entity acquires a correlation identifier of a data flow borne by the PCEF entity.

S220. The PCEF entity sends second charging information to a charging system, where the second charging information carries the correlation identifier of the data flow borne by the PCEF entity, so that the charging system performs, according to the correlation identifier of the data flow borne by the PCEF entity and a correlation identifier of a data flow of an application borne by a TDF entity, correlation processing for the second charging information and first charging information that is sent by the TDF entity to the charging system, where the first charging information carries the correlation identifier of the data flow of the application borne by the TDF entity.

In this embodiment of the present disclosure, a PCEF entity sends second charging information to a charging system, where the second charging information carries a correlation identifier of a data flow borne by the PCEF entity; a TDF entity sends first charging information to the charging system, where the first charging information carries a correlation identifier of a data flow of an application borne by the TDF entity; and the charging system performs correlation processing for the first charging information and the second charging information according to the correlation identifiers. Thereby, accurate charging may be performed for the first charging information and the second charging information, that is, charging for the data flow and charging for the application are implemented simultaneously.

In the charging method according to this embodiment of the present disclosure, a correlation identifier is carried in charging information, so that correlation processing may be performed for charging information of a data flow and charging information of an application. Thereby, accurate charging can be performed for the data flow and the application simultaneously.

Optionally, before S220, the method 200 further includes:

sending, by the PCEF entity, a second quota request to the charging system, where the second quota request carries the correlation identifier of the data flow borne by the PCEF entity and a rating group of the data flow, so that the charging system may allocate a second quota according to the rating group of the data flow; and receiving, by the PCEF entity, the second quota sent by the charging system.

A PCRF entity delivers an application charging policy to the TDF entity and a data flow charging policy to the PCEF entity. After the PCEF entity receives the charging policy sent by the PCRF entity, in a case of online charging, the PCEF entity sends a second quota request to the charging system, where the second quota request carries the correlation identifier of the data flow borne by the PCEF entity and a rating group of the data flow, and then the charging system performs quota authorization according to the rating group of the data flow, and the PCEF entity receives a second quota sent by the charging system. After the TDF entity receives the charging policy sent by the PCRF entity, in a case of online charging, the TDF entity sends a first quota request to the charging system, where the first quota request carries the correlation identifier of the data flow of the application borne by the TDF entity and a rating group of the application, and then the charging system performs quota authorization according to the rating group of the application, and the TDF entity receives a first quota sent by the charging system.

In a service use process, during online charging, if a reporting trigger condition of one entity among the PCEF entity and TDF entity is satisfied first, this entity reports charging information to the charging system first; after receiving the reported charging information, the charging system needs to instruct the other entity to also report charging information, so as to perform correlation processing for the charging information of the data flow and the charging information of the application.

Therefore, optionally, S220 includes:

when a reporting trigger condition of the PCEF entity is satisfied, sending, by the PCEF entity, the second charging information to the charging system, so that the charging system sends, according to the correlation identifier of the data flow borne by the PCEF entity, to the TDF entity an indication message for instructing the TDF entity to send the first charging information to the charging system.

Optionally, before S220, the method 200 further includes:

receiving, by the PCEF entity, an indication message that is sent by the charging system according to the correlation identifier of the data flow of the application borne by the TDF entity and instructs the PCEF entity to send the second charging information; and S220 includes:

responding, by the PCEF entity, to the indication message by sending the second charging information to the charging system.

Optionally, the indication message carries the correlation identifier of the data flow of the application borne by the TDF entity; and the responding, by the PCEF entity, to the indication message by sending the second charging information to the charging system, includes:

sending, by the PCEF entity, charging information that is of the data flow borne by the PCEF entity and is corresponding to the correlation identifier of the data flow of the application borne by the TDF entity, to the charging system.

Optionally, in an embodiment of the present disclosure, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; and S210 includes:

receiving, by the PCEF entity, a data flow charging policy sent by the PCRF entity, where the data flow charging policy includes the first identifier and the second identifier of the data flow borne by the PCEF entity, and acquiring, according to the data flow charging policy, the first identifier and the second identifier of the data flow borne by the PCEF entity.

Optionally, in another embodiment of the present disclosure, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity;

S210 includes:

determining, by the PCEF entity, the first identifier of the data flow borne by the PCEF entity; and receiving, by the PCEF entity, a data flow charging policy sent by the PCRF entity, where the data flow charging policy includes the second identifier of the data flow borne by the PCEF entity, and acquiring, according to the data flow charging policy, the second identifier of the data flow borne by the PCEF entity; and the method 200 further includes:

sending, by the PCEF entity, the first identifier of the data flow borne by the PCEF entity to the PCRF entity.

Optionally, in still another embodiment of the present disclosure, the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group; and S210 includes:

receiving, by the PCEF entity, a data flow charging policy sent by the PCRF entity, where the data flow charging policy includes the third identifier of the data flow borne by the PCEF entity, and acquiring, according to the data flow charging policy, the third identifier of the data flow borne by the PCEF entity.

Optionally, in still another embodiment of the present disclosure, the correlation identifier of the data flow of the application borne by the TDF entity includes a fourth identifier and a fifth identifier, and the correlation identifier of the data flow borne by the PCEF entity includes the fourth identifier and the fifth identifier, where the fourth identifier indicates a bearer to which the data flow belongs on the PCEF entity and a corresponding rating group, and the fifth identifier is used to identify the data flow of the application;

S210 includes:

determining, by the PCEF entity, the fourth identifier of the data flow borne by the PCEF entity; and receiving, by the PCEF entity, a data packet that is sent by the TDF entity and carries the fifth identifier, and acquiring, according to the data packet that is sent by the TDF entity and carries the fifth identifier, the fifth identifier of the data flow borne by the PCEF entity; and the method 200 further includes:

sending, by the PCEF entity, a data packet that carries the fourth identifier to the TDF entity, so that the TDF entity acquires, according to the data packet that carries the fourth identifier, the fourth identifier of the data flow of the application borne by the TDF entity.

It should be understood that in this embodiment of the present disclosure, interaction between the TDF entity, the PCEF entity, the PCRF entity, and the charging system, and related features and functions thereof are described from the perspective of the TDF entity side, and are corresponding to those described from the perspective of the PCEF entity side. For brevity, no further description is provided herein.

In the charging method according to this embodiment of the present disclosure, a correlation identifier is carried in charging information, so that correlation processing may be performed for charging information of a flow and charging information of an application. Thereby, accurate charging can be performed for the data flow and the application.

A charging method according to an embodiment of the present disclosure is hereinafter described from the perspective of a charging system.

Figure 4:
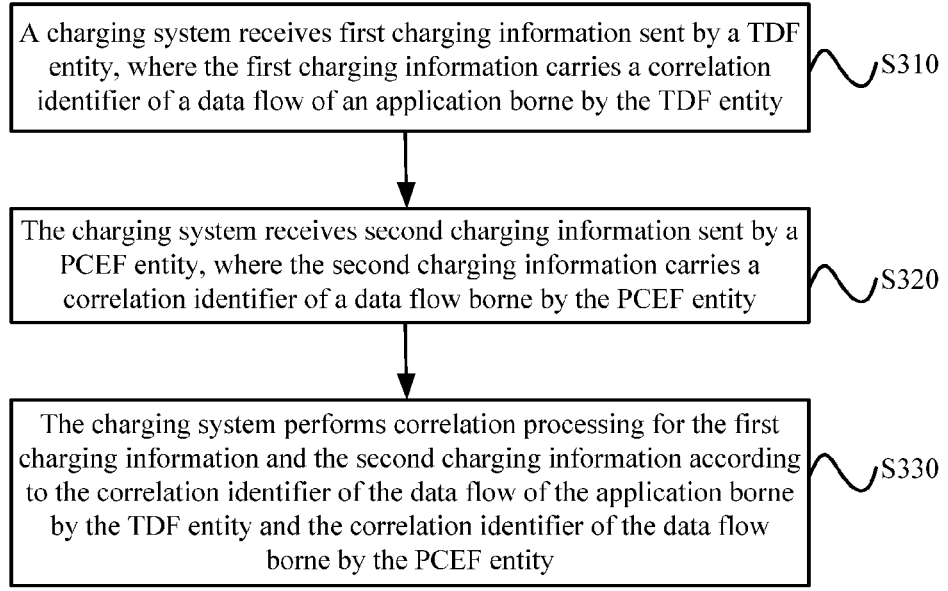
FIG. 4 is a schematic flowchart of a charging method according to still another embodiment of the present disclosure.

FIG. 4 shows a schematic flowchart of a charging method 300 according to an embodiment of the present disclosure. As shown in FIG. 4, the method 300 includes:

S310. A charging system receives first charging information sent by a TDF entity, where the first charging information carries a correlation identifier of a data flow of an application borne by the TDF entity.

S320. The charging system receives second charging information sent by a PCEF entity, where the second charging information carries a correlation identifier of a data flow borne by the PCEF entity.

S330. The charging system performs correlation processing for the first charging information and the second charging information according to the correlation identifier of the data flow of the application borne by the TDF entity and the correlation identifier of the data flow borne by the PCEF entity.

In this embodiment of the present disclosure, a charging system receives first charging information that is sent by a TDF entity and carries a correlation identifier of a data flow of an application borne by the TDF entity, receives second charging information that is sent by a PCEF entity and carries a correlation identifier of a data flow borne by the PCEF entity, and then performs correlation processing for the first charging information and the second charging information. Thereby, accurate charging may be performed for the first charging information and the second charging information, and charging for the data flow and charging for the application are implemented simultaneously.

In the charging method according to this embodiment of the present disclosure, charging information of a flow and charging information of an application, which carry correlation identifiers, are received, and correlation processing is performed for the charging information of the flow and the charging information of the application according to the correlation identifiers. Thereby, accurate charging can be performed for the data flow and the application.

In this embodiment of the present disclosure, optionally, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity.

Optionally, the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group.

Optionally, the correlation identifier of the data flow of the application borne by the PCEF entity includes a fourth identifier and a fifth identifier, and the correlation identifier of the data flow borne by the PCEF entity includes the fourth identifier and the fifth identifier, where the fourth identifier indicates a bearer to which the data flow belongs on the PCEF entity and a corresponding rating group, and the fifth identifier is used to identify the data flow of the application.

In this embodiment of the present disclosure, optionally, before S310, the method 300 further includes:

receiving, by the charging system, a first quota request sent by the TDF entity, where the first quota request carries the correlation identifier of the data flow of the application borne by the TDF entity and the rating group of the application, so that the charging system may allocate a first quota according to the rating group of the application; and sending, by the charging system, the first quota to the TDF entity; and before S320, the method further includes:

receiving, by the charging system, a second quota request sent by the PCEF entity, where the second quota request carries the correlation identifier of the data flow borne by the PCEF entity and the rating group of the data flow, so that the charging system may allocate a second quota according to the rating group of the data flow; and sending, by the charging system, the second quota to the PCEF entity.

Specifically, after the TDF entity and PCEF entity receive charging policies sent by the PCRF entity, in a case of online charging, the TDF entity and PCEF entity respectively send the first quota request and second quota request to the charging system, where the first quota request carries the correlation identifier of the data flow of the application borne by the TDF entity and the rating group of the application, and the second quota request carries the correlation identifier of the data flow borne by the PCEF entity and the rating group of the data flow; the charging system performs quota authorization, sends the first quota and second quota to the TDF entity and PCEF entity respectively, and in subsequent processing of the charging information, determines, according to the correlation identifiers obtained during quota authorization, that it is necessary to perform correlation processing for the charging information.

In a service use process, during online charging, if a reporting trigger condition of one entity among the TDF entity and PCEF entity is satisfied first, this entity reports charging information to the charging system first; after receiving the reported charging information, when determining that it is necessary to perform correlation processing for the charging information, the charging system instructs the other entity to also report charging information, so as to perform correlation processing for the charging information of the data flow and the charging information of the application.

Figure 5:
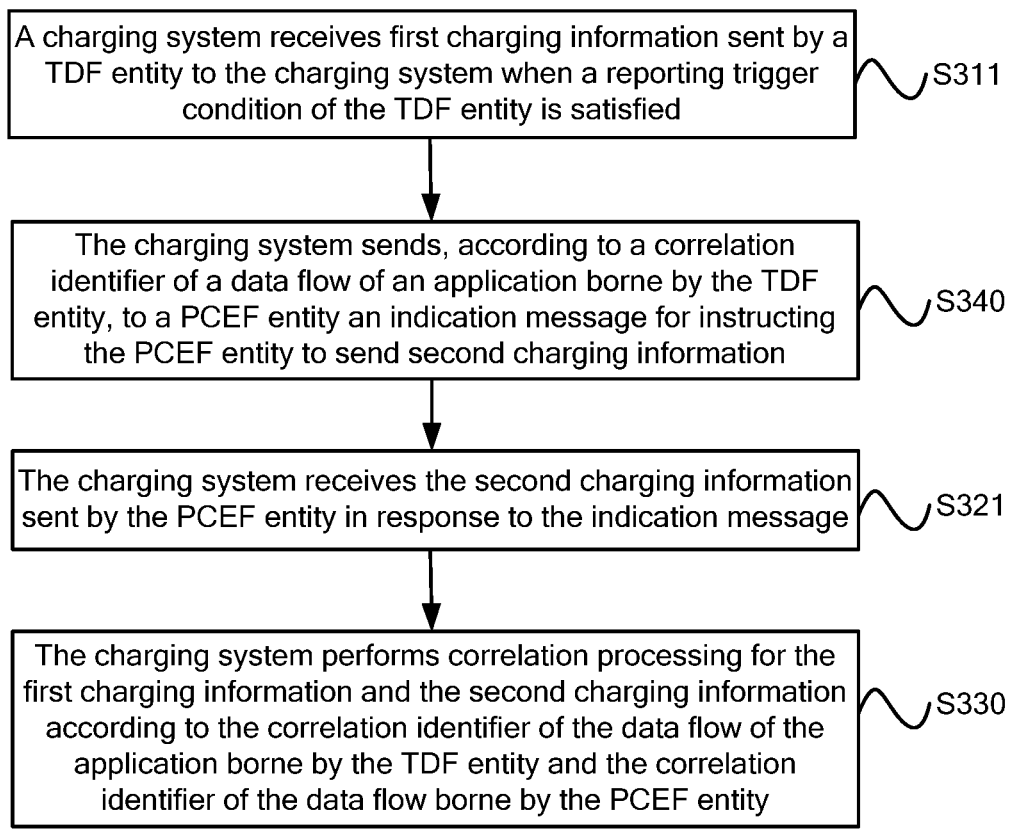
FIG. 5 is another schematic flowchart of a charging method according to still another embodiment of the present disclosure.

Therefore, as shown in FIG. 5, optionally, S310 includes:

S311. The charging system receives the first charging information sent by the TDF entity to the charging system when a reporting trigger condition of the TDF entity is satisfied.

Before S320, the method further includes:

S340. The charging system sends, according to the correlation identifier of the data flow of the application borne by the TDF entity, to the PCEF entity an indication message for instructing the PCEF entity to send the second charging information.

S320 includes:

S321. The charging system receives the second charging information sent by the PCEF entity in response to the indication message.

Optionally, the indication message carries the correlation identifier of the data flow of the application borne by the TDF entity; and S321 includes:

receiving, by the charging system, charging information sent by the PCEF entity, where the charging information is charging information that is of the data flow borne by the PCEF entity and is corresponding to the correlation identifier of the data flow of the application borne by the TDF entity.

Specifically, in this embodiment, after a reporting trigger condition of the TDF entity is satisfied first, the TDF entity sends the first charging information to the charging system, where the first charging information carries the correlation identifier of the data flow of the application borne by the TDF entity. The charging system determines, according to the correlation identifier of the data flow of the application borne by the TDF entity, that a charging session that is of the PCEF entity and is corresponding to the correlation identifier is affected, and that correlation processing is required. For example, the charging system determines, according to a fact that the correlation identifier of the data flow of the application borne by the TDF entity is the same as the correlation identifier that is of the data flow borne by the PCEF entity and is obtained during credit authorization, that it is necessary to perform correlation processing for the charging information. Therefore, the charging system sends an indication message to the PCEF entity, for example, a re-authorization request (Re-Auth-Request, RAR) message, for instructing the PCEF entity to also report charging information.

Optionally, the indication message sent by the charging system may instruct the PCEF entity to report all charging information in the charging session. In this case, the RAR message is the same as the RAR message in the prior art.

Optionally, the indication message sent by the charging system may instruct the PCEF entity to report charging information that needs to be correlated, in the charging session, with the charging information reported by the TDF entity. In this case, the indication message carries the correlation identifier of the data flow of the application borne by the TDF entity, so that the PCEF entity reports the charging information corresponding to the correlation identifier.

For example, when the correlation identifier is the first identifier and second identifier, the charging system delivers, to the PCEF entity, the second identifier in the charging information reported by the TDF entity, so that the PCEF entity reports the charging information corresponding to the second identifier; the RAR message carries the following content:

Rating-Group (Second Identifier)

When the correlation identifier is the third identifier, the charging system delivers, to the PCEF entity, the third identifier in the charging information reported by the TDF entity, so that the PCEF entity reports the charging information corresponding to the third identifier; the RAR message carries the following content:

CC-Correlation-Id (Third Identifier)

When the correlation identifier is the fourth identifier and fifth identifier, scenarios are as follows:

If application charging takes precedence over flow charging, the following cases apply: if the charging information reported by the TDF entity includes the fourth identifier, the charging system delivers the fourth identifier to the PCEF entity, or if the charging information reported by the TDF entity does not include the fourth identifier, the charging system does not deliver the RAR, but directly performs charging processing for the application.

If precedence of application charging and flow charging is not determined, the charging system delivers, to the PCEF entity, the fourth identifier (if the charging information reported by the TDF entity includes the fourth identifier) and fifth identifier in the charging information reported by the TDF entity, so that the PCEF entity reports the charging information corresponding to the fourth identifier (if the charging information reported by the TDF entity includes the fourth identifier) and fifth identifier; for example, the RAR message carries the following content:

| | |
|---|---|
| [ Flow-Correlation-Id ] | fourth identifier |
| [ App-Correlation-Id ] | fifth identifier |

The PCEF entity sends the second charging information to the charging system according to the indication message, where the second charging information carries the correlation identifier of the data flow borne by the PCEF entity. Optionally, if the indication message sent by the charging system carries the correlation identifier of the data flow of the application borne by the TDF entity, the PCEF entity sends only charging information that is of the data flow borne by the PCEF entity and is corresponding to the correlation identifier of the data flow of the application borne by the TDF entity, to the charging system; if the indication message sent by the charging system carries no correlation identifier, the PCEF entity sends all charging information in the charging session to the charging system.

Figure 6:
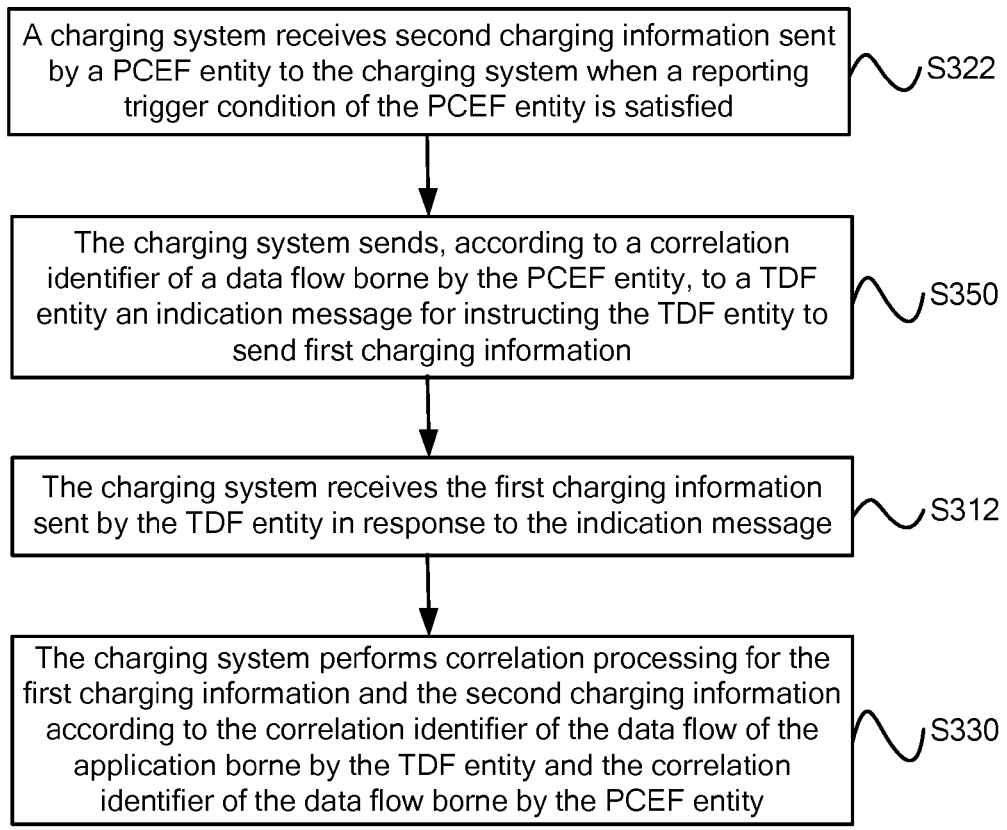
FIG. 6 is still another schematic flowchart of a charging method according to still another embodiment of the present disclosure.

As shown in FIG. 6, optionally, S320 includes:

S322. The charging system receives the second charging information sent by the PCEF entity to the charging system when a reporting trigger condition of the PCEF entity is satisfied.

Before S310, the method 300 further includes:

S350. The charging system sends, according to the correlation identifier of the data flow borne by the PCEF entity, to the TDF entity an indication message for instructing the TDF entity to send the first charging information.

S310 includes:

S312. The charging system receives the first charging information sent by the TDF entity in response to the indication message.

Optionally, the indication message carries the correlation identifier of the data flow borne by the PCEF entity; and S312 includes:

receiving, by the charging system, charging information sent by the TDF entity, where the charging information is charging information that is of the data flow of the application borne by the TDF entity and is corresponding to the correlation identifier of the data flow borne by the PCEF entity.

Specifically, in this embodiment, after a reporting trigger condition of the PCEF entity is satisfied first, the PCEF entity sends the second charging information to the charging system, where the second charging information carries the correlation identifier of the data flow borne by the PCEF entity. The charging system sends, according to the correlation identifier of the data flow borne by the PCEF entity, to the TDF entity an indication message for instructing the TDF entity to also report charging information. For example, the charging system determines, according to a fact that the correlation identifier of the data flow borne by the PCEF entity is the same as the correlation identifier that is of the data flow of the application borne by the TDF entity and is obtained during credit authorization, that it is necessary to perform correlation processing for the charging information. Therefore, the charging system sends an indication message to the TDF entity, for example, an RAR message.

Optionally, the indication message sent by the charging system may instruct the TDF entity to report all charging information in the charging session. In this case, the RAR message is the same as the RAR message in the prior art.

Optionally, the indication message sent by the charging system may instruct the TDF entity to report charging information that needs to be correlated, in the charging session, with the charging information reported by the PCEF entity. In this case, the indication message carries the correlation identifier of the data flow borne by the PCEF entity, so that the TDF entity reports the charging information corresponding to the correlation identifier.

For example, when the correlation identifier is the first identifier and second identifier, the charging system delivers, to the TDF entity, the first identifier and second identifier in the charging information reported by the PCEF entity, so that the TDF entity reports the charging information corresponding to the first identifier and second identifier; the RAR message carries the following content:

Rating-Group (second identifier)

Related-Session-ID (first identifier)

When the correlation identifier is the third identifier, the charging system delivers, to the TDF entity, the third identifier in the charging information reported by the PCEF entity, so that the TDF entity reports the charging information corresponding to the third identifier; the RAR message carries the following content:

CC-Correlation-Id (third identifier)

When the correlation identifier is the fourth identifier and fifth identifier, scenarios are as follows:

If application charging takes precedence over flow charging, the charging system delivers, to the TDF entity, the fourth identifier in the charging information reported by the PCEF entity, so that the TDF entity reports the charging information corresponding to the fourth identifier.

If precedence of application charging and flow charging is not determined, the charging system delivers, to the TDF entity, the fourth identifier and fifth identifier (if the charging information reported by the PCEF entity includes the fifth identifier) in the charging information reported by the PCEF entity, so that the TDF entity reports the charging information corresponding to the fourth identifier and fifth identifier (if the charging information reported by the PCEF entity includes the fifth identifier); for example, the RAR message carries the following content:

| [ Flow-Correlation-Id ] fourth identifier |
| [ App-Correlation-Id ] fifth identifier |

The TDF entity sends the first charging information to the charging system according to the indication message, where the first charging information carries the correlation identifier of the data flow of the application borne by the TDF entity. Optionally, if the indication message sent by the charging system carries the correlation identifier of the data flow borne by the PCEF entity, the TDF entity sends only charging information that is of the data flow of the application borne by the TDF entity and is corresponding to the correlation identifier of the data flow borne by the PCEF entity, to the charging system; if the indication message sent by the charging system carries no correlation identifier, the TDF entity sends all charging information in the charging session to the charging system.

Optionally, S330 includes:

determining, by the charging system, charging information of a same correlation identifier in the first charging information and the second charging information, and performing charging for the charging information of the same correlation identifier by using different charging policies. In this embodiment of the present disclosure, the performing charging by using different charging policies may be removing duplicate charging information from the first charging information and second charging information, and then performing charging after the duplicate charging information is removed from the first charging information and second charging information, or performing charging for the charging information of the same correlation identifier in the first charging information and the second charging information according to the flow charging policy or application charging policy.

The charging system determines the duplicate charging information by using the same correlation identifier in the charging information of the data flow (second charging information) and charging information of the application (first charging information), and performs charging for non-duplicate charging information after the duplicate charging information is removed.

It should be understood that in this embodiment of the present disclosure, interaction between the TDF entity, the PCEF entity, the PCRF entity, and the charging system, related features and functions thereof, which are described from the perspective of the TDF entity side, are corresponding to those described from the perspective of the charging system side. For brevity, no further description is provided herein.

In the charging method according to this embodiment of the present disclosure, charging information of a flow and charging information of an application, which carry correlation identifiers, are received, and correlation processing is performed for the charging information of the flow and the charging information of the application according to the correlation identifiers. Thereby, accurate charging can be performed for the data flow and the application.

A charging method according to an embodiment of the present disclosure is hereinafter described from a perspective of a PCRF entity.

FIG. 7 shows a schematic flowchart of a charging method 400 according to an embodiment of the present disclosure. As shown in FIG. 7, the method 400 includes:

S410. A PCRF entity sends a data flow charging policy to a PCEF entity, where the data flow charging policy includes second charging correlation information, so that the PCEF entity generates, according to the data flow charging policy, second charging information that carries a correlation identifier of a data flow borne by the PCEF entity.

S420. The PCRF entity sends an application charging policy to a TDF entity, where the application charging policy includes first charging correlation information, so that the TDF entity generates, according to the application charging policy, first charging information that carries a correlation identifier of a data flow of an application borne by the TDF entity.

The correlation identifier of the data flow borne by the PCEF entity and the correlation identifier of the data flow of the application borne by the TDF entity are used by a charging system to perform correlation processing for the first charging information and the second charging information.

In this embodiment of the present disclosure, a PCRF entity sends a data flow charging policy to a PCEF entity, and sends an application charging policy to a TDF entity, where charging correlation information is carried in the charging policies, so that the PCEF entity and TDF entity may generate charging information carrying correlation identifiers. Thereby, a charging system performs correlation processing for charging information of a flow and charging information of an application, and further can implement accurate charging for the data flow and the application.

Optionally, the second charging correlation information includes the correlation identifier of the data flow borne by the PCEF entity, and the first charging correlation information includes the correlation identifier of the data flow of the application borne by the TDF entity; and the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity.

Optionally, the second charging correlation information includes the correlation identifier of the data flow borne by the PCEF entity, and the first charging correlation information includes the correlation identifier of the data flow of the application borne by the TDF entity; and the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group.

Optionally, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity;

the second charging correlation information includes the second identifier of the data flow borne by the PCEF entity, and the first charging correlation information includes the first identifier and the second identifier of the data flow of the application borne by the TDF entity; and before S420, the method 400 further includes:

receiving, by the PCRF entity, the first identifier, which is sent by the PCEF entity, of the data flow borne by the PCEF entity, and determining, according to the first identifier of the data flow borne by the PCEF entity, the first identifier of the data flow of the application borne by the TDF entity.

Optionally, the first charging correlation information includes correlation identifiers of data flows of all applications on the TDF entity and flow templates corresponding to the correlation identifiers of the data flows of all the applications on the TDF entity.

It should be understood that in this embodiment of the present disclosure, interaction between the TDF entity, the PCEF entity, the PCRF entity, and the charging system, related features and functions thereof, which are described from the perspective of the TDF entity side, are corresponding to those described from the perspective of the PCRF entity side. For brevity, no further description is provided herein.

In the charging method according to this embodiment of the present disclosure, a data flow charging policy carrying charging correlation information is sent to a PCEF entity, and an application charging policy carrying charging correlation information is sent to a TDF entity, so that the PCEF entity and TDF entity may generate charging information carrying correlation identifiers. Thereby, a charging system performs correlation processing for charging information of a flow and charging information of an application, and further can implement accurate charging for the data flow and the application.

The foregoing has described the charging methods according to the embodiments of the present disclosure from perspectives of the TDF entity, PCEF entity, charging system, and PCRF entity respectively. The following will describe in detail embodiments of the present disclosure with reference to specific examples. It should be understood that these examples are merely used to help a person skilled in the art understand the embodiments of the present disclosure but are not intended to limit the scope of the embodiments of the present disclosure.

Figure 8:
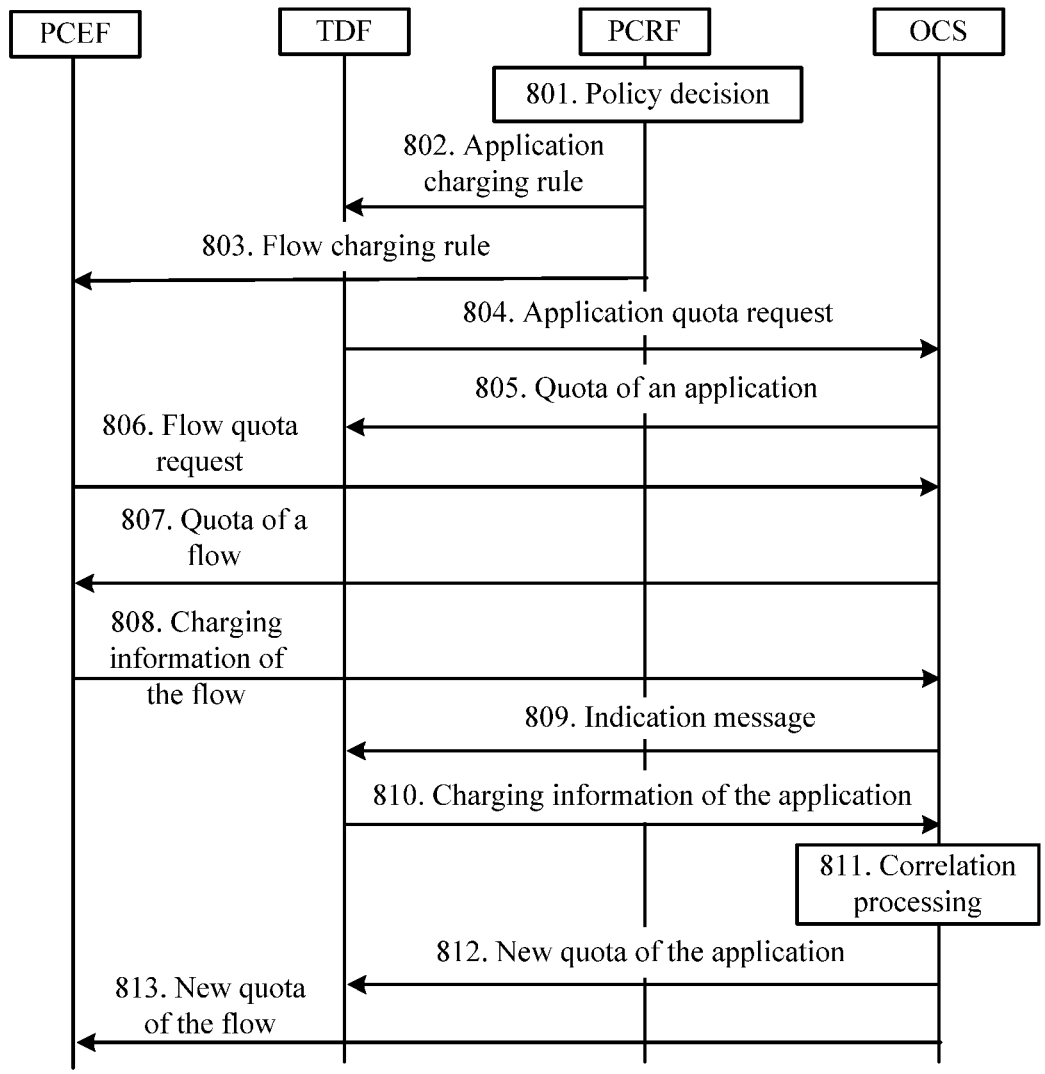
FIG. 8 is a schematic interaction diagram of a charging method according to an embodiment of the present disclosure.

In an embodiment shown in FIG. 8, a first identifier and a second identifier are used as correlation identifiers, and the first identifier and the second identifier are generated by a PCRF entity.

801. The PCRF entity makes a policy decision. The PCRF entity generates a flow control policy and a data flow charging policy for a PCEF entity, where the generated data flow charging policy includes: a first identifier and a Charging Key (used as a second identifier) allocated to a flow. The PCRF entity generates an application control policy and an application charging policy for a TDF entity, where the generated application charging policy includes: an application Charging Key allocated to an application, a first identifier of a data flow of the application, flow information corresponding to the first identifier, and a second identifier corresponding to the flow information corresponding to the first identifier.

802. The PCRF entity delivers an application activation policy to the TDF entity for installation. If no Sd session exists currently, this step is to send an Sd session setup request, where the request carries an application identifier, the application control policy (optional), and the application charging policy. If an Sd session exists currently, this step is to send a request for installing an ADC Rule, where the ADC Rule includes the application identifier, the application control policy (optional), and the application charging policy. The policy delivered in this step includes the application charging policy.

803. The PCRF entity delivers the flow control policy and data flow charging policy to the PCEF entity. The policy delivered in this step includes the data flow charging policy.

804. The TDF entity initiates an application quota request to an OCS according to the application charging policy delivered by the PCRF entity. If online charging is indicated in the charging policy delivered by the PCRF entity, the TDF entity initiates an application quota request (namely, a CCR message) to the OCS, where the request carries a rating group that is allocated to the application and delivered by the PCRF entity, and optionally, carries the first identifier; if the application that needs to be charged for on the TDF entity is corresponding to multiple first identifiers, the CCR message carries the multiple first identifiers; the CCR message is as follows (only related AVPs are listed below):

```
<CCR> ::= < Diameter Header: 272, REQ, PXY >
         *[ Multiple-Services-Credit-Control ]
              *[ CC-Correlation-Id ]
```

Multiple-Services-Credit-Control carries the following information (only related AVPs are listed below):

```
<Multiple-Services-Credit-Control> ::=   < AVP Header: 456 >
                                       [ Requested-Service-Unit ]
                                       [ Rating-Group ]
rating group of the application
```

805. The OCS performs quota authorization, and returns quota authorization information, namely, a credit control answer (Credit-Control-Answer, CCA) message, to the TDF entity.

806. The PCEF entity initiates a flow quota request to the OCS according to the data flow charging policy delivered by the PCRF entity. If online charging is indicated in the charging policy delivered by the PCRF entity, the PCEF entity initiates a flow credit quota request (namely, a CCR message) to the OCS, where the request carries a rating group that is allocated to the flow and delivered by the PCRF entity, and optionally, carries the first identifier; the CCR message is as follows (only related AVPs are listed below):

```
<CCR> ::= < Diameter Header: 272, REQ, PXY >
                 *[ Multiple-Services-Credit-Control ]
  [ CC-Correlation-Id ]
```

Multiple-Services-Credit-Control carries the following information (only related AVPs are listed below):

```
<Multiple-Services-Credit-Control> ::=   < AVP Header: 456 >
                                       [ Requested-Service-Unit ]
   * [ Service-Identifier ]
                                       [ Rating-Group ] rating
group of the data flow
```

807. The OCS performs quota authorization, and returns quota authorization information (namely, a CCA message) to the PCEF entity.

It should be understood that steps 802, 804, and 805 may be performed prior to or subsequent to steps 803, 806, and 807, depending on different scenarios.

In a service use process, a procedure for reporting charging information after a reporting trigger condition of the PCEF entity in online charging is satisfied first is as follows:

808. A charging session on the PCEF entity initiates, to the OCS, a CCR message for reporting charging information (traffic or duration information) of the flow and requesting a new quota. The CCR message includes: the first identifier and second identifier, the rating group of the data flow, and usage information (traffic or duration).

809. The OCS sends an indication message to the TDF entity. The OCS determines, according to a correlation identifier acquired during quota authorization and a correlation identifier reported by the PCEF entity, a charging session of the TDF entity to which an RAR message needs to be delivered, and then delivers the RAR message to the TDF entity, instructing the TDF entity to request re-authorization and report usage information of the application, that is, charging information of the application.

810. According to a requirement of the RAR, the TDF entity reports the charging information of the application by using a CCR message, and requests a new quota. The CCR message includes: the application identifier corresponding to each counter, the corresponding first identifier and second identifier, the rating group of the application, and corresponding usage information (traffic or duration). Values corresponding to different counters are encapsulated in different AVP groups of MSCC (Multiple-Services-Credit-Control) of the CCR.

811. The OCS correlates charging information according to the correlation identifiers reported by the PCEF entity and TDF entity, and performs charging processing for the charging information after correlation processing, by using the rating group of the data flow reported by the PCEF entity and the rating group of the application reported by the TDF entity respectively.

812. The OCS delivers a new authorized quota to the TDF entity.

813. The OCS delivers a new quota to the PCEF entity.

It should be understood that the step 812 may be performed prior to or subsequent to the step 813.

Figure 9:
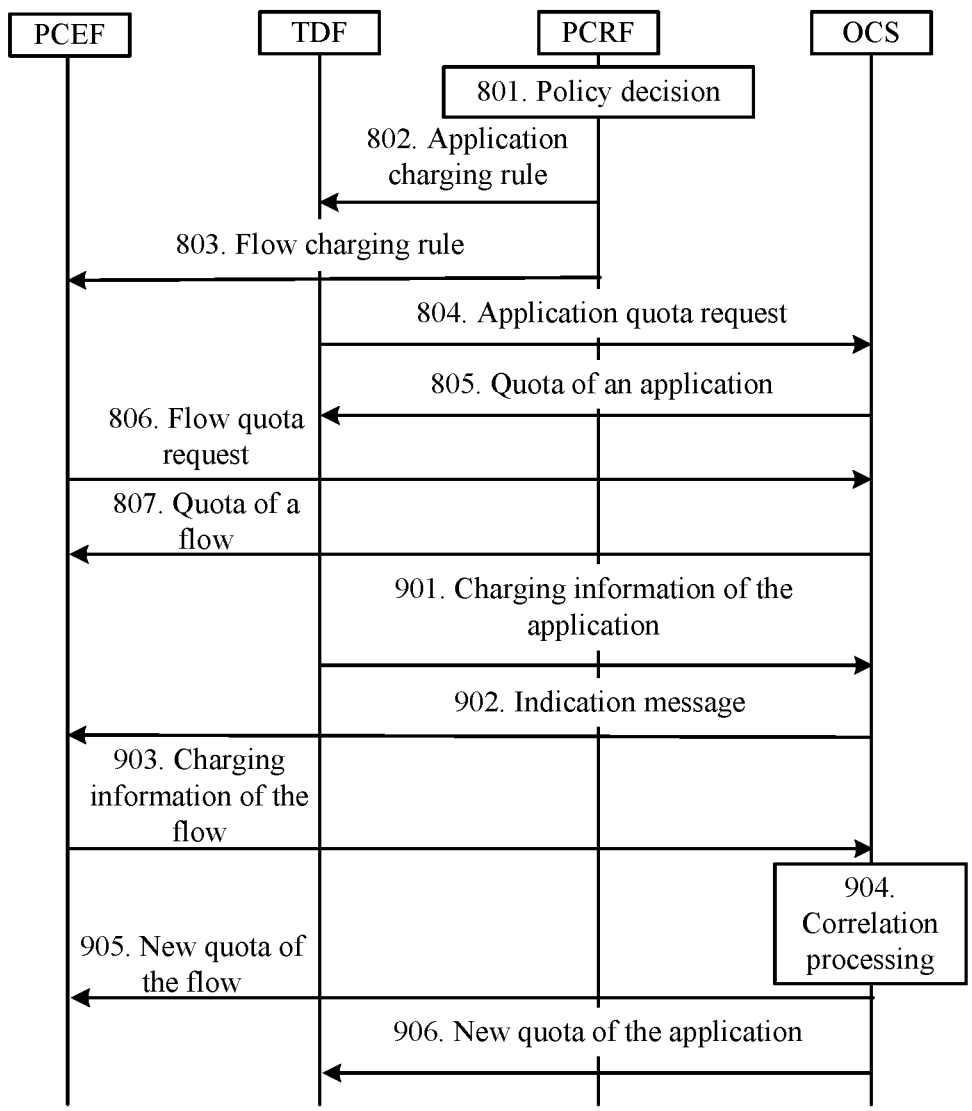
FIG. 9 is a schematic interaction diagram of a charging method according to another embodiment of the present disclosure.

In an embodiment shown in FIG. 9, a first identifier and a second identifier are also used as correlation identifiers, and the first identifier and the second identifier are generated by a PCRF entity. A difference from the embodiment shown in FIG. 8 lies in that in a service use process, a reporting trigger condition of a TDF entity in online charging is satisfied first.

Steps 801 to 807 are the same as those in the embodiment shown in FIG. 8, and are not further described herein.

In a service use process, a procedure for reporting charging information after a reporting trigger condition of the TDF entity in online charging is satisfied first is as follows:

901. A charging session on the TDF entity initiates, to the OCS, a CCR message for reporting charging information (traffic or duration information) and requesting a new quota. The CCR message includes: the application identifier corresponding to a counter, the corresponding first identifier and second identifier, the rating group of the application, and corresponding usage information (traffic or duration). Values corresponding to different counters are encapsulated in different AVP groups of MSCC (Multiple-Services-Credit-Control) of the CCR.

902. The OCS sends an indication message to the PCEF entity. The OCS determines, according to a correlation identifier acquired during quota authorization and a correlation identifier reported by the TDF entity, affected charging sessions of the PCEF entity, and then delivers an RAR message to each affected charging session on the PCEF entity, instructing the PCEF entity to request re-authorization and report usage information of the flow, that is, charging information of the flow.

903. According to a requirement of the RAR, the PCEF entity reports the charging information of the flow by using a CCR message, and requests a new quota. The CCR message includes: the first identifier and second identifier, the rating group corresponding to the flow, and corresponding usage information (traffic or duration).

904. The OCS correlates charging information according to the correlation identifiers reported by the PCEF entity and TDF entity, and performs charging processing for the charging information after correlation processing, by using the rating group of the data flow reported by the PCEF entity and the rating group of the application reported by the TDF entity respectively.

905. The OCS delivers a new authorized quota to the PCEF entity.

906. The OCS delivers a new quota to the TDF entity.

It should be understood that the step 905 may be performed prior to or subsequent to the step 906.

Figure 10:
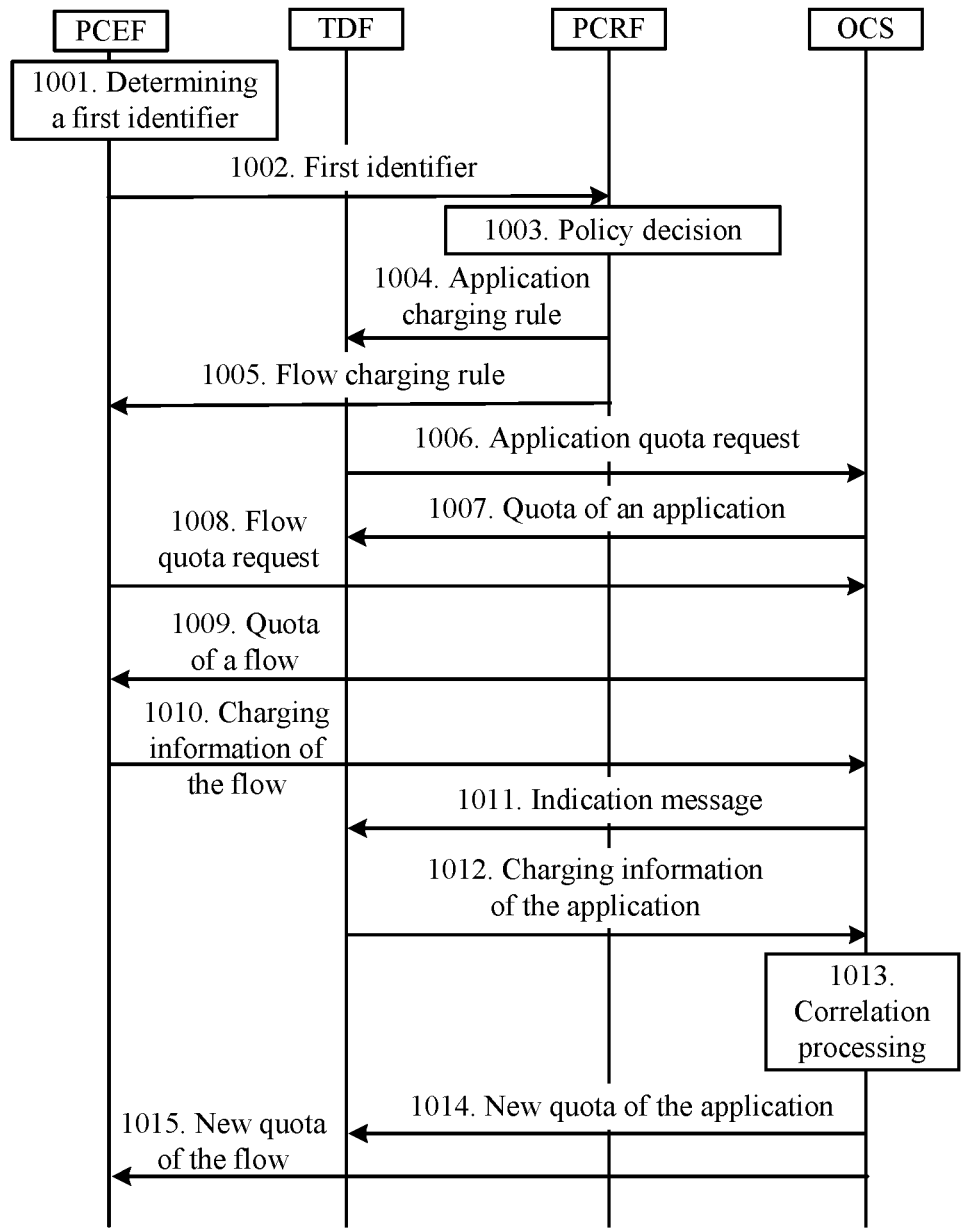
FIG. 10 is a schematic interaction diagram of a charging method according to still another embodiment of the present disclosure.

In an embodiment shown in FIG. 10, a first identifier and a second identifier are used as correlation identifiers, the first identifier is generated by a PCEF entity, and the second identifier is generated by a PCRF entity.

1001. The PCEF entity determines a first identifier. If a new bearer is set up, the PCEF entity needs to generate a first identifier corresponding to the new bearer; or if a bearer is modified or terminated, an original first identifier is allocated to the bearer.

1002. The PCEF entity reports the first identifier to the PCRF entity. When a new bearer is set up, or a bearer is modified, or a bearer is terminated, the PCEF entity reports a bearer identifier, namely, the first identifier, to the PCRF entity. If a new bearer is set up, the PCEF entity needs to generate a first identifier corresponding to the new bearer; or if a bearer is modified or terminated, an original first identifier allocated to the bearer is reported to the PCRF entity. If a new bearer is set up or a bearer is updated, the PCEF entity further needs to report flow filter information of the bearer when reporting a bearer identifier, where the flow filter information is flow template information bound to the bearer and is used to match a flow with the bearer. If a bearer is terminated, flow filter information of the bearer may not be reported.

1003. The PCRF entity makes a policy decision. The PCRF entity generates a flow control policy and a data flow charging policy for the PCEF entity, where the generated data flow charging policy includes: a Charging Key (used as a second identifier) allocated to a flow. The PCRF entity generates an application control policy and an application charging policy for a TDF entity, where the generated application charging policy includes: an application Charging Key allocated to an application, a first identifier of a data flow of the application, flow information corresponding to the first identifier, and a second identifier corresponding to the flow information corresponding to the first identifier.

1004. The PCRF entity delivers an application activation policy to the TDF entity for installation. This step includes the application charging policy generated in step 1003.

1005. The PCRF entity delivers the flow control policy and data flow charging policy to the PCEF entity for installation. This step includes the data flow charging policy generated in step 1003.

Subsequent steps 1006 to 1009 are the same as steps 804 to 807 in FIG. 8.

In a service use process, when a reporting trigger condition of the PCEF entity in online charging is satisfied first, subsequent steps 1010 to 1015 are the same as steps 809 to 813 in FIG. 8.

Figure 11:
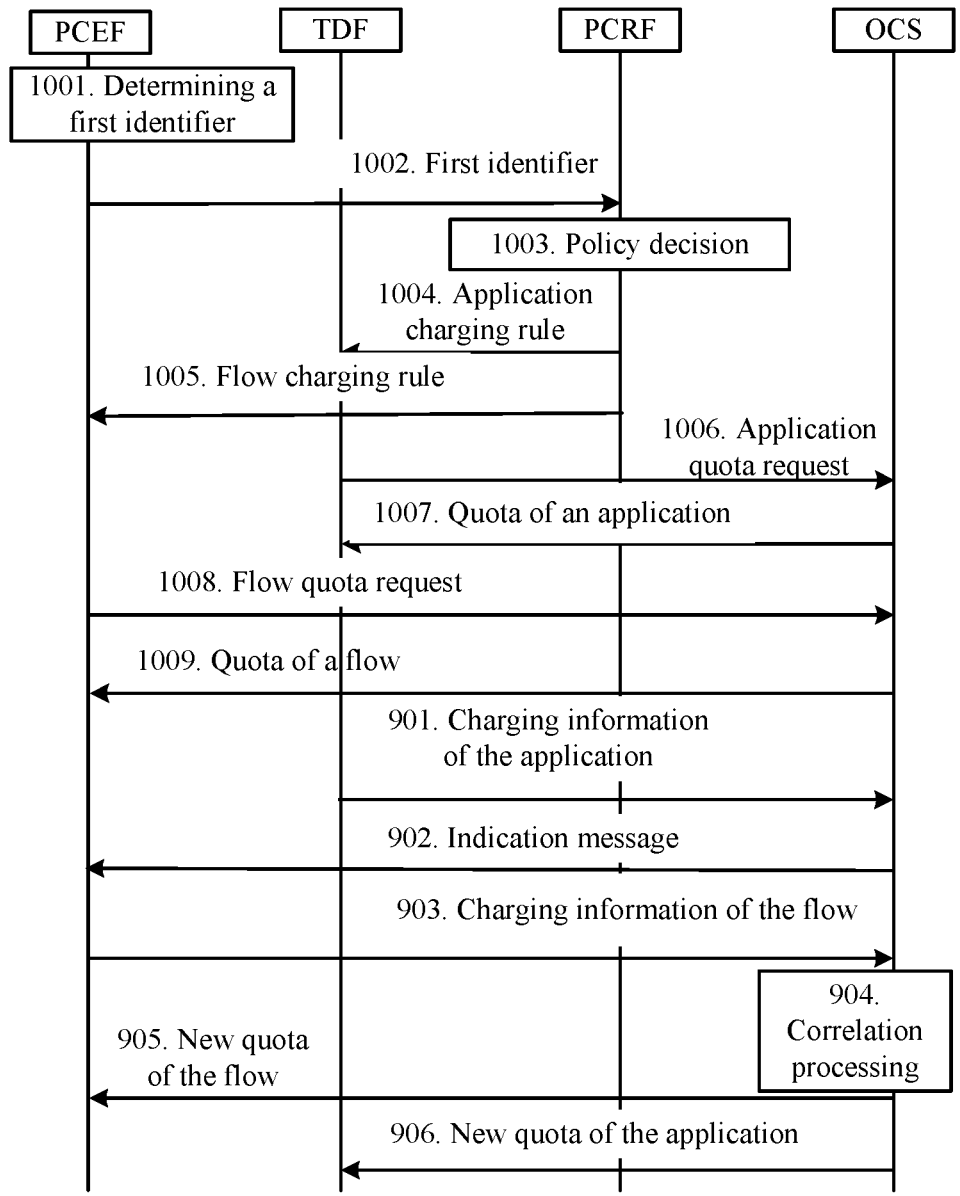
FIG. 11 is a schematic interaction diagram of a charging method according to still another embodiment of the present disclosure.

In an embodiment shown in FIG. 11, a first identifier and a second identifier are also used as correlation identifiers, the first identifier is generated by a PCEF entity, and the second identifier is generated by a PCRF entity. A difference from the embodiment shown in FIG. 10 lies in that in a service use process, a reporting trigger condition of a TDF entity in online charging is satisfied first.

Steps 1001 to 1009 are the same as steps 1001 to 1009 in FIG. 10. In a service use process, after a reporting trigger condition of the TDF entity in online charging is satisfied first, subsequent steps 901 to 906 are the same as steps 901 to 906 in FIG. 9.

Figure 12:
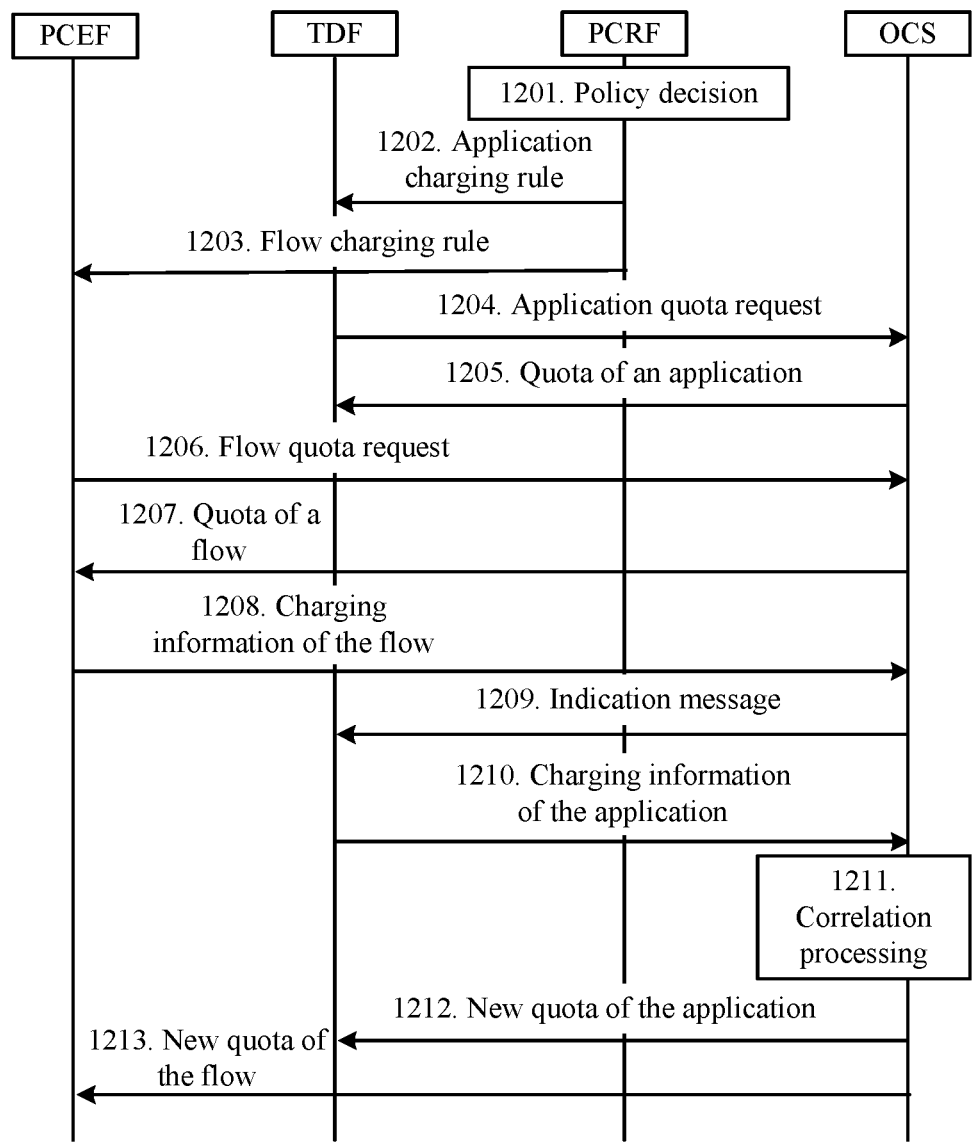
FIG. 12 is a schematic interaction diagram of a charging method according to still another embodiment of the present disclosure.

In an embodiment shown in FIG. 12, a third identifier is used as a correlation identifier, and the third identifier is generated by a PCRF entity.

1201. The PCRF entity makes a policy decision. The PCRF entity generates a flow control policy and a data flow charging policy for a PCEF entity, where the generated data flow charging policy includes: a Charging Key allocated to a flow and a third identifier. The PCRF entity generates an application control policy and an application charging policy for a TDF entity, where the generated application charging policy includes: an application Charging Key allocated to an application and a third identifier of a data flow of the application.

1202. The PCRF entity delivers an application activation policy to the TDF entity for installation. This step includes the application charging policy generated in step 1201.

1203. The PCRF entity delivers the flow control policy and data flow charging policy to the PCEF entity for installation. This step includes the data flow charging policy generated in step 1201.

1204. The TDF entity initiates an application quota request to an OCS according to the application charging policy delivered by the PCRF entity. If online charging is indicated in the charging policy delivered by the PCRF entity, the TDF entity initiates an application quota request (namely, a CCR message) to the OCS, where the request carries a rating group that is allocated to the application and delivered by the PCRF entity, and optionally, carries the third identifier; if the application that needs to be charged for on the TDF entity is corresponding to multiple third identifiers, the CCR message carries the multiple third identifiers.

1205. The OCS performs quota authorization, and returns quota authorization information (namely, a CCA message) to the TDF entity.

1206. The PCEF entity initiates a flow quota request to the OCS according to the data flow charging policy delivered by the PCRF entity. If online charging is indicated in the charging policy delivered by the PCRF entity, the PCEF entity initiates a flow quota request (namely, a CCR message) to the OCS, where the request carries a rating group that is allocated to the flow and delivered by the PCRF entity, and optionally, carries the third identifier.

1207. The OCS performs quota authorization, and returns quota authorization information (namely, a CCA message) to the PCEF entity.

It should be understood that the steps 1202, 1204, and 1205 may be performed prior to or subsequent to the steps 1203, 1206, and 1207, depending on different scenarios.

In a service use process, a procedure for reporting charging information after a reporting trigger condition of the PCEF entity in online charging is satisfied first is as follows:

1208. A charging session on the PCEF entity initiates, to the OCS, a CCR message for reporting charging information (traffic or duration information) of the flow and requesting a new quota. The CCR message includes: the third identifier, the rating group of the data flow, and usage information (traffic or duration).

1209. The OCS sends an indication message to the TDF entity. The OCS determines, according to a correlation identifier acquired during quota authorization and a correlation identifier reported by the PCEF entity, a charging session of the TDF entity to which an RAR message needs to be delivered, and then delivers the RAR message to the TDF entity, instructing the TDF entity to request re-authorization and report usage information of the application, that is, charging information of the application.

1210. According to a requirement of the RAR, the TDF entity reports the charging information of the application by using a CCR message, and requests a new quota. The CCR message includes: the application identifier corresponding to each counter, the corresponding third identifier, the rating group of the application, and corresponding usage information (traffic or duration). Values corresponding to different counters are encapsulated in different AVP groups of MSCC (Multiple-Services-Credit-Control) of the CCR.

1211. The OCS correlates charging information according to the correlation identifiers reported by the PCEF entity and TDF entity, and performs charging processing for the charging information after correlation processing, by using the rating group of the data flow reported by the PCEF entity and the rating group of the application reported by the TDF entity respectively.

1212. The OCS delivers a new quota re-granted to the TDF entity.

1213. The OCS delivers a new quota to the PCEF entity.

It should be understood that the step 1212 may be performed prior to or subsequent to the step 1213.

Figure 13:
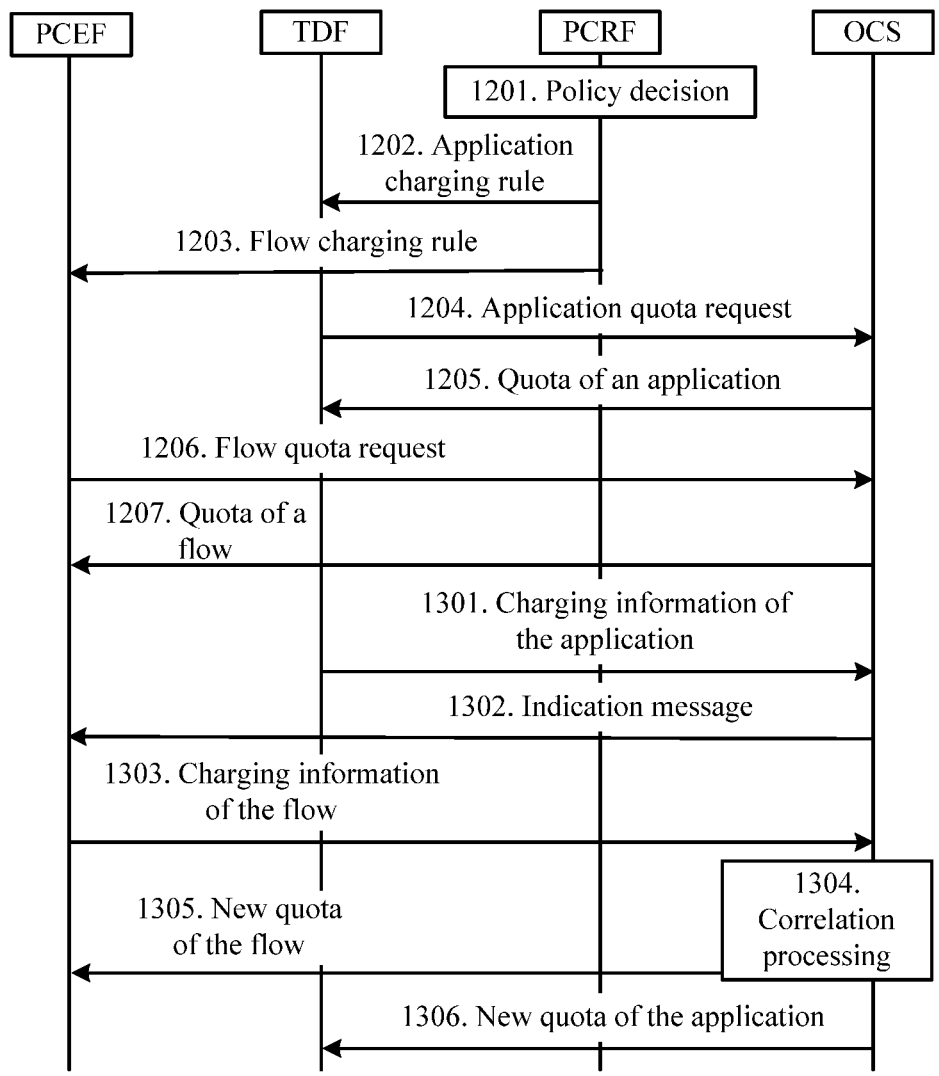
FIG. 13 is a schematic interaction diagram of a charging method according to still another embodiment of the present disclosure.

In an embodiment shown in FIG. 13, a third identifier is also used as a correlation identifier, and the third identifier is generated by a PCRF entity. A difference from the embodiment shown in FIG. 12 lies in that in a service use process, a reporting trigger condition of a TDF entity in online charging is satisfied first.

Steps 1201 to 1207 are the same as those in the embodiment shown in FIG. 12, and are not further described herein.

In the service use process, a procedure for reporting charging information after a reporting trigger condition of the TDF entity in online charging is satisfied first is as follows:

1301. A charging session on the TDF entity initiates, to the OCS, a CCR message for reporting charging information (traffic or duration information) and requesting a new quota. The CCR message includes: the application identifier corresponding to a counter, the corresponding third identifier, the rating group of the application, and corresponding usage information (traffic or duration). Values corresponding to different counters are encapsulated in different AVP groups of MSCC (Multiple-Services-Credit-Control) of the CCR.

1302. The OCS sends an indication message to the PCEF entity. The OCS determines, according to a correlation identifier acquired during quota authorization and a correlation identifier reported by the TDF entity, an affected charging sessions of the PCEF entity, and then delivers an RAR message to the affected charging session on the PCEF entity, instructing the PCEF entity to request re-authorization and report usage information of the flow, that is, charging information of the flow.

1303. According to a requirement of the RAR, the PCEF entity reports the charging information of the flow by using a CCR message, and requests a new quota. The CCR message includes: the third identifier, the rating group corresponding to the flow, and corresponding usage information (traffic or duration).

1304. The OCS correlates charging information according to the correlation identifiers reported by the PCEF entity and TDF entity, and performs charging processing for the charging information after correlation processing, by using the rating group of the data flow reported by the PCEF entity and the rating group of the application reported by the TDF entity respectively.

1305. The OCS delivers a new authorized quota to the PCEF entity.

1306. The OCS delivers a new quota to the TDF entity.

It should be understood that the step 1305 may be performed prior to or subsequent to the step 1306.

Figure 14:
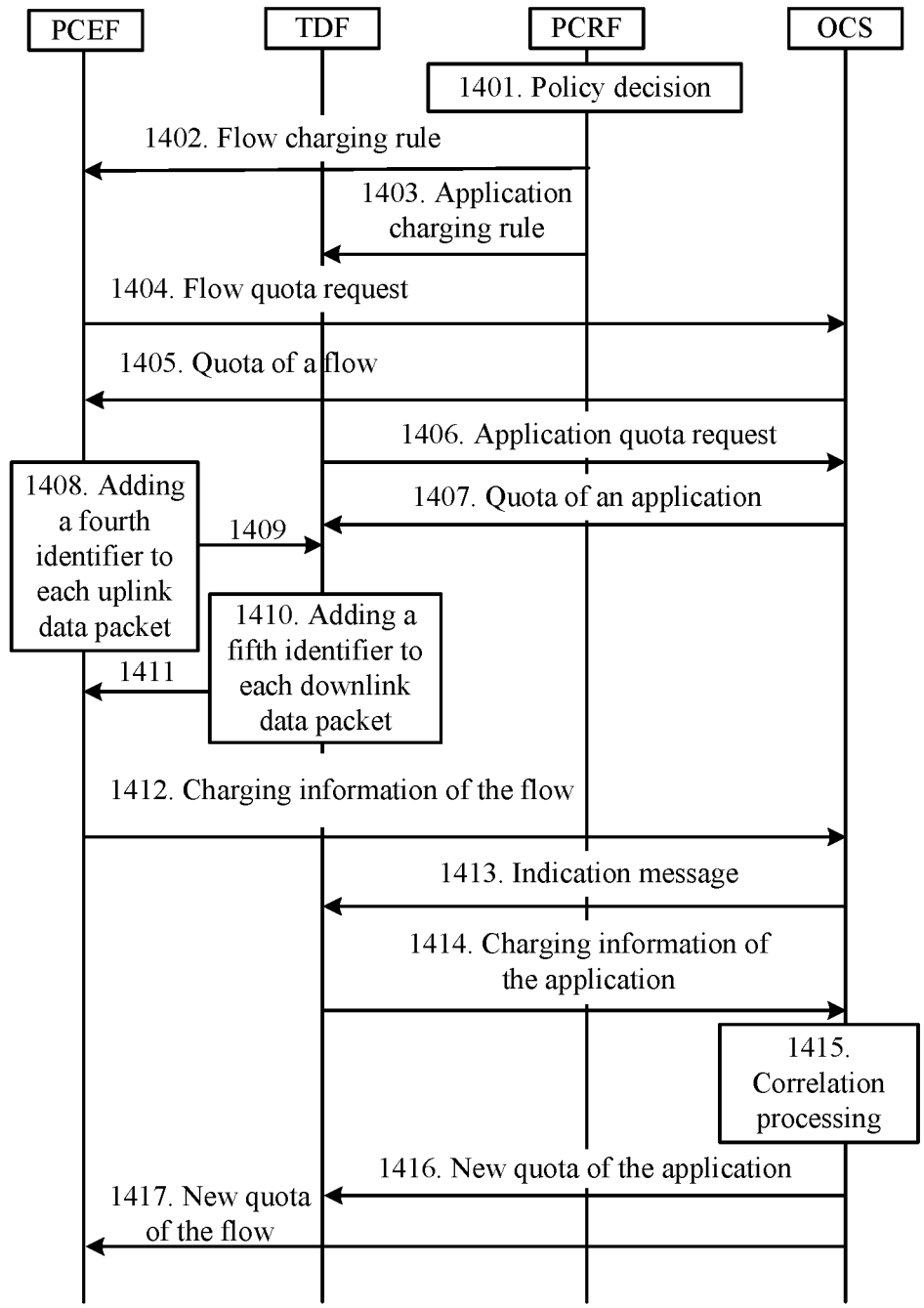
FIG. 14 is a schematic interaction diagram of a charging method according to still another embodiment of the present disclosure.

In an embodiment shown in FIG. 14, a fourth identifier and a fifth identifier are used as correlation identifiers, the fourth identifier is generated by a PCEF entity, and the fifth identifier is generated by a TDF entity.

1401. A PCRF entity makes a policy decision. The PCRF entity generates a flow control policy and a data flow charging policy for the PCEF entity, and generates an application control policy and an application charging policy for the TDF entity.

1402. The PCRF entity delivers the flow control policy and data flow charging policy to the PCEF entity for installation. This step includes the data flow charging policy generated in step 1401.

1403. The PCRF entity delivers an application activation policy to the TDF entity for installation. This step includes the application charging policy generated in step 1401.

1404. The PCEF entity initiates a flow credit quota request to an OCS according to the data flow charging policy delivered by the PCRF entity. If online charging is indicated in the charging policy delivered by the PCRF entity, the PCEF entity initiates a flow quota request (namely, a CCR message) to the OCS, where the request carries a rating group that is allocated to a flow and delivered by the PCRF entity, and optionally, carries a fourth identifier; if there are multiple fourth identifiers on the PCEF entity, the CCR message carries the multiple fourth identifiers; the CCR message is as follows (only related AVPs are exemplified):

```
<CCR> ::= < Diameter Header: 272, REQ, PXY >
              *[ Multiple-Services-Credit-Control ]
          *[ CC-Correlation-Id ]
```

1405. The OCS performs quota authorization, and returns quota authorization information (namely, a CCA message) to the PCEF entity.

1406. The TDF entity initiates an application quota request to the OCS according to the application charging policy delivered by the PCRF entity. If online charging is indicated in the charging policy delivered by the PCRF entity, the TDF entity initiates an application quota request (namely, a CCR message) to the OCS, where the request carries a rating group that is allocated to an application and delivered by the PCRF entity, and optionally, carries a fifth identifier; if the application that needs to be charged for on the TDF entity is corresponding to multiple fifth identifiers, the CCR message carries the multiple fifth identifiers; the CCR message is as follows (only related AVPs are exemplified):

```
<CCR> ::= < Diameter Header: 272, REQ, PXY >
              *[ Multiple-Services-Credit-Control ]
              *[ CC-Correlation-Id ]
```

1407. The OCS performs quota authorization, and returns quota authorization information (namely, a CCA message) to the TDF entity.

1408. The PCEF entity adds the fourth identifier to each uplink data packet.

1409. The PCEF entity sends the uplink data packet carrying the fourth identifier to the TDF entity.

1410. The TDF entity adds the fifth identifier to each downlink data packet.

1411. The TDF entity sends the downlink data packet carrying the fifth identifier to the PCEF entity.

In a service use process, a procedure for reporting charging information after a reporting trigger condition of the PCEF entity in online charging is satisfied first is as follows:

1412. A charging session on the PCEF entity initiates, to the OCS, a CCR message for reporting charging information (traffic or duration information) of the flow and requesting a new quota. The CCR message includes: the fourth identifier and fifth identifier (or only the fourth identifier), the rating group of the data flow, and usage information (traffic or duration).

1413. The OCS sends an indication message to the TDF entity. The OCS determines, according to a correlation identifier acquired during credit quota authorization and a correlation identifier reported by the PCEF entity, a charging session of the TDF entity to which an RAR message needs to be delivered, and then delivers the RAR message to the TDF entity, instructing the TDF entity to request re-authorization and report usage information of the application, that is, charging information of the application.

1414. According to a requirement of the RAR, the TDF entity reports the charging information of the application by using a CCR message, and requests a new quota. The CCR message includes: the application identifier corresponding to each counter, the corresponding fourth identifier and fifth identifier (or only the fifth identifier), the rating group of the application, and corresponding usage information (traffic or duration). Values corresponding to different counters are encapsulated in different AVP groups of MSCC (Multiple-Services-Credit-Control) of the CCR.

1415. The OCS correlates charging information according to the correlation identifiers reported by the PCEF entity and TDF entity, and performs charging processing for the charging information after correlation processing, by using the rating group of the data flow reported by the PCEF entity and the rating group of the application reported by the TDF entity respectively.

1416. The OCS delivers a new authorized quota to the TDF entity.

1417. The OCS delivers a new quota to the PCEF entity.

Figure 15:
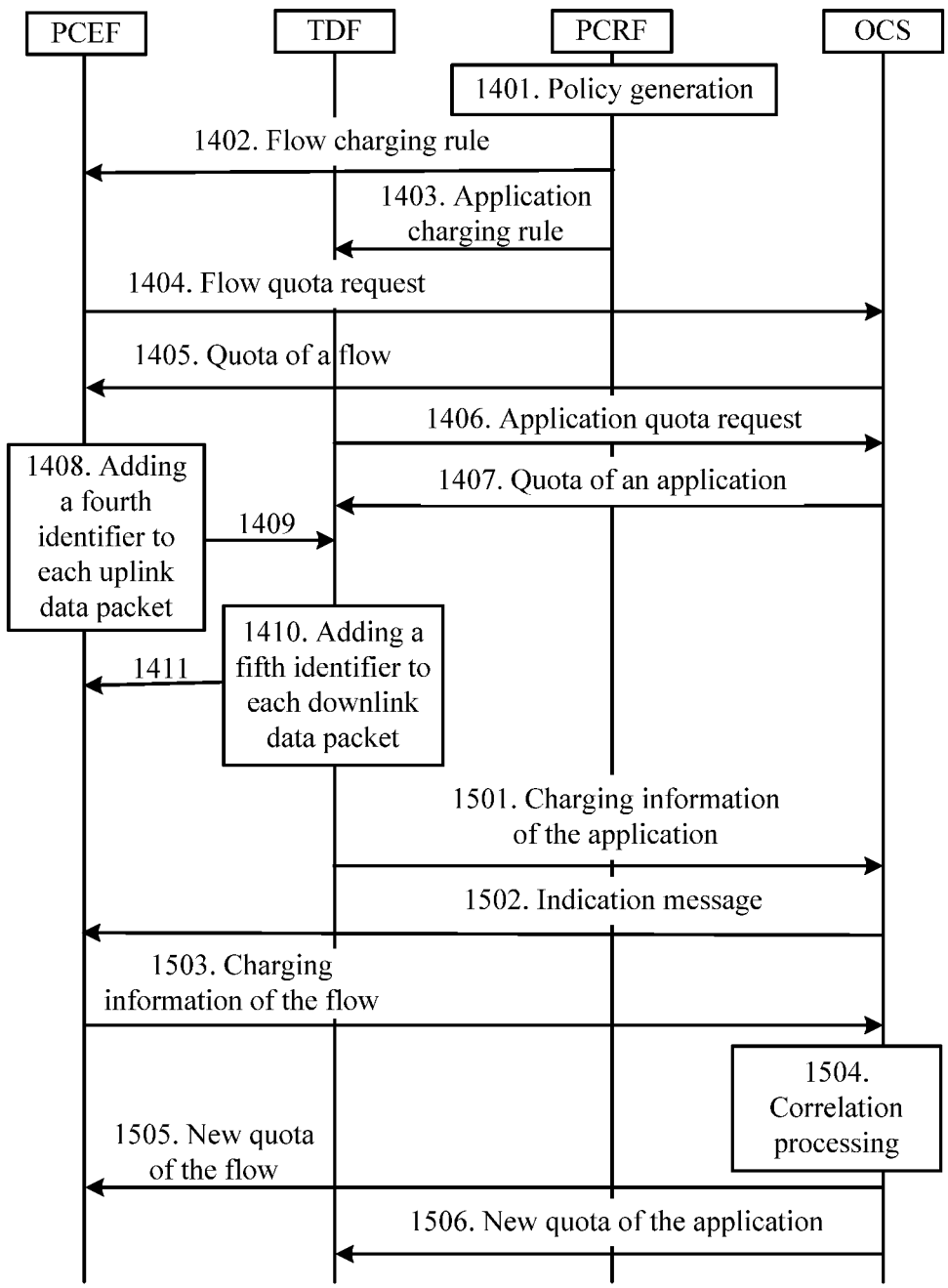
FIG. 15 is a schematic interaction diagram of a charging method according to still another embodiment of the present disclosure.

In an embodiment shown in FIG. 15, a fourth identifier and a fifth identifier are also used as correlation identifiers, the fourth identifier is generated by a PCEF entity, and the fifth identifier is generated by a TDF entity. A difference from the embodiment shown in FIG. 14 lies in that in a service use process, a reporting trigger condition of the TDF entity in online charging is satisfied first.

Steps 1401 to 1411 are the same as those in the embodiment shown in FIG. 14, and are not further described herein.

In the service use process, a procedure for reporting charging information after a reporting trigger condition of the TDF entity in online charging is satisfied first is as follows:

1501. A charging session on the TDF entity initiates, to the OCS, a CCR message for reporting charging information (traffic or duration information) and requesting a new quota. The CCR message includes: the application identifier corresponding to a counter, the corresponding fourth identifier and fifth identifier (or only the fifth identifier), the rating group of the application, and corresponding usage information (traffic or duration). Values corresponding to different counters are encapsulated in different AVP groups of MSCC (Multiple-Services-Credit-Control) of the CCR.

1502. The OCS sends an indication message to the PCEF entity. The OCS determines, according to a correlation identifier acquired during quota authorization and a correlation identifier reported by the TDF entity, an affected charging sessions of the PCEF entity, and then delivers an RAR message to the affected charging session on the PCEF entity, instructing the PCEF entity to request re-authorization and report usage information of the flow, that is, charging information of the flow.

1503. According to a requirement of the RAR, the PCEF entity reports the charging information of the flow by using a CCR message, and requests a new quota. The CCR message includes: the fourth identifier and fifth identifier (or only the fourth identifier), the rating group corresponding to the flow, and corresponding usage information (traffic or duration).

1504. The OCS correlates charging information according to the correlation identifiers reported by the PCEF entity and TDF entity, and performs charging processing for the charging information after correlation processing, by using the rating group of the data flow reported by the PCEF entity and the rating group of the application reported by the TDF entity respectively.

1505. The OCS delivers a new authorized quota to the PCEF entity.

1506. The OCS delivers a new quota to the TDF entity.

In the charging method according to this embodiment of the present disclosure, a correlation identifier is carried in charging information, so that correlation processing may be performed for charging information of a data flow and charging information of an application. Thereby, accurate charging can be performed for the data flow and the application, and charging for the application and charging for the data flow are implemented simultaneously.

In another embodiment, a method for generating correlation identifiers and acquiring the correlation identifiers by a PCEF entity and a TDF entity in offline charging is the same as in online charging. A difference from online charging lies in that in offline charging, there is neither a step of requesting a credit quota, nor a step for a charging system to instruct one entity among the TDF entity and PCEF entity to report charging information after the other entity reports charging information to the charging system. The PCEF entity and TDF entity separately report charging information carrying correlation identifiers. In offline charging, correlation processing is performed for the charging information from the PCEF entity and TDF entity according to the correlation identifiers carried in the charging information reported by the PCEF entity and TDF entity.

The charging information reported by the PCEF entity includes: a correlation identifier, a rating group, and usage information (traffic or duration).

Optionally, the correlation identifier is a first identifier and a second identifier.

Optionally, the correlation identifier is a third identifier.

Optionally, the correlation identifier is a fourth identifier, or a fourth identifier and a fifth identifier.

The charging information reported by the TDF entity includes: an application identifier corresponding to each counter, a corresponding correlation identifier, a rating group of an application, and corresponding usage information (traffic or duration).

Optionally, the correlation identifier corresponding to the counter is a first identifier and a second identifier.

Optionally, the correlation identifier corresponding to the counter is a third identifier.

Optionally, the correlation identifier corresponding to the counter is a fifth identifier, or a fourth identifier and fifth identifier.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

The foregoing has described in detail the charging methods according to the embodiments of the present disclosure with reference to FIG. 1 to FIG. 15. The following will describe a TDF entity, a PCEF entity, a charging system, and a PCRF entity according to the embodiments of the present disclosure with reference to FIG. 16 to FIG. 21.

Figure 16:
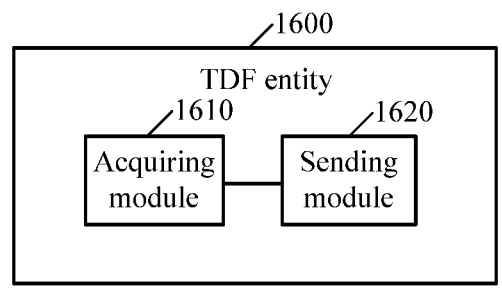
FIG. 16 is a schematic block diagram of a TDF entity according to an embodiment of the present disclosure.

FIG. 16 shows a schematic block diagram of a TDF entity 1600 according to an embodiment of the present disclosure. As shown in FIG. 16, the TDF entity 1600 includes:

an acquiring module 1610, configured to acquire a correlation identifier of a data flow of an application borne by the TDF entity; and a sending module 1620, configured to send first charging information to a charging system, where the first charging information carries the correlation identifier of the data flow of the application borne by the TDF entity, so that the charging system performs, according to the correlation identifier of the data flow of the application borne by the TDF entity and a correlation identifier of a data flow borne by a policy and charging enforcement function PCEF entity, correlation processing for the first charging information and second charging information that is sent by the PCEF entity to the charging system, where the second charging information carries the correlation identifier of the data flow borne by the PCEF entity.

The TDF entity according to this embodiment of the present disclosure includes a correlation identifier into charging information, so that a charging system may perform correlation processing for charging information of a data flow and charging information of an application. Thereby, accurate charging can be performed for the data flow and the application, and charging for the application and charging for the data flow are implemented simultaneously.

Optionally, the sending module 1620 is specifically configured to send, when a reporting trigger condition of the TDF entity is satisfied, the first charging information to the charging system, so that the charging system sends, according to the correlation identifier of the data flow of the application borne by the TDF entity, to the PCEF entity an indication message for instructing the PCEF entity to send the second charging information to the charging system.

Optionally, the TDF entity 1600 further includes:

a first receiving module, configured to receive, before the sending module sends the first charging information to the charging system, an indication message that is sent by the charging system according to the correlation identifier of the data flow borne by the PCEF entity and instructs the TDF entity to send the first charging information; where the sending module 1620 is specifically configured to respond to the indication message by sending the first charging information to the charging system.

Optionally, the indication message carries the correlation identifier of the data flow borne by the PCEF entity; and the sending module 1620 is specifically configured to send charging information that is of the data flow of the application borne by the TDF entity and is corresponding to the correlation identifier of the data flow borne by the PCEF entity, to the charging system.

Optionally, the TDF entity 1600 further includes:

a second receiving module, configured to receive an application charging policy sent by a PCRF entity, where the application charging policy includes the correlation identifier of the data flow of the application borne by the TDF entity; where the acquiring module 1610 is specifically configured to acquire, according to the application charging policy, the correlation identifier of the data flow of the application borne by the TDF entity; and the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; or the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group.

Optionally, the application charging policy includes correlation identifiers of data flows of all applications on the TDF entity and flow templates corresponding to the correlation identifiers of the data flows of all the applications on the TDF entity; and the acquiring module 1610 is specifically configured to acquire, according to the correlation identifiers of the data flows of all the applications on the TDF entity and the flow templates corresponding to the correlation identifiers of the data flows of all the applications on the TDF entity, the correlation identifier of the data flow of the application borne by the TDF entity.

Optionally, the correlation identifier of the data flow of the application borne by the TDF entity includes a fourth identifier and a fifth identifier, and the correlation identifier of the data flow borne by the PCEF entity includes the fourth identifier and the fifth identifier, where the fourth identifier indicates a bearer to which the data flow belongs on the PCEF entity and a corresponding rating group, and the fifth identifier is used to identify the data flow of the application; and the TDF entity 1600 further includes:

a third receiving module, configured to receive a data packet that is sent by the PCEF entity and carries the fourth identifier; and a determining module, configured to determine the fifth identifier of the data flow of the application borne by the TDF entity; where the acquiring module 1610 is specifically configured to acquire, according to the data packet that is sent by the PCEF entity and carries the fourth identifier, the fourth identifier of the data flow of the application borne by the TDF entity, and acquire the fifth identifier, which is determined by the determining module, of the data flow of the application borne by the TDF entity; and the sending module 1620 is further configured to send a data packet that carries the fifth identifier to the PCEF entity, so that the PCEF entity acquires, according to the data packet that carries the fifth identifier, the fifth identifier of the data flow borne by the PCEF entity.

Optionally, the sending module 1620 is further configured to send, before sending the first charging information to the charging system, a first quota request to the charging system, where the first quota request carries the correlation identifier of the data flow of the application borne by the TDF entity and the rating group of the application, so that the charging system may allocate a first quota according to the rating group of the application; and the TDF entity 1600 further includes:

a fourth receiving module, configured to receive the first quota sent by the charging system.

The TDF entity 1600 according to this embodiment of the present disclosure may be corresponding to a TDF entity in the charging method according to the foregoing embodiments of the present disclosure, and the foregoing and other operations and/or functions of the modules in the TDF entity 1600 are respectively used to implement the corresponding procedures of each method in FIG. 1 to FIG. 15, and are not further described herein for brevity.

Figure 17:
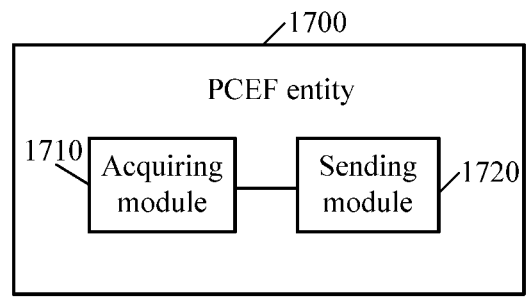
FIG. 17 is a schematic block diagram of a PCEF entity according to an embodiment of the present disclosure.

FIG. 17 shows a schematic block diagram of a PCEF entity 1700 according to an embodiment of the present disclosure. As shown in FIG. 17, the PCEF entity 1700 includes:

an acquiring module 1710, configured to acquire a correlation identifier of a data flow borne by the PCEF entity; and a sending module 1720, configured to send second charging information to a charging system, where the second charging information carries the correlation identifier of the data flow borne by the PCEF entity, so that the charging system performs, according to the correlation identifier of the data flow borne by the PCEF entity and a correlation identifier of a data flow of an application borne by a traffic detection function TDF entity, correlation processing for the second charging information and first charging information that is sent by the TDF entity to the charging system, where the first charging information carries the correlation identifier of the data flow of the application borne by the TDF entity.

The PCEF entity according to this embodiment of the present disclosure includes a correlation identifier into charging information, so that a charging system may perform correlation processing for charging information of a data flow and charging information of an application. Thereby, accurate charging can be performed for the data flow and the application, and charging for the application and charging for the data flow are implemented simultaneously.

Optionally, the sending module 1720 is specifically configured to send, when a reporting trigger condition of the PCEF entity is satisfied, the second charging information to the charging system, so that the charging system sends, according to the correlation identifier of the data flow borne by the PCEF entity, to the TDF entity an indication message for instructing the TDF entity to send the first charging information to the charging system.

Optionally, the PCEF entity 1700 further includes:

a first receiving module, configured to receive, before the sending module sends the second charging information to the charging system, an indication message that is sent by the charging system according to the correlation identifier of the data flow of the application borne by the TDF entity and instructs the PCEF entity to send the second charging information; where the sending module 1720 is specifically configured to respond to the indication message by sending the second charging information to the charging system.

Optionally, the indication message carries the correlation identifier of the data flow of the application borne by the TDF entity; and the sending module 1720 is specifically configured to send charging information that is of the data flow borne by the PCEF entity and is corresponding to the correlation identifier of the data flow of the application borne by the TDF entity, to the charging system.

Optionally, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; and the PCEF entity 1700 further includes:

a second receiving module, configured to receive a data flow charging policy sent by a PCRF entity, where the data flow charging policy includes the first identifier and the second identifier of the data flow borne by the PCEF entity; where the acquiring module 1710 is specifically configured to acquire, according to the data flow charging policy, the first identifier and the second identifier of the data flow borne by the PCEF entity.

Optionally, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; and the PCEF entity 1700 further includes:

a first determining module, configured to determine the first identifier of the data flow borne by the PCEF entity; and a third receiving module, configured to receive a data flow charging policy sent by a PCRF entity, where the data flow charging policy includes the second identifier of the data flow borne by the PCEF entity; where the acquiring module 1710 is specifically configured to acquire the first identifier, which is determined by the first determining module, of the data flow borne by the PCEF entity, and acquire, according to the data flow charging policy, the second identifier of the data flow borne by the PCEF entity; and the sending module 1720 is further configured to send the first identifier of the data flow borne by the PCEF entity to the PCRF entity.

Optionally, the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group; and the PCEF entity 1700 further includes:

a fourth receiving module, configured to receive a data flow charging policy sent by a PCRF entity, where the data flow charging policy includes the third identifier of the data flow borne by the PCEF entity; where the acquiring module 1710 is specifically configured to acquire, according to the data flow charging policy, the third identifier of the data flow borne by the PCEF entity.

Optionally, the correlation identifier of the data flow of the application borne by the TDF entity includes a fourth identifier and a fifth identifier, and the correlation identifier of the data flow borne by the PCEF entity includes the fourth identifier and the fifth identifier, where the fourth identifier indicates a bearer to which the data flow belongs on the PCEF entity and a corresponding rating group, and the fifth identifier is used to identify the data flow of the application; and the PCEF entity 1700 further includes:

a second determining module, configured to determine the fourth identifier of the data flow borne by the PCEF entity; and a fifth receiving module, configured to receive a data packet that is sent by the TDF entity and carries the fifth identifier; where the acquiring module 1710 is specifically configured to acquire the fourth identifier, which is determined by the second determining module, of the data flow borne by the PCEF entity, and acquire, according to the data packet that is sent by the TDF entity and carries the fifth identifier, the fifth identifier of the data flow borne by the PCEF entity; and the sending module 1720 is further configured to send a data packet that carries the fourth identifier to the TDF entity, so that the TDF entity acquires, according to the data packet that carries the fourth identifier, the fourth identifier of the data flow of the application borne by the TDF entity.

Optionally, the sending module 1720 is further configured to send, before sending the second charging information to the charging system, a second quota request to the charging system, where the second quota request carries the correlation identifier of the data flow borne by the PCEF entity and the rating group of the data flow, so that the charging system may allocate a second quota according to the rating group of the data flow; and the PCEF entity 1700 further includes:

a sixth receiving module, configured to receive the second quota sent by the charging system.

The PCEF entity 1700 according to this embodiment of the present disclosure may be corresponding to a PCEF entity in the charging method according to the foregoing embodiments of the present disclosure, and the foregoing and other operations and/or functions of the modules in the PCEF entity 1700 are respectively used to implement the corresponding procedures of each method in FIG. 1 to FIG. 15, and are not further described herein for brevity.

Figure 18:
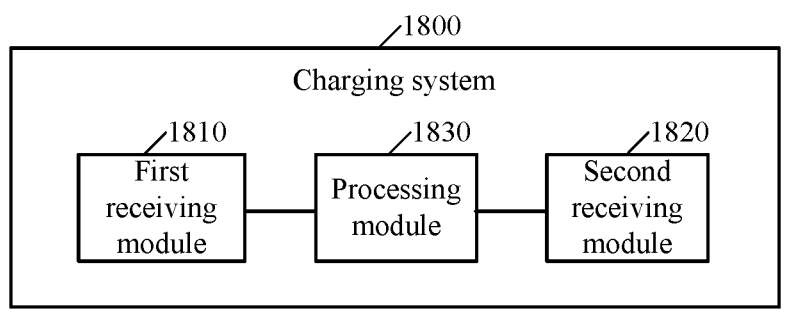
FIG. 18 is a schematic block diagram of a charging system according to an embodiment of the present disclosure.

FIG. 18 shows a schematic block diagram of a charging system 1800 according to an embodiment of the present disclosure. As shown in FIG. 18, the charging system includes:

a first receiving module 1810, configured to receive first charging information sent by a traffic detection function TDF entity, where the first charging information carries a correlation identifier of a data flow of an application borne by the TDF entity;

a second receiving module 1820, configured to receive second charging information sent by a policy and charging enforcement function entity PCEF entity, where the second charging information carries a correlation identifier of a data flow borne by the PCEF entity; and a processing module 1830, configured to perform correlation processing for the first charging information and the second charging information according to the correlation identifier of the data flow of the application borne by the TDF entity and the correlation identifier of the data flow borne by the PCEF entity.

The charging system according to this embodiment of the present disclosure receives charging information of a flow and charging information of an application, both of which carry correlation identifiers, and performs correlation processing for the charging information of the flow and the charging information of the application according to the correlation identifiers. Thereby, accurate charging can be performed for the data flow and the application.

Figure 19:
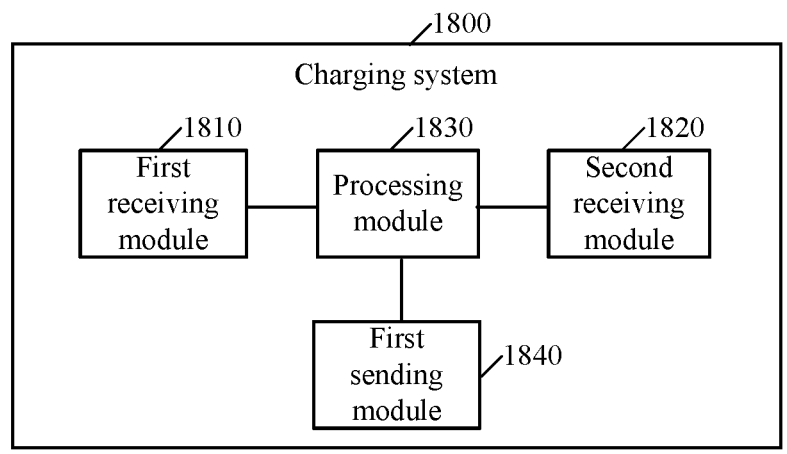
FIG. 19 is another schematic flowchart of a charging system according to an embodiment of the present disclosure.

Optionally, the first receiving module 1810 is specifically configured to receive the first charging information sent by the TDF entity to the charging system when a reporting trigger condition of the TDF entity is satisfied; and as shown in FIG. 19, the charging system 1800 further includes:

a first sending module 1840, configured to send, according to the correlation identifier of the data flow of the application borne by the TDF entity, before the second receiving module 1820 receives the second charging information sent by the policy and charging enforcement function entity PCEF entity, to the PCEF entity an indication message for instructing the PCEF entity to send the second charging information; where the second receiving module 1820 is specifically configured to receive the second charging information sent by the PCEF entity in response to the indication message.

Optionally, the indication message carries the correlation identifier of the data flow of the application borne by the TDF entity; and the second receiving module 1820 is specifically configured to receive charging information sent by the PCEF entity, where the charging information is charging information that is of the data flow borne by the PCEF entity and is corresponding to the correlation identifier of the data flow of the application borne by the TDF entity.

Figure 20:
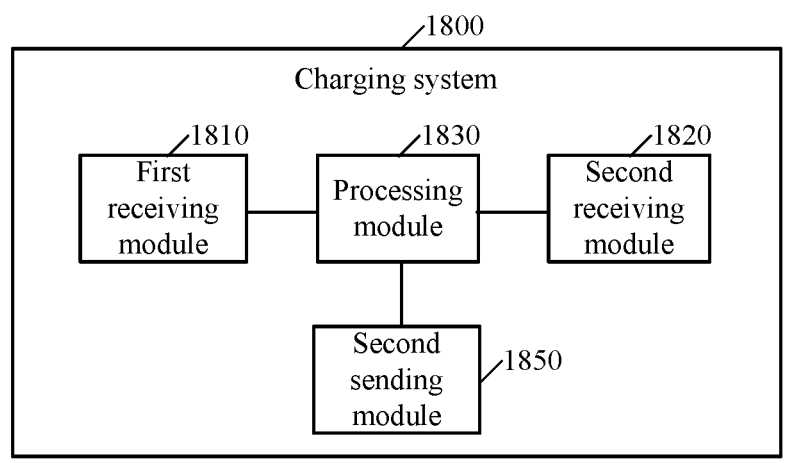
FIG. 20 is still another schematic flowchart of a charging system according to an embodiment of the present disclosure.

Optionally, the second receiving module 1820 is specifically configured to receive the second charging information sent by the PCEF entity to the charging system when a reporting trigger condition of the PCEF entity is satisfied; and as shown in FIG. 20, the charging system 1800 further includes:

a second sending module 1850, configured to send, according to the correlation identifier of the data flow borne by the PCEF entity, before the first receiving module 1810 receives the first charging information sent by the traffic detection function TDF entity, to the TDF entity an indication message for instructing the TDF entity to send the first charging information; where the first receiving module 1810 is specifically configured to receive the first charging information sent by the TDF entity in response to the indication message.

Optionally, the indication message carries the correlation identifier of the data flow borne by the PCEF entity; and the first receiving module 1810 is specifically configured to receive charging information sent by the TDF entity, where the charging information is charging information that is of the data flow of the application borne by the TDF entity and is corresponding to the correlation identifier of the data flow borne by the PCEF entity.

Optionally, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; or the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group; or the correlation identifier of the data flow of the application borne by the PCEF entity includes a fourth identifier and a fifth identifier, and the correlation identifier of the data flow borne by the PCEF entity includes the fourth identifier and the fifth identifier, where the fourth identifier indicates a bearer to which the data flow belongs on the PCEF entity and a corresponding rating group, and the fifth identifier is used to identify the data flow of the application.

Optionally, the charging system 1800 further includes:

a third receiving module, configured to receive, before the first receiving module receives the first charging information sent by the traffic detection function TDF entity, a first quota request sent by the TDF entity, where the first quota request carries the correlation identifier of the data flow of the application borne by the TDF entity and the rating group of the application, so that the charging system may allocate a first quota according to the rating group of the application;

a third sending module, configured to send the first quota to the TDF entity;

a fourth receiving module, configured to receive, before the second receiving module receives the second charging information sent by the policy and charging enforcement function entity PCEF entity, a second quota request sent by the PCEF entity, where the second quota request carries the correlation identifier of the data flow borne by the PCEF entity and the rating group of the data flow, so that the charging system may allocate a second quota according to the rating group of the data flow; and a fourth sending module, configured to send the second quota to the PCEF entity.

Optionally, the processing module 1830 is specifically configured to determine charging information of a same correlation identifier in the first charging information and the second charging information, and perform charging for the charging information of the same correlation identifier by using different charging policies.

The charging system 1800 according to this embodiment of the present disclosure may be corresponding to a charging system in the charging method according to the foregoing embodiments of the present disclosure, and the foregoing and other operations and/or functions of the modules in the charging system 1800 are respectively used to implement the corresponding procedures of each method in FIG. 1 to FIG. 15, and are not further described herein for brevity.

Figure 21:
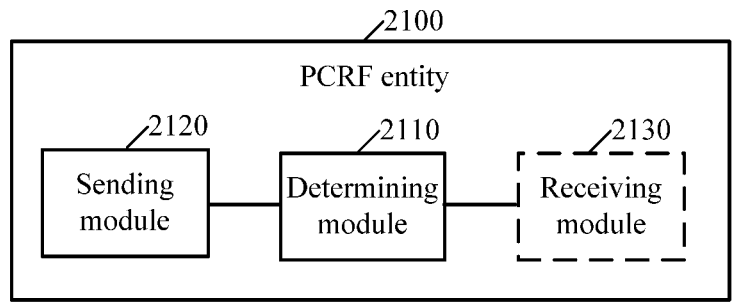
FIG. 21 is a schematic block diagram of a PCRF entity according to an embodiment of the present disclosure.

FIG. 21 shows a schematic block diagram of a PCRF entity 2100 according to an embodiment of the present disclosure. As shown in FIG. 21, the PCRF entity 2100 includes:

a determining module 2110, configured to determine a data flow charging policy, where the data flow charging policy includes second charging correlation information, and determine an application charging policy, where the application charging policy includes first charging correlation information; and a sending module 2120, configured to send the data flow charging policy to a policy and charging enforcement function entity PCEF entity, so that the PCEF entity generates, according to the data flow charging policy, second charging information that carries a correlation identifier of a data flow borne by the PCEF entity, and configured to send the application charging policy to a traffic detection function TDF entity, so that the TDF entity generates, according to the application charging policy, first charging information that carries a correlation identifier of a data flow of an application borne by the TDF entity, where the correlation identifier of the data flow borne by the PCEF entity and the correlation identifier of the data flow of the application borne by the TDF entity are used by a charging system to perform correlation processing for the first charging information and the second charging information.

The PCRF entity according to this embodiment of the present disclosure sends a data flow charging policy carrying charging correlation information to a PCEF entity, and sends an application charging policy carrying charging correlation information to a TDF entity, so that the PCEF entity and TDF entity may generate charging information carrying correlation identifiers. Thereby, a charging system performs correlation processing for charging information of a flow and charging information of an application, and further can implement accurate charging for the data flow and the application.

Optionally, the second charging correlation information includes the correlation identifier of the data flow borne by the PCEF entity, and the first charging correlation information includes the correlation identifier of the data flow of the application borne by the TDF entity; and the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; or the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group.

Optionally, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity;

the second charging correlation information includes the second identifier of the data flow borne by the PCEF entity, and the first charging correlation information includes the first identifier and the second identifier of the data flow of the application borne by the TDF entity; and as shown in FIG. 21, the PCRF entity 2100 further includes:

a receiving module 2130, configured to receive, before the sending module sends the application charging policy to the traffic detection function TDF entity, the first identifier, which is sent by the PCEF entity, of the data flow borne by the PCEF entity; where the determining module 2110 is specifically configured to determine, according to the first identifier of the data flow borne by the PCEF entity, the first identifier of the data flow of the application borne by the TDF entity.

Optionally, the first charging correlation information includes correlation identifiers of data flows of all applications on the TDF entity and flow templates corresponding to the correlation identifiers of the data flows of all the applications on the TDF entity.

The PCRF entity 2100 according to this embodiment of the present disclosure may be corresponding to a PCRF entity in the charging method according to the foregoing embodiments of the present disclosure, and the foregoing and other operations and/or functions of the modules in the PCRF entity 2100 are respectively used to implement the corresponding procedures of each method in FIG. 1 to FIG. 15, and are not further described herein for brevity.

An embodiment of the present disclosure further provides a system, where the system includes the foregoing TDF entity, PCEF entity, charging system, and PCRF entity.

It should be understood that, the term "and/or" in the embodiments of the present disclosure describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

Figure 22:
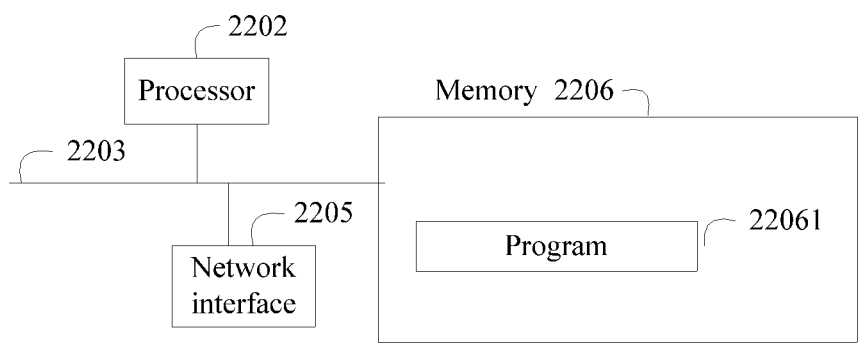
FIG. 22 is a structural diagram of a TDF entity according to an embodiment of the present disclosure.

FIG. 22 shows a structure of a TDF entity device according to another embodiment of the present disclosure, including at least one processor 2202 (for example, a CPU), at least one network interface 2205 or other communication interface, a memory 2206, and at least one communication bus 2203 configured to implement connection and communication between the apparatuses. The processor 2202 is configured to execute an executable module stored in the memory 2206, for example, a computer program. The memory 2206 may include a high-speed random access memory (RAM, Random Access Memory), and may also further include a non-volatile memory (non-volatile memory), for example, at least one disk storage. Through the at least one network interface 2205 (which may be wired or wireless), a communication connection is implemented between a system gateway and at least one other network element, and the Internet, a wide area network, a local network, a metropolitan area network, and the like may be used.

In some implementations, the memory 2206 stores a program 22061. The program 22061 may be executed by the processor 2202. The program includes: acquiring, by a TDF entity, a correlation identifier of a data flow of an application borne by the TDF entity; and sending, by the TDF entity, first charging information to a charging system, where the first charging information carries the correlation identifier of the data flow of the application borne by the TDF entity, so that the charging system performs, according to the correlation identifier of the data flow of the application borne by the TDF entity and a correlation identifier of a data flow borne by a PCEF entity, correlation processing for the first charging information and second charging information that is sent by the PCEF entity to the charging system, where the second charging information carries the correlation identifier of the data flow borne by the PCEF entity.

Optionally, the sending, by the TDF entity, first charging information to a charging system, includes: when a reporting trigger condition of the TDF entity is satisfied, sending, by the TDF entity, the first charging information to the charging system, so that the charging system sends, according to the correlation identifier of the data flow of the application borne by the TDF entity, to the PCEF entity an indication message for instructing the PCEF entity to send the second charging information to the charging system.

Optionally, before the sending, by the TDF entity, first charging information to a charging system, the program further includes: receiving, by the TDF entity, an indication message that is sent by the charging system according to the correlation identifier of the data flow borne by the PCEF entity and instructs the TDF entity to send the first charging information; and the sending, by the TDF entity, first charging information to a charging system, includes: responding, by the TDF entity, to the indication message by sending the first charging information to the charging system.

Optionally, the indication message carries the correlation identifier of the data flow borne by the PCEF entity; and the responding, by the TDF entity, to the indication message by sending the first charging information to the charging system, includes: sending, by the TDF entity, charging information that is of the data flow of the application borne by the TDF entity and is corresponding to the correlation identifier of the data flow borne by the PCEF entity, to the charging system.

Optionally, the acquiring, by a TDF entity, a correlation identifier of a data flow of an application borne by the TDF entity, includes: receiving, by the TDF entity, an application charging policy sent by a PCRF entity, where the application charging policy includes the correlation identifier of the data flow of the application borne by the TDF entity, and acquiring, according to the application charging policy, the correlation identifier of the data flow of the application borne by the TDF entity; where the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; or the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group.

Optionally, the application charging policy includes correlation identifiers of data flows of all applications on the TDF entity and flow templates corresponding to the correlation identifiers of the data flows of all the applications on the TDF entity; and the acquiring, by the TDF entity according to the application charging policy, the correlation identifier of the data flow of the application borne by the TDF entity, includes: acquiring, by the TDF entity according to the correlation identifiers of the data flows of all the applications on the TDF entity and the flow templates corresponding to the correlation identifiers of the data flows of all the applications on the TDF entity, the correlation identifier of the data flow of the application borne by the TDF entity.

Optionally, the correlation identifier of the data flow of the application borne by the TDF entity includes a fourth identifier and a fifth identifier, and the correlation identifier of the data flow borne by the PCEF entity includes the fourth identifier and the fifth identifier, where the fourth identifier indicates a bearer to which the data flow belongs on the PCEF entity and a corresponding rating group, and the fifth identifier is used to identify the data flow of the application; the acquiring, by a TDF entity, a correlation identifier of a data flow of an application borne by the TDF entity, includes: receiving, by the TDF entity, a data packet that is sent by the PCEF entity and carries the fourth identifier, and acquiring, according to the data packet that is sent by the PCEF entity and carries the fourth identifier, the fourth identifier of the data flow of the application borne by the TDF entity; and determining, by the TDF entity, the fifth identifier of the data flow of the application borne by the TDF entity; and the method further includes: sending, by the TDF entity, a data packet that carries the fifth identifier to the PCEF entity, so that the PCEF entity acquires, according to the data packet that carries the fifth identifier, the fifth identifier of the data flow borne by the PCEF entity.

Optionally, before the sending, by the TDF entity, first charging information to a charging system, the method further includes: sending, by the TDF entity, a first quota request to the charging system, where the first quota request carries the correlation identifier of the data flow of the application borne by the TDF entity and the rating group of the application, so that the charging system may allocate a first quota according to the rating group of the application; and receiving, by the TDF entity, the first quota sent by the charging system.

As may be seen from the foregoing technical solution provided by this embodiment of the present disclosure, in this embodiment of the present disclosure, a correlation identifier is carried in charging information, so that correlation processing may be performed for charging information of a data flow and charging information of an application. Thereby, accurate charging can be performed for the data flow and the application, and charging for the application and charging for the data flow are implemented simultaneously.

Figure 23:
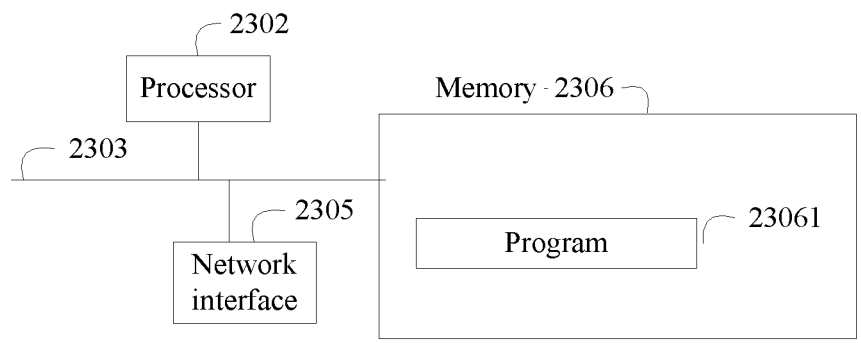
FIG. 23 is a structural diagram of a PCEF entity device according to an embodiment of the present disclosure.

FIG. 23 shows a structure of a PCEF entity device according to another embodiment of the present disclosure, including at least one processor 2302 (for example, a CPU), at least one network interface 2305 or other communication interface, a memory 2306, and at least one communication bus 2303 configured to implement connection and communication between the apparatuses. The processor 2302 is configured to execute an executable module stored in the memory 2306, for example, a computer program. The memory 2306 may include a high-speed random access memory (RAM, Random Access Memory), and may also further include a non-volatile memory (non-volatile memory), for example, at least one disk storage. Through the at least one network interface 2305 (which may be wired or wireless), a communication connection is implemented between a system gateway and at least one other network element, and the Internet, a wide area network, a local network, a metropolitan area network, and the like may be used.

In some implementations, the memory 2306 stores a program 23061, where the program 23061 may be executed by the processor 2302. The program includes: acquiring, by a PCEF entity, a correlation identifier of a data flow borne by the PCEF entity; and sending, by the PCEF entity, second charging information to a charging system, where the second charging information carries the correlation identifier of the data flow borne by the PCEF entity, so that the charging system performs, according to the correlation identifier of the data flow borne by the PCEF entity and a correlation identifier of a data flow of an application borne by a traffic detection function TDF entity, correlation processing for the second charging information and first charging information that is sent by the TDF entity to the charging system, where the first charging information carries the correlation identifier of the data flow of the application borne by the TDF entity.

Optionally, the sending, by the PCEF entity, second charging information to a charging system, includes: when a reporting trigger condition of the PCEF entity is satisfied, sending, by the PCEF entity, the second charging information to the charging system, so that the charging system sends, according to the correlation identifier of the data flow borne by the PCEF entity, to the TDF entity an indication message for instructing the TDF entity to send the first charging information to the charging system.

Optionally, before the sending, by the PCEF entity, second charging information to a charging system, the method further includes: receiving, by the PCEF entity, an indication message that is sent by the charging system according to the correlation identifier of the data flow of the application borne by the TDF entity and instructs the PCEF entity to send the second charging information; and the sending, by the PCEF entity, second charging information to a charging system, includes: responding, by the PCEF entity, to the indication message by sending the second charging information to the charging system.

Optionally, the indication message carries the correlation identifier of the data flow of the application borne by the TDF entity; and the responding, by the PCEF entity, to the indication message by sending the second charging information to the charging system, includes: sending, by the PCEF entity, charging information that is of the data flow borne by the PCEF entity and is corresponding to the correlation identifier of the data flow of the application borne by the TDF entity, to the charging system.

Optionally, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; and the acquiring, by a PCEF entity, a correlation identifier of a data flow borne by the PCEF entity, includes: receiving, by the PCEF entity, a data flow charging policy sent by a PCRF entity, where the data flow charging policy includes the first identifier and the second identifier of the data flow borne by the PCEF entity, and acquiring, according to the data flow charging policy, the first identifier and the second identifier of the data flow borne by the PCEF entity.

Optionally, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; the acquiring, by a PCEF entity, a correlation identifier of a data flow borne by the PCEF entity, includes: determining, by the PCEF entity, the first identifier of the data flow borne by the PCEF entity; and receiving, by the PCEF entity, a data flow charging policy sent by a PCRF entity, where the data flow charging policy includes the second identifier of the data flow borne by the PCEF entity, and acquiring, according to the data flow charging policy, the second identifier of the data flow borne by the PCEF entity; and the method further includes: sending, by the PCEF entity, the first identifier of the data flow borne by the PCEF entity to the PCRF entity.

Optionally, the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group; and the acquiring, by a PCEF entity, a correlation identifier of a data flow borne by the PCEF entity, includes: receiving, by the PCEF entity, a data flow charging policy sent by a PCRF entity, where the data flow charging policy includes the third identifier of the data flow borne by the PCEF entity, and acquiring, according to the data flow charging policy, the third identifier of the data flow borne by the PCEF entity.

Optionally, the correlation identifier of the data flow of the application borne by the TDF entity includes a fourth identifier and a fifth identifier, and the correlation identifier of the data flow borne by the PCEF entity includes the fourth identifier and the fifth identifier, where the fourth identifier indicates a bearer to which the data flow belongs on the PCEF entity and a corresponding rating group, and the fifth identifier is used to identify the data flow of the application; the acquiring, by a PCEF entity, a correlation identifier of a data flow borne by the PCEF entity, includes: determining, by the PCEF entity, the fourth identifier of the data flow borne by the PCEF entity; and receiving, by the PCEF entity, a data packet that is sent by the TDF entity and carries the fifth identifier, and acquiring, according to the data packet that is sent by the TDF entity and carries the fifth identifier, the fifth identifier of the data flow borne by the PCEF entity; and the method further includes: sending, by the PCEF entity, a data packet that carries the fourth identifier to the TDF entity, so that the TDF entity acquires, according to the data packet that carries the fourth identifier, the fourth identifier of the data flow of the application borne by the TDF entity.

Optionally, before the sending, by the PCEF entity, second charging information to a charging system, the method further includes: sending, by the PCEF entity, a second quota request to the charging system, where the second quota request carries the correlation identifier of the data flow borne by the PCEF entity, so that the charging system may allocate the second quota according to the rating group of the data flow; and receiving, by the PCEF entity, a second quota sent by the charging system and the rating group of the data flow. As may be seen from the foregoing technical solution provided by this embodiment of the present disclosure, in this embodiment of the present disclosure, a correlation identifier is carried in charging information, so that correlation processing may be performed for charging information of a data flow and charging information of an application. Thereby, accurate charging can be performed for the data flow and the application, and charging for the application and charging for the data flow are implemented simultaneously.

Figure 24:
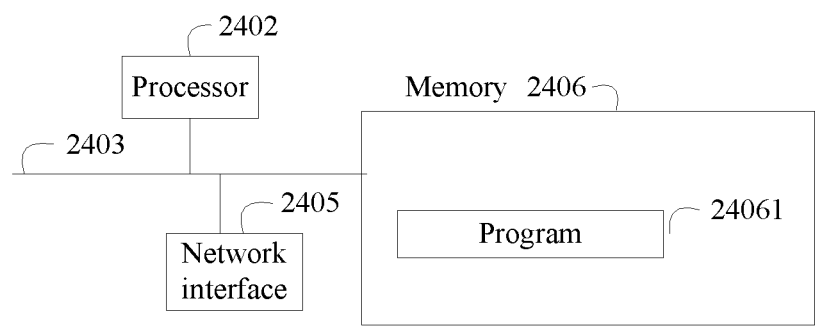
FIG. 24 is a structural diagram of a charging system according to an embodiment of the present disclosure.

FIG. 24 shows a structure of a charging system according to another embodiment of the present disclosure, including at least one processor 2402 (for example, a CPU), at least one network interface 2405 or other communication interface, a memory 2406, and at least one communication bus 2403 configured to implement connection and communication between the apparatuses. The processor 2402 is configured to execute an executable module stored in the memory 2406, for example, a computer program. The memory 2406 may include a high-speed random access memory (RAM, Random Access Memory), and may also further include a non-volatile memory (non-volatile memory), for example, at least one disk storage. Through the at least one network interface 2405 (which may be wired or wireless), a communication connection is implemented between a system gateway and at least one other network element, and the Internet, a wide area network, a local network, a metropolitan area network, and the like may be used.

In some implementations, the memory 2406 stores a program 24061. The program 24061 may be executed by the processor 2402. The program includes: receiving, by the charging system, first charging information sent by a TDF entity, where the first charging information carries a correlation identifier of a data flow of an application borne by the TDF entity; receiving, by the charging system, second charging information sent by a PCEF entity, where the second charging information carries a correlation identifier of a data flow borne by the PCEF entity; and performing, by the charging system, correlation processing for the first charging information and the second charging information according to the correlation identifier of the data flow of the application borne by the TDF entity and the correlation identifier of the data flow borne by the PCEF entity.

Optionally, the receiving, by the charging system, first charging information sent by a TDF entity, includes: receiving, by the charging system, the first charging information sent by the TDF entity to the charging system when a reporting trigger condition of the TDF entity is satisfied; before the receiving, by the charging system, second charging information sent by a PCEF entity, the method further includes: sending, by the charging system according to the correlation identifier of the data flow of the application borne by the TDF entity, to the PCEF entity an indication message for instructing the PCEF entity to send the second charging information; and the receiving, by the charging system, second charging information sent by a PCEF entity, includes: receiving, by the charging system, the second charging information sent by the PCEF entity in response to the indication message.

Optionally, the indication message carries the correlation identifier of the data flow of the application borne by the TDF entity; and the receiving, by the charging system, the second charging information sent by the PCEF entity in response to the indication message, includes: receiving, by the charging system, charging information sent by the PCEF entity, where the charging information is charging information that is of the data flow borne by the PCEF entity and is corresponding to the correlation identifier of the data flow of the application borne by the TDF entity.

Optionally, the receiving, by the charging system, second charging information sent by a PCEF entity, includes: receiving, by the charging system, the second charging information sent by the PCEF entity to the charging system when a reporting trigger condition of the PCEF entity is satisfied; before the receiving, by a charging system, first charging information sent by a TDF entity, the method further includes: sending, by the charging system according to the correlation identifier of the data flow borne by the PCEF entity, to the TDF entity an indication message for instructing the TDF entity to send the first charging information; and the receiving, by a charging system, first charging information sent by a TDF entity, includes: receiving, by the charging system, the first charging information sent by the TDF entity in response to the indication message.

Optionally, the indication message carries the correlation identifier of the data flow borne by the PCEF entity; and the receiving, by the charging system, the first charging information sent by the TDF entity in response to the indication message, includes: receiving, by the charging system, charging information sent by the TDF entity, where the charging information is charging information that is of the data flow of the application borne by the TDF entity and is corresponding to the correlation identifier of the data flow borne by the PCEF entity.

Optionally, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; or the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group; or the correlation identifier of the data flow of the application borne by the PCEF entity includes a fourth identifier and a fifth identifier, and the correlation identifier of the data flow borne by the PCEF entity includes the fourth identifier and the fifth identifier, where the fourth identifier indicates a bearer to which the data flow belongs on the PCEF entity and a corresponding rating group, and the fifth identifier is used to identify the data flow of the application.

Optionally, before the receiving, by a charging system, first charging information sent by a TDF entity, the method further includes: receiving, by the charging system, a first quota request sent by the TDF entity, where the first quota request carries the correlation identifier of the data flow of the application borne by the TDF entity and the rating group of the application, so that the charging system may allocate a first quota according to the rating group of the application; and sending, by the charging system, the first quota to the TDF entity; and before the receiving, by the charging system, second charging information sent by a PCEF entity, the method further includes: receiving, by the charging system, a second quota request sent by the PCEF entity, where the second quota request carries the correlation identifier of the data flow borne by the PCEF entity and the rating group of the data flow, so that the charging system may allocate a second quota according to the rating group of the data flow; and sending, by the charging system, the second quota to the PCEF entity.

Optionally, the performing, by the charging system, correlation processing for the first charging information and the second charging information according to the correlation identifier of the data flow of the application borne by the TDF entity and the correlation identifier of the data flow borne by the PCEF entity, includes: determining, by the charging system, charging information of a same correlation identifier in the first charging information and the second charging information, and performing charging for the charging information of the same correlation identifier by using different charging policies.

As may be seen from the foregoing technical solution provided by this embodiment of the present disclosure, in this embodiment of the present disclosure, charging information of a flow and charging information of an application, which carry correlation identifiers, are received, and correlation processing is performed for the charging information of the flow and the charging information of the application according to the correlation identifiers. Thereby, accurate charging can be performed for the data flow and the application.

Figure 25:
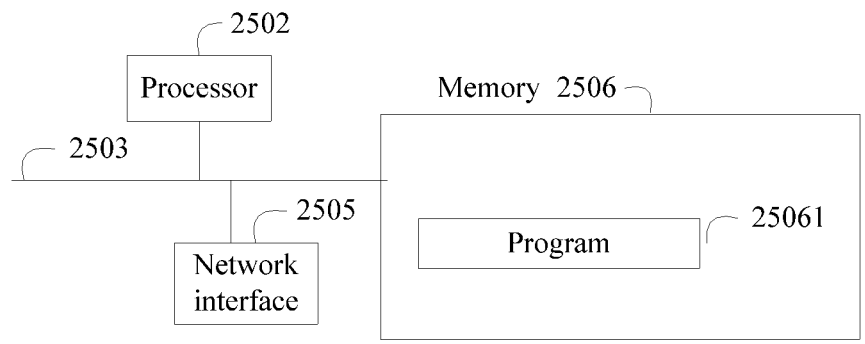
FIG. 25 is a structural diagram of a PCRF entity device according to an embodiment of the present disclosure.

FIG. 25 shows a structure of a PCRF entity device according to another embodiment of the present disclosure, including at least one processor 2502 (for example, a CPU), at least one network interface 2505 or other communication interface, a memory 2506, and at least one communication bus 2503 configured to implement connection and communication between the apparatuses. The processor 2502 is configured to execute an executable module stored in the memory 2506, for example, a computer program. The memory 2506 may include a high-speed random access memory (RAM, Random Access Memory), and may also further include a non-volatile memory (non-volatile memory), for example, at least one disk storage. Through the at least one network interface 2505 (which may be wired or wireless), a communication connection is implemented between a system gateway and at least one other network element, and the Internet, a wide area network, a local network, a metropolitan area network, and the like may be used.

In some implementations, the memory 2506 stores a program 25061. The program 25061 may be executed by the processor 2502. The program includes: sending, by the policy and charging rules function entity PCRF entity, a data flow charging policy to a policy and charging enforcement function entity PCEF entity, where the data flow charging policy includes second charging correlation information, so that the PCEF entity generates, according to the data flow charging policy, second charging information that carries a correlation identifier of a data flow borne by the PCEF entity; and sending, by the PCRF entity, an application charging policy to a traffic detection function TDF entity, where the application charging policy includes first charging correlation information, so that the TDF entity generates, according to the application charging policy, first charging information that carries a correlation identifier of a data flow of an application borne by the TDF entity, where the correlation identifier of the data flow borne by the PCEF entity and the correlation identifier of the data flow of the application borne by the TDF entity are used by a charging system to perform correlation processing for the first charging information and the second charging information.

Optionally, the second charging correlation information includes the correlation identifier of the data flow borne by the PCEF entity, and the first charging correlation information includes the correlation identifier of the data flow of the application borne by the TDF entity; the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; or the correlation identifier of the data flow of the application borne by the TDF entity includes a third identifier, and the correlation identifier of the data flow borne by the PCEF entity includes the third identifier, where the third identifier indicates a bearer to which the data flow belongs on the PCEF entity and a corresponding rating group.

Optionally, the correlation identifier of the data flow of the application borne by the TDF entity includes a first identifier and a second identifier, and the correlation identifier of the data flow borne by the PCEF entity includes the first identifier and the second identifier, where the first identifier indicates a bearer to which the data flow belongs on the PCEF entity, and the second identifier indicates a rating group corresponding to the data flow on the PCEF entity; the second charging correlation information includes the second identifier of the data flow borne by the PCEF entity, and the first charging correlation information includes the first identifier and the second identifier of the data flow of the application borne by the TDF entity; and before the sending, by the PCRF entity, an application charging policy to a traffic detection function TDF entity, the method further includes: receiving, by the PCRF entity, the first identifier, which is sent by the PCEF entity, of the data flow borne by the PCEF entity, and determining, according to the first identifier of the data flow borne by the PCEF entity, the first identifier of the data flow of the application borne by the TDF entity.

Optionally, the first charging correlation information includes correlation identifiers of data flows of all applications on the TDF entity and flow templates corresponding to the correlation identifiers of the data flows of all the applications on the TDF entity.

As may be seen from the foregoing technical solution provided by this embodiment of the present disclosure, in this embodiment of the present disclosure, a data flow charging policy carrying charging correlation information is sent to a PCEF entity, and an application charging policy carrying charging correlation information is sent to a TDF entity, so that the PCEF entity and TDF entity may generate charging information carrying correlation identifiers. Thereby, a charging system performs correlation processing for charging information of a flow and charging information of an application, and further can implement accurate charging for the data flow and the application.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A charging method, comprising:
   receiving, by a charging system, first charging information sent by a traffic detection function (TDF) entity, wherein the first charging information carries a correlation identifier of a data flow of an application borne by the TDF entity;
   receiving, by the charging system, second charging information sent by a policy and charging enforcement function (PCEF) entity, wherein the second charging information carries a correlation identifier of a data flow borne by the PCEF entity; and
   determining, by the charging system, duplicated charging information according to the correlation identifier in the first charging information and the correlation identifier in the second charging information, and
   charging, by the charging system, according to the determined duplicated charging information.

2. The method according to claim 1 wherein the receiving, by a charging system, first charging information sent by a traffic detection function TDF entity, comprises:
   receiving, by the charging system, the first charging information sent by the TDF entity to the charging system when a reporting trigger condition of the TDF entity is satisfied.

3. The method according to claim 2, wherein the receiving, by the charging system, second charging information sent by a policy and charging enforcement function entity PCEF entity, comprises sending, by the charging system according to the correlation identifier of the data flow of the application borne by the TDF entity, to the PCEF entity an indication message for instructing the PCEF entity to send the second charging information.

4. The method according to claim 3, wherein the receiving, by the charging system, second charging information sent by a policy and charging enforcement function entity PCEF entity, comprises receiving, by the charging system, the second charging information sent by the PCEF entity in response to the indication message.

5. The method according to claim 4, wherein the indication message carries the correlation identifier of the data flow of the application borne by the TDF entity; and
   the receiving, by the charging system, the second charging information sent by the PCEF entity in response to the indication message, comprises:
   receiving, by the charging system, charging information sent by the PCEF entity, wherein the charging information is of the data flow borne by the PCEF entity and is corresponding to the correlation identifier of the data flow of the application borne by the TDF entity.

6. The method according to claim 1, wherein the receiving, by the charging system, second charging information sent by a policy and charging enforcement function entity PCEF entity, comprises:
   receiving, by the charging system, the second charging information sent by the PCEF entity to the charging system when a reporting trigger condition of the PCEF entity is satisfied;
   before the receiving, by a charging system, first charging information sent by a traffic detection function TDF entity, the method further comprises:
   sending, by the charging system according to the correlation identifier of the data flow borne by the PCEF entity, to the TDF entity an indication message for instructing the TDF entity to send the first charging information; and
   the receiving, by a charging system, first charging information sent by a traffic detection function TDF entity, comprises:
   receiving, by the charging system, the first charging information sent by the TDF entity in response to the indication message.

7. The method according to claim 6, wherein the indication message carries the correlation identifier of the data flow borne by the PCEF entity; and
   the receiving, by the charging system, the first charging information sent by the TDF entity in response to the indication message, comprises:
   receiving, by the charging system, charging information sent by the TDF entity, wherein the charging information is charging information that is of the data flow of the application borne by the TDF entity and is corresponding to the correlation identifier of the data flow borne by the PCEF entity.

8. A computer program product for charging in a charging system, with the computer program product comprising computer executable instructions stored on a non-transitory storage medium such that when the executable instructions are executed by a processor the charging system is configured to:
   receive first charging information sent by a traffic detection function (TDF) entity, wherein the first charging information carries a correlation identifier of a data flow of an application borne by the TDF entity;
   receive second charging information sent by a policy and charging enforcement function (PCEF) entity, wherein the second charging information carries a correlation identifier of a data flow borne by the PCEF entity; and
   determine duplicated charging information according to the correlation identifier in the first charging information and the correlation identifier in the second charging information, and charge according to the determined duplicated charging information.

9. The computer program product according to claim 8 wherein the processor is further configured to receive the first charging information sent by the TDF entity to the charging system when a reporting trigger condition of the TDF entity is satisfied.

10. The computer program product according to claim 9, wherein the second charging information, comprises an indication message for instructing the PCEF entity to send the second charging information.

11. The computer program product according to claim 10, wherein the receiving, by the charging system, second charging information sent by a policy and charging enforcement function entity PCEF entity, comprises receiving, by the charging system, the second charging information sent by the PCEF entity in response to the indication message.

12. The computer program product according to claim 11, wherein the indication message carries the correlation identifier of the data flow of the application borne by the TDF entity.

13. The computer program product according to claim 11, wherein the second charging information sent by the PCEF entity in response to the indication message, comprises, charging information sent by the PCEF entity, wherein the charging information is of the data flow borne by the PCEF entity and is corresponding to the correlation identifier of the data flow of the application borne by the TDF entity.

14. A charging system, comprising:
a processor; and
a computer-readable storage medium coupled to the processor and configured to store programming instructions for execution by the processor, wherein the programming instructions instruct the processor to:
receive first charging information sent by a traffic detection function (TDF) entity, wherein the first charging information carries a correlation identifier of a data flow of an application borne by the TDF entity;
receive second charging information sent by a policy and charging enforcement function (PCEF) entity, wherein the second charging information carries a correlation identifier of a data flow borne by the PCEF entity;
determine duplicated charging information according to the correlation identifier in the first charging information and the correlation identifier in the second charging information; and
charge according to the determined duplicated charging information.

15. The charging system according to claim 14, wherein the second charging information is sent by a policy and charging enforcement function entity PCEF entity when a reporting trigger condition of the PCEF entity is satisfied.

16. The charging system according to claim 14, wherein the instructions for execution by the processor cause the processor to send, according to the correlation identifier of the data flow borne by the PCEF entity, an indication message to the TDF entity for instructing the TDF entity to send the first charging information before the receiving, by a charging system, first charging information sent by a traffic detection function TDF entity.

17. The charging system according to claim 15, wherein the indication message carries the correlation identifier of the data flow borne by the PCEF entity.

18. The charging system according to claim 17, wherein the charging information is charging information that is of the data flow of the application borne by the TDF entity and is corresponding to the correlation identifier of the data flow borne by the PCEF entity.

* * * * *